(12) United States Patent
Kishida et al.

(10) Patent No.: US 7,719,666 B2
(45) Date of Patent: May 18, 2010

(54) DISTRIBUTED OPTICAL FIBER SENSOR

(75) Inventors: Kinzo Kishida, Kobe (JP); Tekken Li, Kobe (JP); Shenbin Lin, Novi, MI (US)

(73) Assignee: Neubrex Co., Ltd. (JP)

( * ) Notice: Subject to any disclaimer, the term of this patent is extended or adjusted under 35 U.S.C. 154(b) by 702 days.

(21) Appl. No.: 11/630,185

(22) PCT Filed: Jun. 25, 2004

(86) PCT No.: PCT/JP2004/009352
§ 371 (c)(1), (2), (4) Date: Dec. 20, 2006

(87) PCT Pub. No.: WO2006/001071
PCT Pub. Date: Jan. 5, 2006

(65) Prior Publication Data
US 2008/0068586 A1    Mar. 20, 2008

(51) Int. Cl.
*G01N 21/00* (2006.01)
(52) U.S. Cl. .................................... 356/73.1
(58) Field of Classification Search ............... None
See application file for complete search history.

(56) References Cited
U.S. PATENT DOCUMENTS

| 5,686,986 A | 11/1997 | Li et al. |
| 6,237,421 B1 | 5/2001 | Li et al. |

(Continued)

FOREIGN PATENT DOCUMENTS

JP    3-120437    5/1991

(Continued)

OTHER PUBLICATIONS

1. "Characterization of the Brillouin-loss spectrum of single-mode fibers by use of very short (<10-ns) pulses"—X. Bao and A. Brown, M. DeMerchant, J. Smith—Optics Letters, vol. 24, No. 8, Apr. 15, 1999. 2. "Transient response in high-resolution Brillouin-based distributed sensing using probe pulses shorter than the acoustic relaxation time"—V. Lecoueche et al.—Optics Letters, vol. 25, No. 3, Feb. 1, 2000.

(Continued)

*Primary Examiner*—Gregory J Toatley, Jr.
*Assistant Examiner*—Juan D Valentin
(74) *Attorney, Agent, or Firm*—Gerald E. Hespos; Michael J. Porco

(57) ABSTRACT

A distributed optical fiber sensor uses a Brillouin scattering phenomenon to avoid manual adjustment and to measure strain and/or temperature with high accuracy and high spatial resolution. A stepwise optical light source generates an optical pulse having a stepwise distribution of intensity to increase toward the center, and a continuous light source generates continuous light on. The optical pulse is incident on a sensing optical fiber as probe light and the continuous light is incident as pump light to cause a Brillouin scattering phenomenon between the probe light and the pump light. A Brillouin time domain detector determines a Brillouin loss or gain spectrum from the light emerging from the sensing optical fiber and attributed to the Brillouin scattering phenomenon, and measures strain in and/or temperature of the sensing optical fiber in the longitudinal direction thereof based on the determined Brillouin loss or gain spectrum.

20 Claims, 25 Drawing Sheets

U.S. PATENT DOCUMENTS 6,813,403 B2 * 11/2004 Tennyson .................... 385/12
7,425,790 B2     7/2007 Brown et al.
7,447,388 B2 * 11/2008 Bates et al. .................... 385/7
7,448,447 B2 * 11/2008 Walford ................. 166/250.01

FOREIGN PATENT DOCUMENTS

| JP | 10-111171   | 4/1998 |
| JP | 11-183135   | 7/1999 |
| JP | 2001-507446 | 6/2001 |
| WO | WO 98/27406 | 6/1998 |

OTHER PUBLICATIONS

"Effect of the finite extinction ratio of an electro-optic modulator on the performance of distributed probe-pump Brillouin sensor systems"—Shahraam Afshar V. et al.—Optics Letters, vol. 28, No. 16, Aug. 2003. 4. "Stochastic dynamics of stimulated Brillouin scattering in an optical fiber"—A.L. Gaeta et al.—Physical Review, A—Vo. 44, No. 5, 1991, pp. 3205-3209.

* cited by examiner

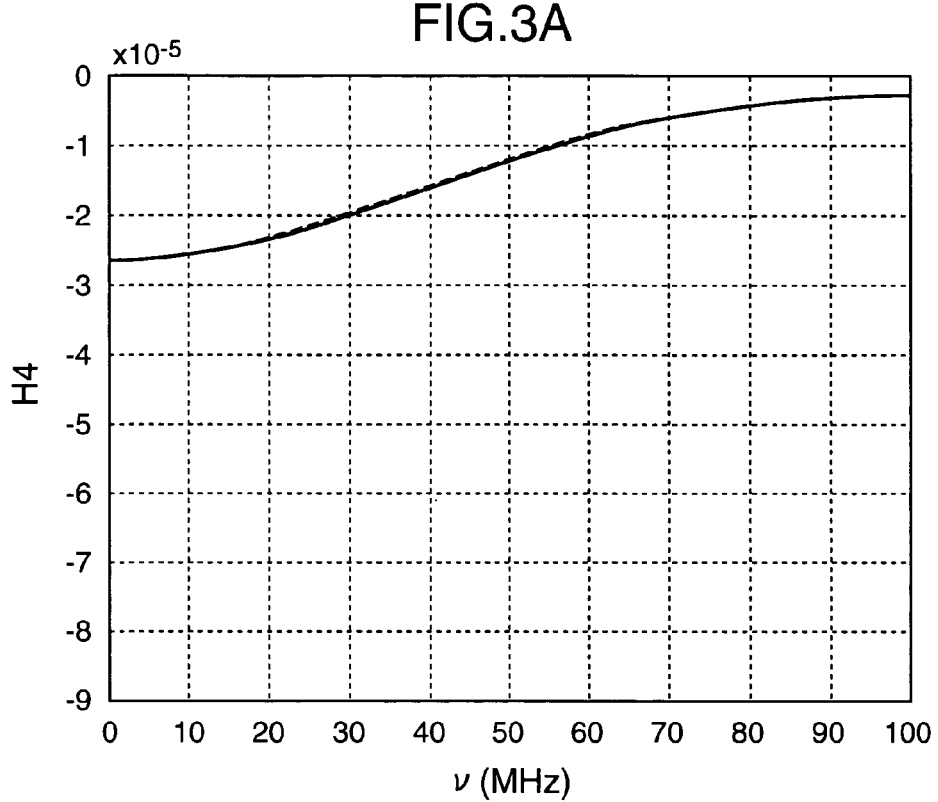
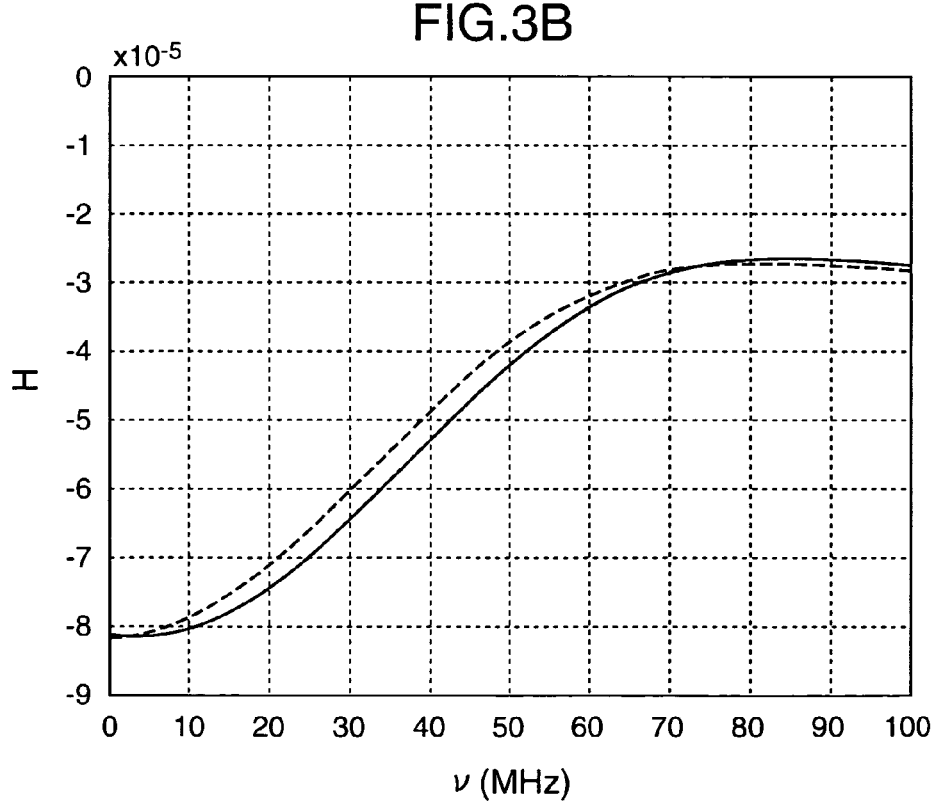

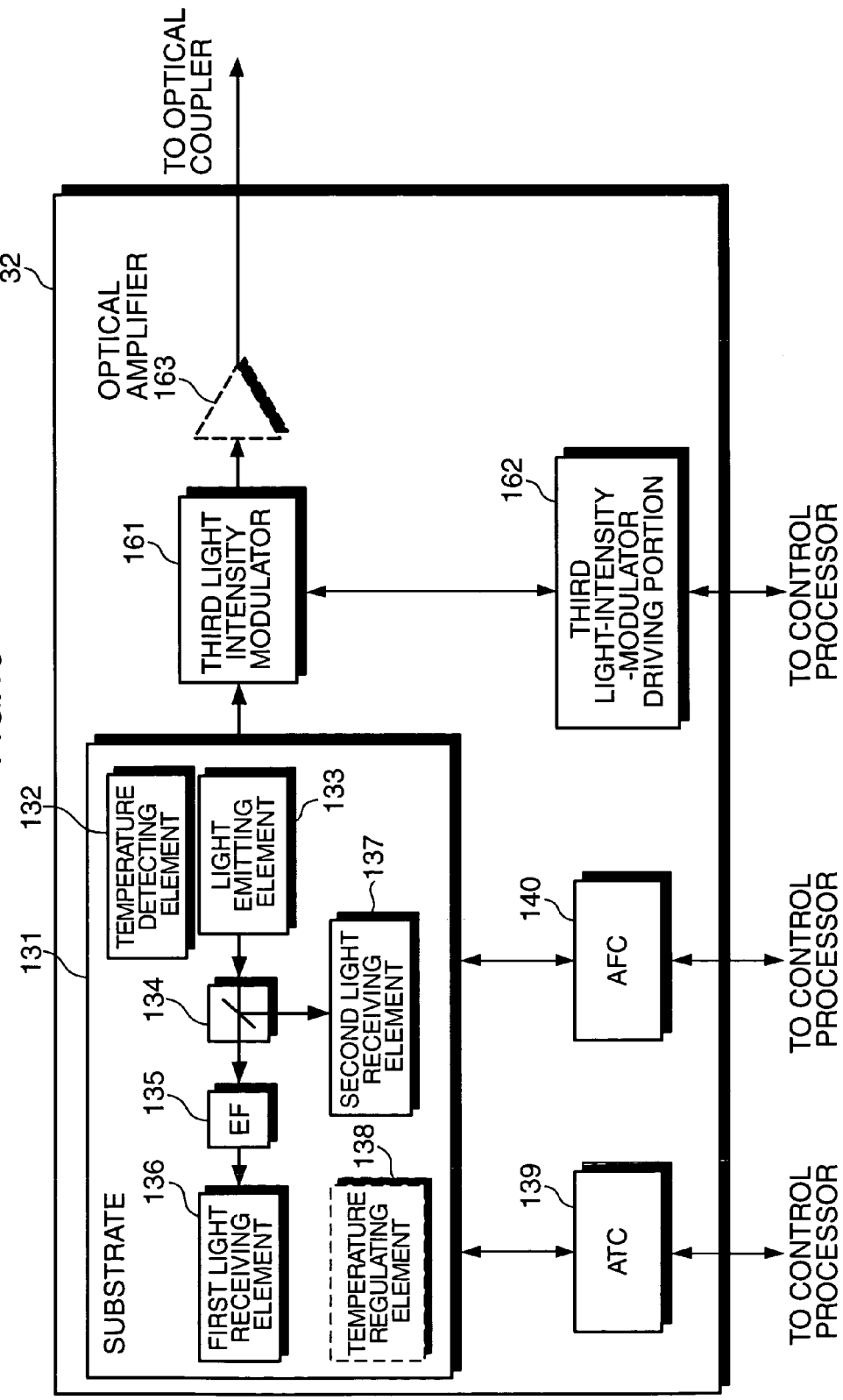

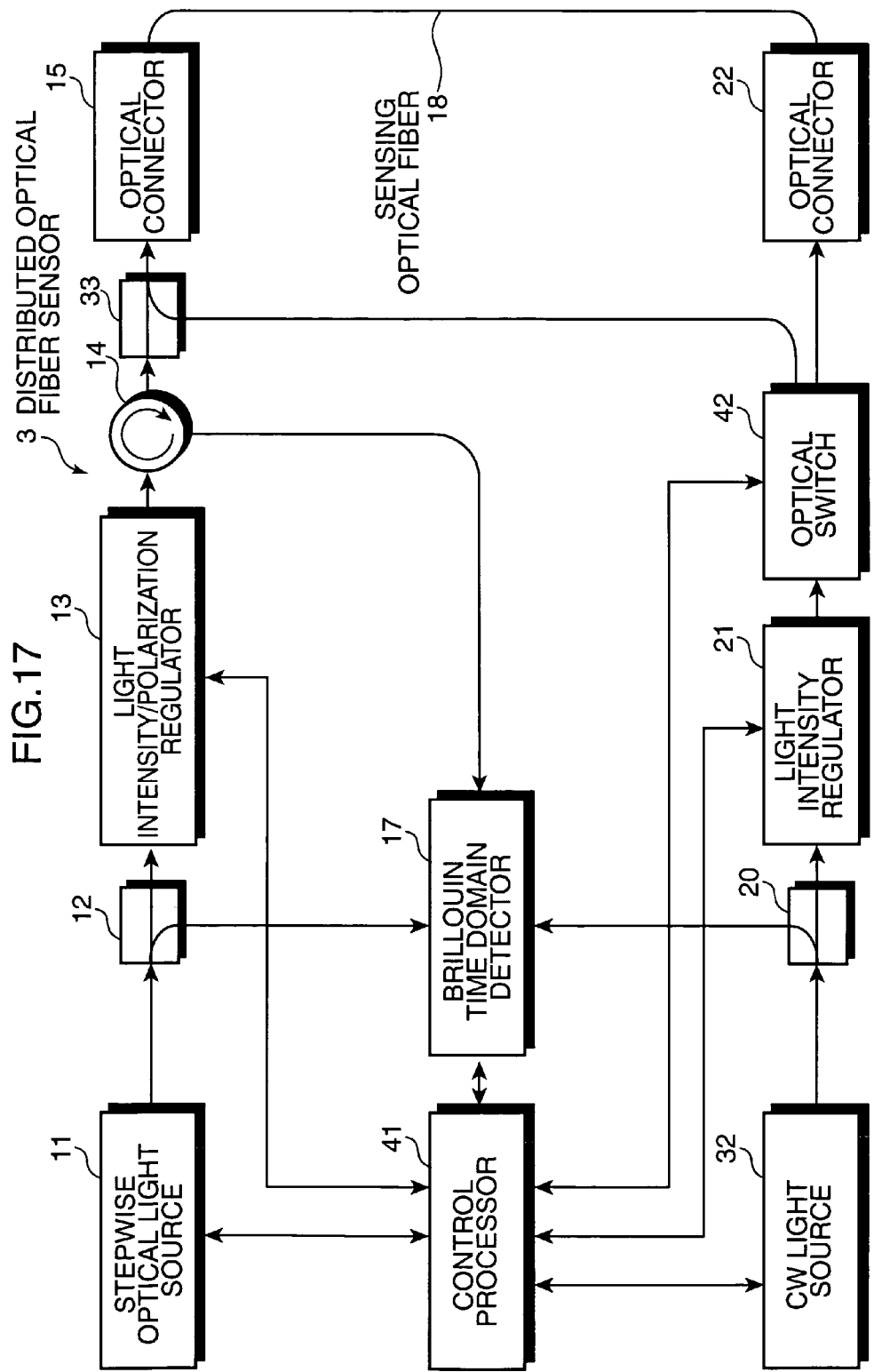

DISTRIBUTED OPTICAL FIBER SENSOR

BACKGROUND OF THE INVENTION

1. Field of the Invention

The present invention relates to a distributed optical fiber sensor capable of measuring strain and/or temperature in longitudinal direction with high accuracy and high spatial resolution using an optical fiber as a sensor.

2. Description of the Related Art

A method based on a Brillouin scattering phenomenon occurring in an optical fiber is known as a technology for measuring strains and temperatures. In this method, the optical fiber is used as a medium for detecting strain and/or temperature in an environment where the optical fiber is placed.

The Brillouin scattering phenomenon is such a phenomenon that, when two light rays having different frequencies pass each other in an optical fiber, power transfers via acoustic phonons in the optical fiber from the light having a higher frequency to the one having a lower frequency. If vd denotes a frequency difference between two light waves passing each other, the transferring power is proportional to a Brillouin gain spectrum BSg(vd) approximately defined by Equation 1:

$$BSg(vd)=1/(1+(2(vd-vb)/\Delta vb)^2) \quad \text{Equation 1}$$

where vb is Brillouin frequency shift and Δvb is called Brillouin gain line width (full width at half maximum), these being parameters characterizing the Brillouin gain spectrum BSg(vd).

The Brillouin frequency shift vb is given by Equation 2:

$$vb=2nva/\lambda \quad \text{Equation 2}$$

where n is refractive index of the optical fiber, va is sound velocity in the optical fiber and λ wavelength of light incident on the optical fiber.

Since the sound velocity va depends on the strain and temperature of the optical fiber, the strain and/or temperature can be measured by measuring the Brillouin frequency shift vb.

Accordingly, Brillouin gain spectra at the respective parts of the optical fiber may be measured in order to measure a strain distribution and/or a temperature distribution of the optical fiber in the longitudinal direction of the optical fiber. In order to attain a high spatial resolution, the lengths of these parts need to be shortened.

FIG. 24 are diagrams showing the construction of a distributed optical fiber sensor and a probe light according to a background art, wherein FIG. 24A is a block diagram showing the construction of the distributed optical fiber sensor according to the background art, FIG. 24B is a chart showing first probe light and FIG. 24C is a chart showing second probe light. FIG. 25 is a chart showing Brillouin loss/gain spectra, wherein horizontal axis represents frequency and vertical axis represents loss/gain.

In FIG. 24, the distributed optical fiber sensor 500 according to the background art is provided with a probe light source 501, an optical coupler 502, a sensing optical fiber 503, a pump light source 504 and a detector 505.

The probe light source 501 generates an optical pulse shown in FIG. 24B and emits the generated optical pulse as probe light. The probe light emitted from the probe light source 501 is incident on one end of the sensing optical fiber 503 via the optical coupler 502. The sensing optical fiber 503 is an optical fiber for detecting strain and/or temperature in an environment where this optical fiber is placed and used as a sensor. The pump light source 504 generates continuous light having a frequency lower than that of the probe light and emits the generated continuous light (CW light) as pump light. The pump light emitted from the pump light source 504 is incident on the other end of the sensing optical fiber 503. In the sensing optical fiber 503, the probe light and the pump light cause a Brillouin scattering phenomenon, and light attributed to this Brillouin scattering phenomenon is incident on the detector 505 via the optical coupler 502. The distributed optical fiber sensor 500 measures the intensity of the light attributed to the Brillouin scattering phenomenon frequency by frequency in a time domain while successively changing the frequency of the pump light or the probe light, determines Brillouin gain spectra BSg(vd) in the respective parts along the longitudinal direction of the sensing optical fiber 503, and determines a strain distribution and/or temperature distribution along the sensing optical fiber 503.

Although the method for determining the strain and/or temperature from the Brillouin gain spectrum BSg(vd) is described above, strain and/or temperature can be similarly determined using a Brillouin loss spectrum BSl(vd) instead of the Brillouin gain spectrum BSg(vd) by setting the frequency of the pump light to be higher than that of the probe light.

The spatial resolution of this distributed optical fiber sensor 500 is restricted by the width of the optical pulse used for the measurement. Specifically, if $v_g$[m/s] denotes velocity of the light in the optical fiber, spatial resolution $\Delta z$ is $v_g Tp/2$ [m] in a measurement using an optical pulse whose width is Tp[s]. More specifically, in normally used ordinary optical fibers in which the velocity of light slightly differs depending on the materials of the optical fibers, a Brillouin gain spectrum BSg(vd) or a Brillouin loss spectrum BLg(vd) (hereinafter, abbreviated as a "Brillouin loss/gain spectrum BSl/g (vd)) is represented by a Lorenz (Lorentzain) curve (curve "a" shown in FIG. 25) up to the optical pulse width of 30 ns. If the optical pulse width is shortened to be below 30 ns, this results in a broadband curve (curve "b" shown in FIG. 25) to lose a peak in the vicinity of a mean frequency, thereby taking a moderate shape. Thus, the spatial resolution Δz becomes about 2 to 3 m. Although the optical pulse having a short width is necessary to improve the spatial resolution, the spectral width of the optical pulse becomes wider in this case, with the result that strain measurement accuracy becomes poor. Therefore, it has been difficult to measure strain and/or temperature distributions with high spatial resolution (of, e.g. 1 m or less) with high accuracy (of, e.g. 200µ∈), and there has been a demand to measure strain and/or temperature distributions with high accuracy and high spatial resolution.

Accordingly, as disclosed, for example, in the following documents 1 to 3, the probe light source 501 causes an optical pulse having a specified light intensity $As^2$ to be incident on the sensing optical fiber 503 while causing continuous light (leakage light) having a weak light intensity $Cs^2$ to be incident thereon as shown in FIG. 24C, whereby the Brillouin loss/gain spectra BSl/g(vd) substantially approximate to Lorenz curves having very steep peaks substantially at mean frequencies so that the mean frequencies can be clearly recognized as shown by the curve "a" in FIG. 25. In this way, it is known to measure strain and/or temperature with high accuracy and high spatial resolution.

Here, the Lorenz curve is generally expressed by Equation 3 that is a Lorenz function g(x):

$$g(x)=1/\pi a/(a^2+(x-a)^2) \quad \text{Equation 3}$$

Document 1

X. Bao and A. Brown, M. DeMerchant, J. Smith, "Characterization of the Brillouin-loss spectrum of single mode fibers by use of very short (<10-ns) pulses", OPTICS LETTERS, Vol. 24, No. 8, Apr. 15, 1999

Document 2

V. Lecoeuche, D. J. Webb, C. N. Pannell and D. A. Jackson, "Transient response in High-resolution Brillouin-based distributed sensing using probe pulses shorter than the acoustic relaxation time", OPTICS LETTERS, Vol. 25, No. 3, Feb. 1, 2000.

Document 3

Shahraam Afshar V., Graham A. Ferrier, Xiaoyi Bao, and Liang Chen, "Effect of the finite extinction ratio of an electro-optic modulator on the performance of distributed probe-pump Brillouin sensor systems", OPTICS LETTERS, Vol. 28, No. 16, Aug. 15, 2003.

Since the setting of the light intensity $Cs^2$ of the leakage light depends on the length of the sensing optical fiber, it has been necessary to manually make a fine adjustment in conformity with the length of the sensing optical fiber every time a measurement is conducted. Thus, if the distributed optical fiber sensor is an industrial product, a user needs to make this difficult manual adjustment, which has hindered the productization of distributed optical fiber sensors as industrial products.

In document 2, authors confirmed the phenomenon disclosed in document 1 by means of simulation, but shed no light in terms of theoretical analysis. Document 2 shed no light on the cause of being able to measure strain and/or temperature with high accuracy and high spatial resolution by causing an optical pulse having a specified light intensity to be incident on the sensing optical fiber while causing continuous light (leakage light) having a weak light intensity to be incident thereon. Thus, it was not clear how physical quantities of the continuous light having the weak light intensity and the optical pulse having the specified light intensity should be adjusted in order to measure strain and/or temperature with high accuracy and high spatial resolution.

Further, with the distributed optical fiber sensor according to the background art, it has been difficult to sense minute strains equal to or below 200µ∈ if strains are equally distributed in a wide range (e.g. 25-fold or more than the set spatial resolution).

SUMMARY OF THE INVENTION

It is an object of the present invention to provide a distributed optical fiber sensor necessitating no manual adjustment of the light intensity of leakage light in conformity with the length of a sensing optical fiber. It is another object thereof to provide a distributed optical fiber sensor capable of sensing minute strains equal to or below 200µ∈ if distributions are equally distributed in a wide range.

According to an aspect of the invention, a distributed optical fiber sensor is adapted for measuring strain and/or temperature utilizing a Brillouin scattering phenomenon. The distributed optical fiber sensor comprises a stepwise optical light source for generating an optical pulse having a stepwise distribution of light intensity to increase toward the center; a continuous light source for generating continuous light; a sensing optical fiber on which the optical pulse is incident as probe light and the continuous light is incident as pump light to thereby cause a Brillouin scattering phenomenon between the probe light and the pump light; and a Brillouin time domain detector for determining a Brillouin loss spectrum or a Brillouin gain spectrum from the light emerging from the sensing optical fiber and attributed to the Brillouin scattering phenomenon, and measuring strain caused in and/or temperature of the sensing optical fiber based on the determined Brillouin loss spectrum or the Brillouin gain spectrum.

These and other objects, features, aspects, and advantages of the present invention will become more apparent from the following detailed description of the preferred embodiments/examples with reference to the accompanying drawings.

BRIEF DESCRIPTION OF THE DRAWINGS

FIG. 3 are graphs showing one example of simulation (No. 2) based on the theoretical analysis.

FIG. 16 is a block diagram showing a construction of a CW light source in the distributed optical fiber sensor of the second embodiment.

FIG. 17 is a block diagram showing a construction of a distributed optical fiber sensor according to a third embodiment.

DETAILED DESCRIPTION OF THE PREFERRED EMBODIMENTS

Figure 1A:
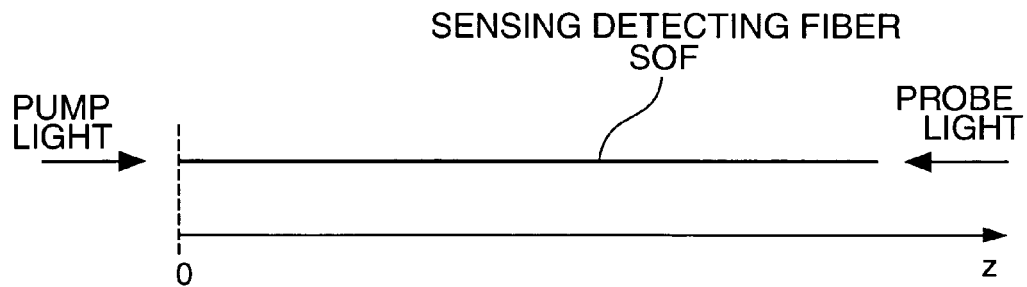
FIG. 1 are charts showing the theoretical analysis of a Brillouin scattering phenomenon in connection with the invention.

First of all, main features of preferred embodiments according to the present invention will be described. A distributed optical fiber sensor is adapted for measuring strain and/or temperature utilizing a Brillouin scattering phenomenon, and comprises a stepwise optical light source for generating an optical pulse having a stepwise distribution of light intensity to increase toward the center; a continuous light source for generating continuous light; a sensing optical fiber on which the optical pulse is incident as probe light and the continuous light is incident as pump light to thereby cause a Brillouin scattering phenomenon between the probe light and the pump light; and a Brillouin time domain detector for determining a Brillouin loss spectrum or a Brillouin gain spectrum from the light emerging from the sensing optical fiber and attributed to the Brillouin scattering phenomenon, and measuring strain caused in and/or temperature of the sensing optical fiber based on the determined Brillouin loss spectrum or the Brillouin gain spectrum.

In the distributed optical fiber sensor, it may be preferable that the probe light is incident on one end of the sensing optical fiber; the pump light is incident on the other end of the sensing optical fiber; and the Brillouin time domain detector determines the Brillouin loss spectrum or the Brillouin gain spectrum from the light emerging from the one end of the sensing optical fiber and attributed to the Brillouin scattering phenomenon and measures strain caused in and/or temperature of the sensing optical fiber based on the determined Brillouin loss spectrum or Brillouin gain spectrum.

In the distributed optical fiber sensor, it may be preferable that the probe light is incident on one end of the sensing optical fiber; the pump light is incident on the other end of the sensing optical fiber; the sensing optical fiber reflects the pump light propagating therein at the other end thereof; and the Brillouin time domain detector determines the Brillouin loss spectrum or the Brillouin gain spectrum from the light emerging from the one end of the sensing optical fiber and attributed to the Brillouin scattering phenomenon and measures strain caused in and/or temperature of the sensing optical fiber based on the determined Brillouin loss spectrum or Brillouin gain spectrum.

In the above distributed optical fiber sensors, the Brillouin loss spectrum or the Brillouin gain spectrum in each longitudinal area section of equal to or shorter than 1 m of the sensing optical fiber from the light emerging from the sensing optical fiber and attributed to the Brillouin scattering phenomenon may be substantially represented by a Lorenz curve.

The above distributed optical fiber sensors may further comprise a light intensity/polarization regulator for regulating the light intensity of incident light and randomly changing a plane of polarization of the incident light; and a light intensity regulator for regulating the light intensity of the incident light. The probe light is incident on the sensing optical fiber via the light intensity-polarization regulator and the pump light is incident on the sensing optical fiber via the light intensity regulator.

In the above distributed optical fiber sensors, each of the stepwise optical light source and the continuous light source may include a light emitting element for continuously emitting light having a narrow line width, a specified frequency and a substantially constant light intensity; a temperature controller for keeping the temperature of the light emitting element substantially at a constant temperature; and a frequency controller for keeping the frequency of the light emitted from the light emitting element substantially at a constant frequency.

In the above distributed optical fiber sensors, the stepwise optical light source may include light emitting element for continuously emitting light having a narrow line width, a specified frequency and a substantially constant first light intensity; a first and a second light intensity modulators for modulating the light intensity of incident light; a first light-intensity-modulator driving portion for driving the first light intensity modulator to modulate the light intensity of the light continuously emitted from the light emitting element so that an optical pulse having the first light intensity exists in continuous light having a second light intensity lower than the first light intensity; and a second light-intensity-modulator driving portion for driving the second light intensity modulator to modulate the light intensity of the light incident from the first light intensity modulator so that the remaining light is eliminated while leaving continuous lights having the second light intensity over specified widths before and after the optical pulse.

In the above distributed optical fiber sensors, it may be preferable that the stepwise optical light source generates a first optical pulse having a stepwise distribution of light intensity to increase toward the center and a second optical pulse having the same time width as the first optical pulse and the same light intensity as the lowest light intensity of the first optical pulse; and the Brillouin time domain detector causes the stepwise optical light source to generate the second optical pulse and emit it as probe light to the sensing optical fiber and causes the continuous light source to generate the continuous light and emit it as pump light to the sensing optical fiber, thereby storing a first light intensity of the light emerging from the sensing optical fiber and attributed to the Brillouin scattering phenomenon, causes the stepwise optical light source to generate the first optical pulse and emit it as probe light to the sensing optical fiber and causes the continuous light source to generate the continuous light and emit it as pump light to the sensing optical fiber, thereby storing a second light intensity of the light emerging from the sensing optical fiber and attributed to the Brillouin scattering phenomenon, determines the Brillouin loss spectrum or the Brillouin gain spectrum based on the stored first and second light intensities, and measures strain caused in and/or temperature of the sensing optical fiber based on the determined Brillouin loss spectrum or Brillouin gain spectrum.

The above distributed optical fiber sensors may further comprise a reference optical fiber made of the same material as the sensing optical fiber, having a length corresponding to spatial resolution, and having a strain larger than the one expressed by an inverse of the time width of the optical pulse, wherein the Brillouin time domain detector causes the stepwise optical light source to generate the optical pulse and emit it as probe light to the reference optical fiber and causes the continuous light source to generate the continuous light and emit it as pump light to the reference optical fiber, determines the mean frequency of the Brillouin loss spectrum or the Brillouin gain spectrum from the light emerging from the reference optical fiber and attributed to the Brillouin scattering phenomenon, stores the determined mean frequency as a reference value, determines the mean frequency of the Brillouin loss spectrum or the Brillouin gain spectrum from the light emerging from the sensing optical fiber and attributed to the Brillouin scattering phenomenon as a detection value, calculates a correction value from the reference value, the detection value and the Brillouin loss spectrum or the Brillouin gain spectrum in accordance with a correction-value conversion equation stored beforehand, and measures strain caused in and/or temperature of the sensing optical fiber from the calculated correction value.

Further, in order to enable the detection of minute strains of 200µε or smaller in the case where strains are equally distributed in a wide range, the sensing optical fiber may be an optical fiber in which a Brillouin frequency shift amount cyclically changes in the above distributed optical fiber sensors.

Further, in the above distributed optical fiber sensors, the sensing optical fiber may be fixed to a measurement object whose strain and/or temperature are to be measured.

In the distributed optical fiber sensor constructed as above, an optical pulse having a stepwise distribution of light intensity to increase toward the center (hereinafter, referred to as an "intensity-stepwise optical pulse") is used as probe light. Thus, section(s) having a weak light intensity corresponding to the leakage light of the background art exist(s) only in a limited section before a section having the highest light intensity or only in both a limited section before the section having the highest light intensity and a limited section after the section having the highest light intensity, whereby there is no continuous leakage light as in the background art. As a result, the waveform of the intensity-stepwise optical pulse can be set beforehand, wherefore it is not necessary unlike the background art to manually adjust the light intensity $Cs^2$ of the leakage light of the probe light (optical pulse) in conformity with the length of the sensing optical fiber every time a measurement is conducted. Therefore, the distributed optical fiber sensor can be produced as an industrial product.

Hereinafter, a logic analysis of the Brillouin scattering phenomenon in the case where the intensity-stepwise optical pulse is used as probe light is described with reference to FIGS. 1 to 3 and the waveform of the intensity-stepwise optical pulse is described with reference to FIGS. 4 and 5.

Figure 1B:
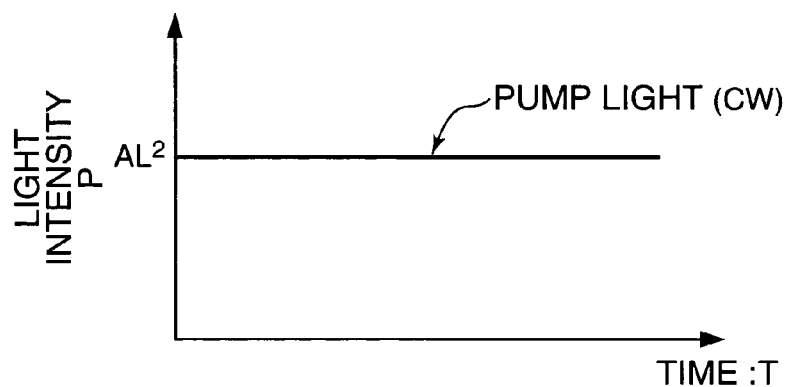
Figure 1C:
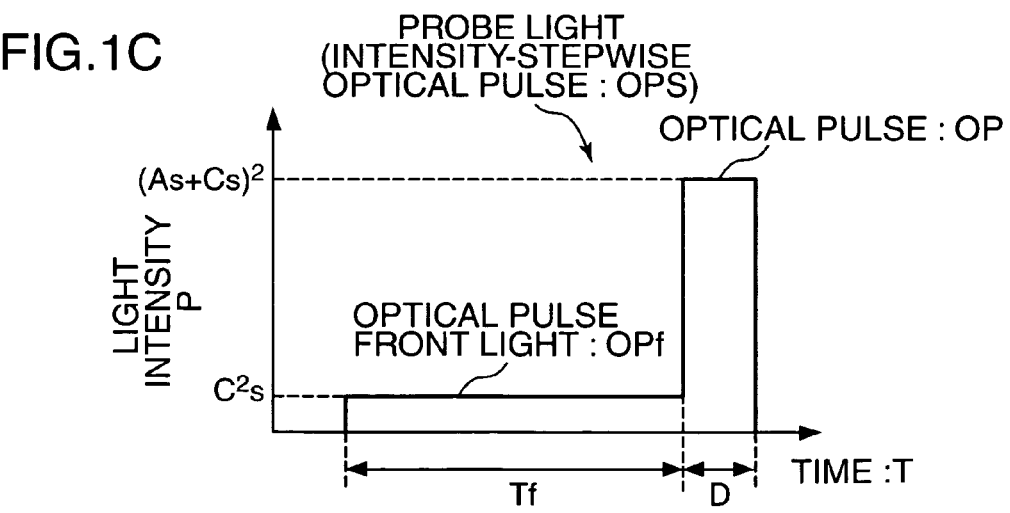

FIG. 1 are graphs showing the logic analysis of the Brillouin scattering phenomenon, wherein FIG. 1A shows a measurement system in the logic analysis of the Brillouin scattering phenomenon, FIG. 1B shows a pump light and FIG. 1C shows a probe light. FIG. 2 are graphs showing one example of simulation based on the logic analysis (No. 1). FIG. 3 are graphs showing one example of simulation based on the logic analysis (No. 2). FIG. 4 is a graph showing the waveform of an intensity-stepwise optical pulse. FIG. 5 is a graph showing a simulation of H2/(H1+H3+H4) in relation to a ratio Prx based on the logic analysis.

First, the logic analysis is described. In FIG. 1, this logic analysis is for deriving a Brillouin loss spectrum in the case where a pump light in the form of a continuous light (CW) having a light intensity $AL^2$ is incident on one end of a sensing optical fiber SOF, an intensity-stepwise optical pulse OPs comprised of an optical pulse front light OPf having a time width Tf and a light intensity $Cs^2$ and an optical pulse OP having a pulse width D and a light intensity $(As+Cs)^2$ is incident as probe light on the other end of the sensing optical fiber SOF. The light intensity $As^2$ is a light intensity on the basis of the light intensity $Cs^2$ of the optical pulse front light OPf.

Here, in this specification, a continuous leakage light left to have a specified time width Tf before the optical pulse OP of the intensity-stepwise optical pulse OPs is referred to as the optical pulse front light OPf, whereas a continuous leakage light left to have a specified time width Tb after the optical pulse OP of the intensity-stepwise optical pulse OPs is referred to as the optical pulse back light OPb.

In this logic analysis, if it is assumed that L denotes the length of the sensing optical fiber SOF, z denotes a position coordinate in the longitudinal direction of the sensing optical fiber SOF ($0 \leq z \leq L$: origin is one end of the sensing optical fiber SOF) and t denotes a time coordinate, Brillouin scattering equations in the case where the sensing optical fiber is strained are expressed by Equations 4 to 6.

$$\left(\frac{1}{v_g}\frac{\partial}{\partial t} + \frac{\partial}{\partial z}\right)E_L = i\beta E_A E_S \quad \text{Equation 4}$$

$$\left(\frac{1}{v}\frac{\partial}{\partial t} - \frac{\partial}{\partial z}\right)E_S = i\beta E_A^* E_L \quad \text{Equation 5}$$

$$\left(\frac{1}{\Gamma}\frac{\partial}{\partial t} + 1 + i\frac{\Omega_B(z)-\Omega}{\Gamma}\right)E_A = iE_L E_S^* \quad \text{Equation 6}$$

Here, $v_g$ denotes velocity of a group of lights in the sensing optical fiber SOF ($v_g$=c/n where c: light velocity and n: refractive index of the sensing optical fiber SOF), $E_L$ denotes electric field intensity of a pump light, $E_S$ denotes electric field intensity of a Stokes light, $E_A$ is $\Gamma \times \rho/\Lambda$ and * denotes conjugation, where $\Gamma$ denotes $\Gamma_B/2$, $\rho$ denotes density of the sensing optical fiber, and $\Lambda$ is $(\gamma \times q \times q)/(16 \times \pi \times \Omega)$. $\Gamma_B = 1/\tau_B$ if $\tau_B$ denotes the life of an acoustic phonon. $\gamma$ is called electrostrictive coupling constant and $\gamma = \rho(\delta \in/\delta \rho)$ if $\in$ denotes dielectric constant. If $k_L$, $k_S$ denote wavenumber of the pump light and that of the Stokes light, $q = k_L + k_S$. $\Omega$ denotes Brillouin angular frequency shift in the case where there is no strain, and $\Omega = \omega_L - \omega_S$ if $\omega_L$, $\omega_S$ denote angular frequency of the pump light and that of the Stokes light, respectively. $\Omega_B$ denotes Brillouin angular frequency shift in the case where there is a certain strain, and $\Omega_B = \omega_{BL} - \omega_{BS}$ if $\omega_{BL}$, $\omega_{BS}$ denote angular frequency of the pump light and that of the Stokes light, respectively. i is complex unit and i×i=−1. $\beta = \kappa \times \Lambda/\Gamma$, where $\kappa = (\gamma \times \omega_L)/(4 \times \rho_0 \times n \times c) \approx (\gamma \times \omega_S)/(4 \times \rho_0 \times n \times c)$. $\rho_0$ is an average value of the densities of the sensing optical fiber. If gSBS denotes gain coefficient of stimulated Brillouin scattering (SBS), gSBS=$16 \times \pi \times \beta/(n \times c)$. gSBS=$2.5 \times 10^{-11}$ m/W is disclosed, for example, in document 4.

Document 4

A. L. Gaeta and R. W. Boyd, "Stochastic dynamics of stimulated Brillouin scattering in an optical fiber", Physical Review A, Vol. 44, no. 5, 1991, pp 3205-3209.

Equation 4 relates to the pump light, Equation 5 relates to the probe light and Equation 6 relates to the life of the acoustic phonon. Equations 7 to 11 can be obtained if Brillouin loss $V(t, \Omega)$ is obtained as an approximate solution by solving these Equations 4 to 6.

$$H_1 = A_S^2 \int_{v_g(t-T_f-D)/2}^{v_g(t-T_f)/2} \int_0^{t-T_f-2\zeta/v_g} h^c(\zeta, s) ds d\zeta \quad \text{Equation 8}$$

-continued $$H_2 = A_S C_S \int_{v_g(t-T_f-D)/2}^{v_g(t-T_f)/2} \int_0^{t-2\zeta/v_g} h^c(\zeta, s) ds d\zeta \quad \text{Equation 9}$$

$$H_3 = A_S C_S \int_{v_g(t-T_f-D)/2}^{v_g(t-T_f)/2} \int_0^{t-T_f-2\zeta/v_g} h^c(\zeta, s) ds d\zeta \quad \text{Equation 10}$$

$$H_4 = C_S^2 \int_{v_g(t-T_f-D)/2}^{v_g t/2} \int_0^{t-2\zeta/v_g} h^c(\zeta, s) ds d\zeta \quad \text{Equation 11}$$

Here, $\xi$, s, c.c denote position of the sensing optical fiber in the longitudinal direction, time, and a constant, respectively. If LL denotes the entire length of the sensing optical fiber, $h(z,s)=\Gamma\times e^{-(\Gamma+i(\Omega B(z)-\Omega))}$ at position z and time s and $h^c(\xi,s)=h(z,s)=h((LL-\xi),s)$.

H1 given by Equation 8 denotes a Brillouin loss spectrum based on an acoustic phonon excited by the optical pulse OP and the pump light. H2 given by Equation 9 denotes a Brillouin loss spectrum based on an acoustic phonon excited by the optical pulse front light OPf and the pump light and further by the optical pulse OP and the pump light. H3 given by Equation 10 denotes a Brillouin spectrum based on an acoustic phonon excited by the optical pulse OP and the pump light and further by the optical pulse front light OPf and the pump light. H4 given by Equation 11 denotes a Brillouin loss spectrum based on an acoustic phonon excited by the optical pulse front light OPf and the pump light.

Figure 2A:
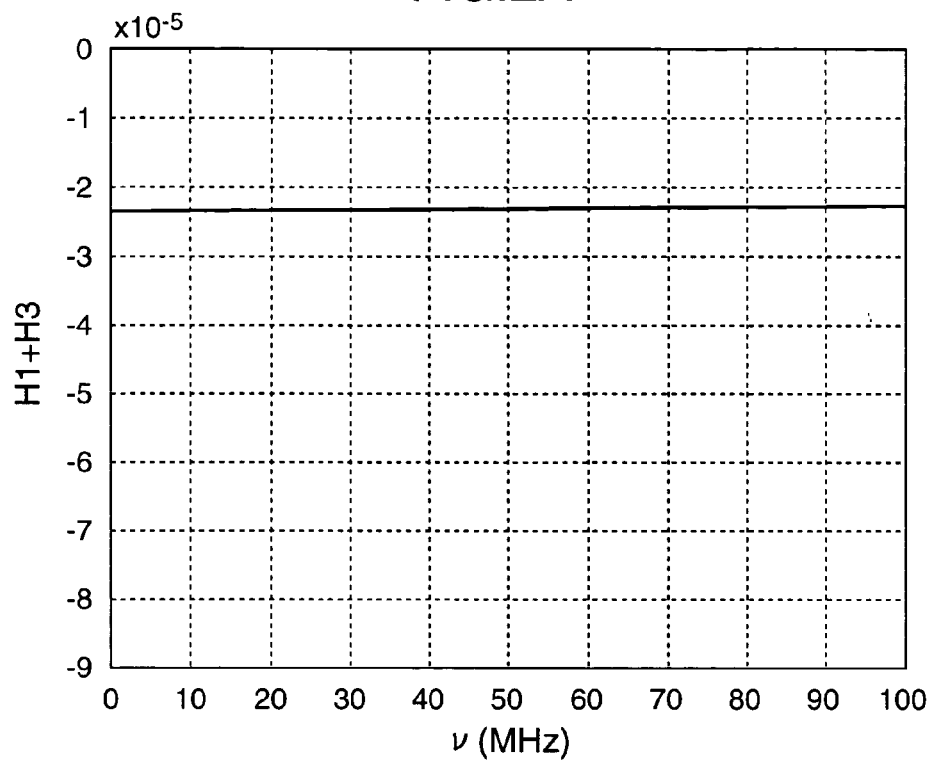
FIG. 2 are graphs showing one example of simulation (No. 1) based on the theoretical analysis.
Figure 2B:
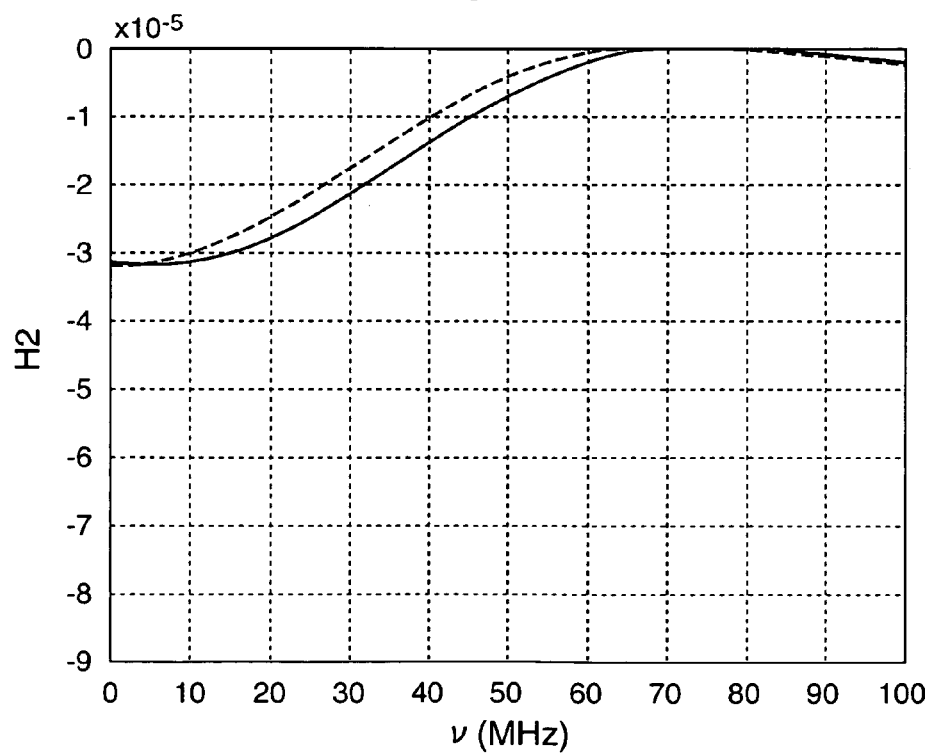

As an example, assuming that the time width of the intensity-stepwise optical pulse OPs is 14 ns, the time width D of the optical pulse OP is 1 ns, $10\times\log((A_S+C_S)^2/C_S^2)$ is 20 dB, the results of simulations to H1+H3, H2 and H4 at 3.05 m-0.2 m, 3.05 m, 3.05 m+0.2 m are shown in FIGS. 2 and 3 for a case where a strain of $100\mu\in$ occurs at a position, 3.05 m, of a sensing optical fiber SOF (fiber taken from a bundle and having the entire length of 10 m and no strain) and there are no strains at positions, 3.05 m0.2 m. FIG. 2A shows the case of H1+H3; FIG. 2B shows the case of H2; FIG. 3A shows the case of H4; and FIG. 3B shows the case of H (=H1+H2+H3+H4). In each figure, horizontal axis represents frequency, solid line represents a case where there is a strain of $100\mu\in$, and broken line represents a case where there is no strain. Each figure shows only the right half of the Brillouin loss spectrum because the Brillouin loss spectrum is transversely symmetrical with respect to a mean frequency (frequency at the peak of the Brillouin loss spectrum) as a central axis. In other words, vertical axis represents the mean frequency and is the central axis in each figure. It can be understood from FIG. 2 that only the component of H2 notably shows a Brillouin frequency shift.

As can be understood from Equations 7 to 11, it is difficult to obtain information on local strain from H3 and H4 since energy is transferred from the probe light to the pump light over a wide range in H3 and H4. On the other hand, it is easy to obtain information on local strain from H1 and H2 since energy is locally transferred from the probe light to the pump light. According to the simulation results, H3 is smaller than other H1, H2 and H4 by one digit, and the full width at half minimum of H1 reaches about 1 GHz as can be seen, for example, from FIG. 2A. Therefore, as compared to H2, H1 is a broader spectrum curve and it is difficult to find the mean frequency.

Accordingly, by such setting as to enable the detection of H2, strain and/or temperature can be detected with high accuracy and high spatial resolution using an optical pulse having a short pulse width.

Next, the waveform of the intensity-stepwise optical pulse OPs capable of detecting this H2 is described.

Figure 4:
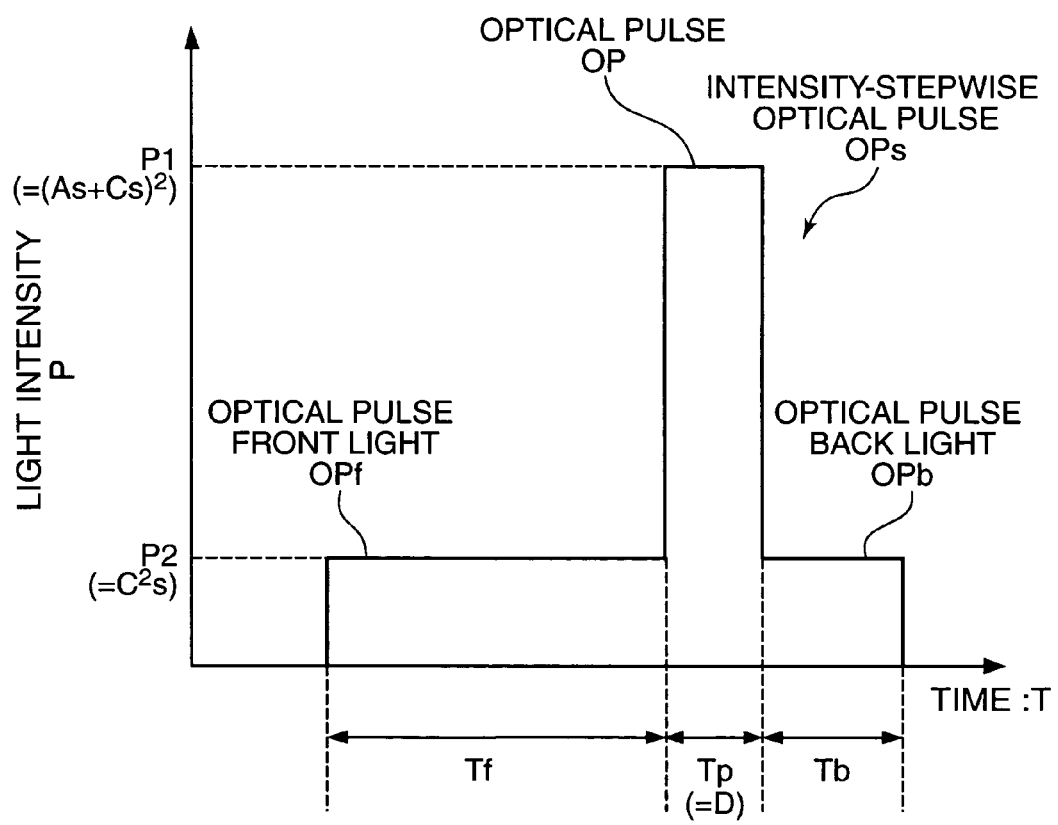
FIG. 4 is a chart showing the waveform of an intensity-stepwise optical pulse.

Since the probe light does not require the setting of the waveform in advance and an adjustment in conformity with the length of the sensing optical fiber, it needs to be, for example, the intensity-stepwise optical pulse OPs shown in FIG. 4.

Here in this specification, a continuous leakage light left to have a specified time width Tf before the optical pulse OP of the intensity-stepwise optical pulse OPs is referred to as the optical pulse front light OPf of the intensity-stepwise optical pulse, and a continuous leakage light left to have a specified time width Tb behind the optical pulse OP of the intensity-stepwise optical pulse OPs is referred to as the optical pulse back light OPb.

In order to specify the waveform of this intensity-stepwise optical pulse OPs, it is necessary to specify the time width Tf of the optical pulse front light OPf, a pulse width (time width) Tp of the optical pulse OP, the time width Tb of the optical pulse back light OPb, a light intensity P1 of the optical pulse OP and a light intensity P2 of the optical pulse front light OPf (light intensity P2 of the optical pulse back light OPb).

First, the time width Tf of the optical pulse front light OPf, the pulse width Tp of the optical pulse OP and the time width Tb of the optical pulse back light OPb are described.

The time width Tf of the optical pulse front light OPf may be Tp<Tf≦(1/35 MHz)=28.57 ns since the full width at half minimum of a Brillouin scattering spectrum is about 35 MHz if an acoustic phonon rises to 90% in accordance with the rise time thereof in the case where a single mode optical fiber for 1300 nm or a single mode optical fiber for 1550 nm generally used at present is, for example, used as the sensing optical fiber SOF.

If the time width Tf of the optical pulse front light OPf becomes longer (Tf>28.57 ns), the shape of the Brillouin loss/gain spectrum BSl/g(vd) better approximates to a Lorenz curve, wherefore the value of the Brillouin frequency shift can be more accurately obtained to detect strain and/or temperature with higher accuracy. On the other hand, since the information of Brillouin frequency shifts around a specified position is mixed into a Brillouin frequency shift at the certain position of the sensing optical fiber SOF, the SNR (signal to noise ratio) of the Brillouin frequency shift at this certain position becomes poorer, with the result that strain and/or temperature at this certain position are detected with lower accuracy. In this way, the extension of the time width Tf of the optical pulse front light OPf acts both to improve and to lower the detection accuracy of strain and/or temperature.

The pulse width Tp of the optical pulse OP may be 10 ns≧Tp>0 in order to obtain a high spatial resolution of 1 mm or less. The time width Tb of the optical pulse back light OPb is Tb<Tf and the shorter, the better. The time width Tb may be 0.

Figure 24A:
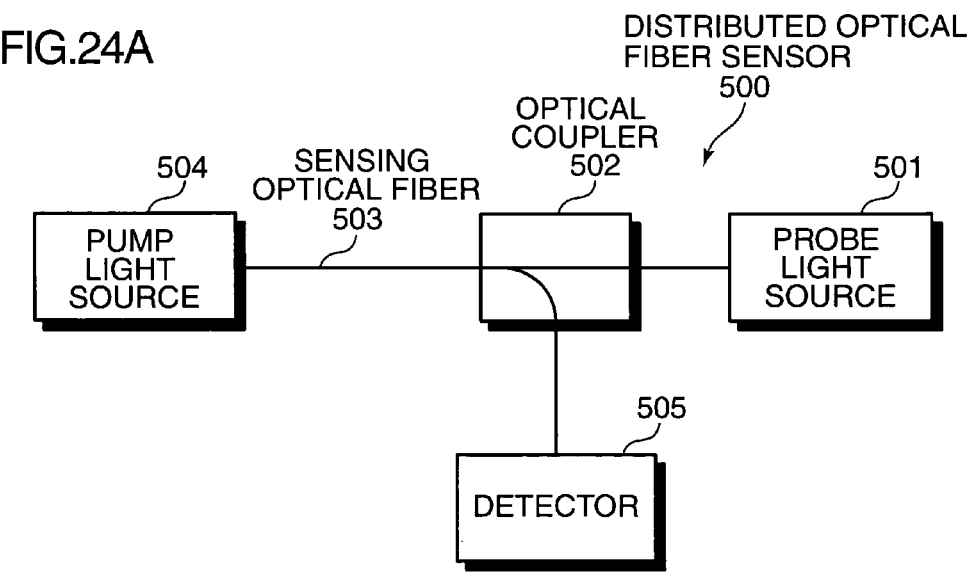
FIG. 24 are a diagram showing a construction of a distributed optical fiber sensor according to a background art and charts showing probe lights.
Figure 24B:
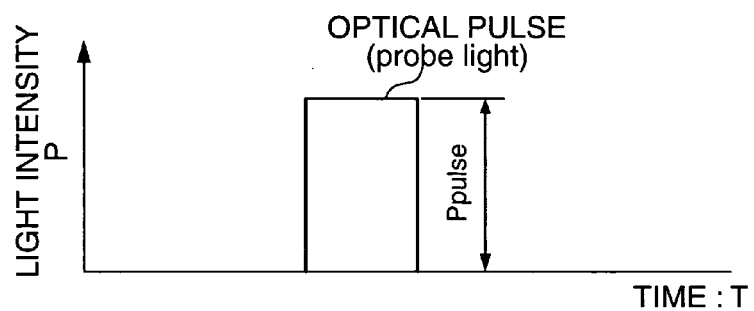
Figure 24C:
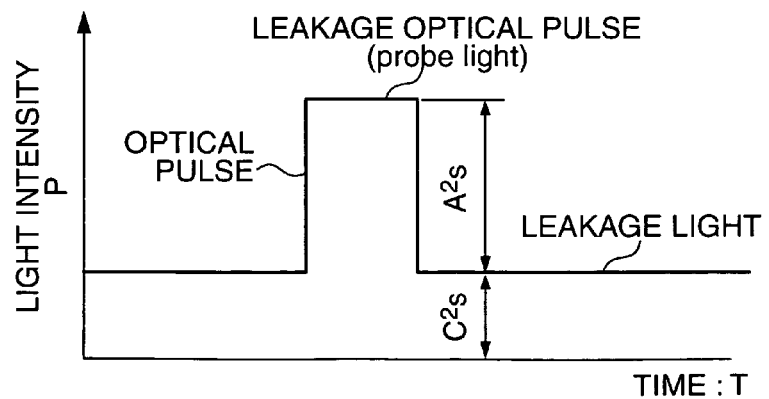
Figure 25:
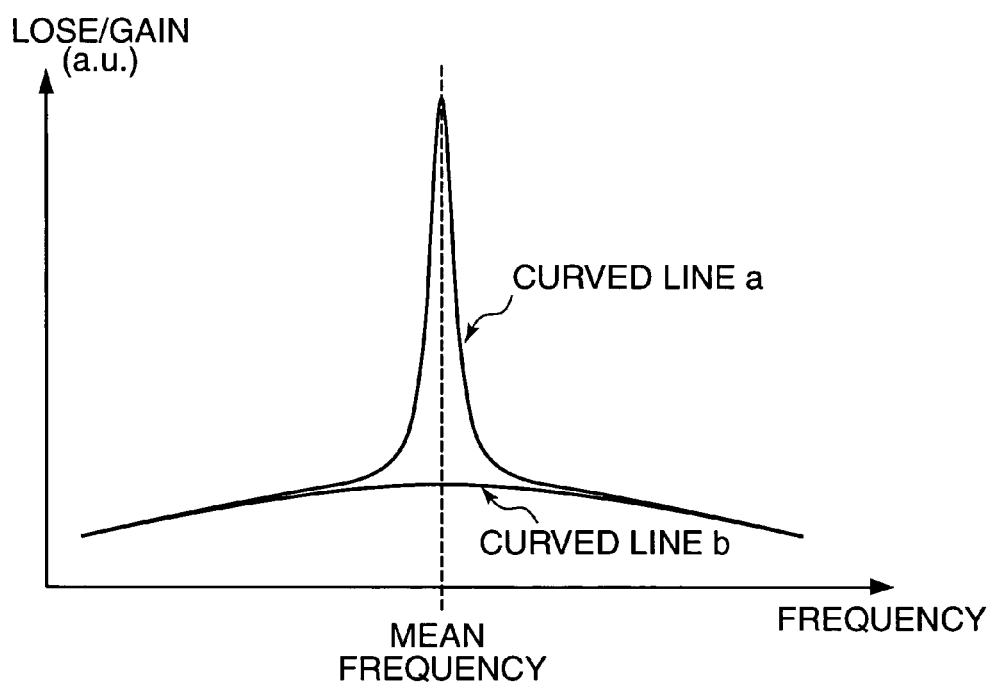
FIG. 25 is a chart showing Brillouin loss/gain spectra.

The intensity-stepwise optical pulse OPs needs to be present in the waveform of FIG. 4, not in the one of FIG. 24C in the sensing optical fiber SOF. To this end, the time width Tf of the optical pulse front light OPf, the time width Tp of the optical pulse OP and the time width Tb of the optical pulse back light OPb are determined within the aforementioned ranges, and the minimum length of the sensing optical fiber SOF in which the intensity-stepwise optical pulse OPs having these determined time widths is present in the waveform of FIG. 4 is specified. Accordingly, it is no longer necessary, unlike the background art, to manually adjust the probe light in conformity with the length of the sensing optical fiber SOF every time a measurement is conducted by using an optical fiber having a length equal to or longer than the specified minimum length.

Next, the light intensity P1 of the optical pulse OP and the light intensity P2 of the optical pulse front light OPf (light intensity P2 of the optical pulse back light OPb) are described.

Here, a ratio Prx of the light intensity P1 of the optical pulse OP to the light intensity P2 of the optical pulse front light OPf is defined by Equation 12.

$$Prx = 10 \times \log(P1/P2)$$
$$= 10 \times \log((As + Cs)^2 / Cs^2)$$

Equation 12

In order to check a condition to easily detect the aforementioned H2, H2/(H1+H3+H4) in relation to the ratio Prx defined by Equation 12 was simulated. It should be noted that H2/(H1+H3+H4) was calculated using peak values of H1, H2, H3 and H4. As an example, a simulation result based on a logic analysis in the case of using the intensity-stepwise optical pulse OPs in which the time width Tf of the optical pulse front light OPf is 11 ns, the time width Tp of the optical pulse OP is 1 ns and the time width Tb of the optical pulse back light OPb is 0 ns is shown in FIG. 5. Horizontal axis of FIG. 5 represents the ratio Prx shown in unit dB and vertical axis thereof represents H2/(H1+H3+H4). It should be noted that the simulation was conducted, assuming that a strain of 100µ∈ occurred at a position, 3.05 m, of a sensing optical fiber SOF (fiber taken from a bundle and having the entire length of 10 m and no strain) and no strain was occurring at positions, 3.05±0.2 m.

Figure 5:
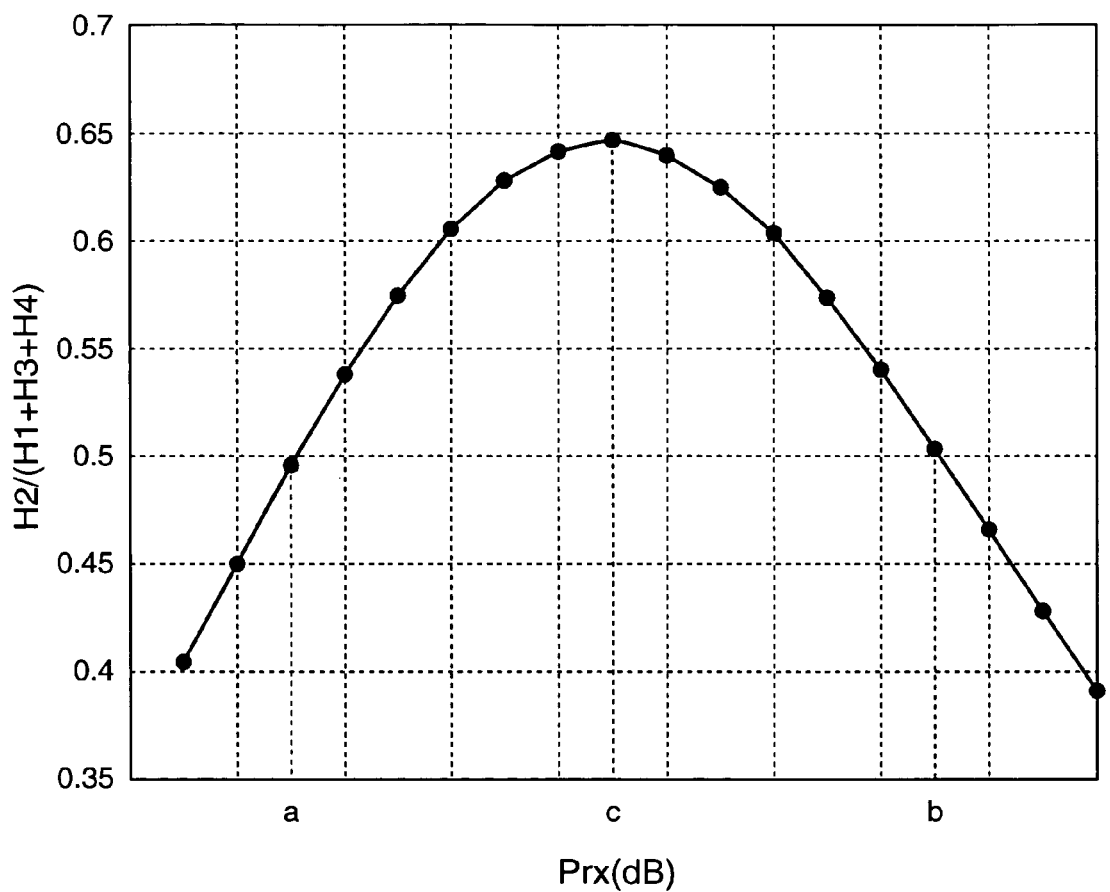
FIG. 5 is a graph showing a simulation of H2/(H1+H3+H4) in relation to ratio Prx based on the theoretical analysis.

As can be seen from FIG. 5, a curve representing H2/(H1+H3+H4) in relation to the ratio Prx is a convex high-order curve having a peak at a specified value of the ratio Prx. Since H2/(H1+H3+H4) may be 0.5 or larger for the detection of H2, a range of Prx (a≦ratio Prx≦b) where H2/(H1+H3+H4) is 0.5 or larger can be determined by obtaining such a curve. For the detection of H2 with highest accuracy, the ratio Prx may be set at a value (ratio Prx=c) where H2/(H1+H3+H4) reaches a highest value, i.e. a peak.

Accordingly, in the case of using the intensity-stepwise optical pulse OPs having the respective time widths set as above, the ratio Prx of the intensity-stepwise optical pulse OPs may be set within the range where H2/(H1+H3+H4) is about 0.5 or larger for the detection of strain and/or temperature with high accuracy and high spatial resolution and may be set at the value where H2/(H1+H3+H4) reaches the peak for the detection of strain and/or temperature with highest accuracy and highest spatial resolution.

From the above description, it can be understood to determine the respective time widths Tf, Tp, Tb of the intensity-stepwise optical pulse OPs within the aforementioned ranges, to simulate H2/(H1+H3+H4) in relation to the ratio Prx defined by Equation 12 in the intensity-stepwise optical pulse OPs having these determined time widths Tf, Tp, Tb in accordance with Equations 8 to 11, and to set the ratio Prx of the intensity-stepwise optical pulse at such a value where H2/(H1+H3+H4) is 0.5 or larger, particularly at a value where H2/(H1+H3+H4) reaches the peak in order to detect strain and/or temperature with high accuracy and high spatial resolution and to detect a change of a minute strain. Further, the usable minimum length of the sensing optical fiber SOF can be specified based on the intensity-stepwise optical pulse OPs having the determined time widths Tf, Tp, Tb.

Next, embodiments of the present invention are described with reference to the accompanying drawings in more details. In the respective drawings, the same constructions are identified by the same reference numerals and are not repeatedly described.

First Embodiment

A distributed optical fiber sensor according to a first embodiment of the present invention is for detecting a strain and/or temperature distribution based on a Brillouin frequency shift by causing an intensity-stepwise optical pulse as probe light to be incident on one end of a sensing optical fiber for detecting strain and/or temperature and causing a continuous light as pump light to be incident on the other end of this sensing optical fiber to receive light attributed to a Brillouin scattering phenomenon occurred in the sensing optical fiber, and by conducting a Brillouin gain spectrum time domain analysis ($B^{Gain}$-OTDA) or a Brillouin loss spectrum time domain analysis ($B^{Loss}$-OTDA). Hereinafter, the Brillouin gain spectrum time domain analysis and the Brillouin loss spectrum time domain analysis are abbreviated as Brillouin loss/gain spectrum time domain analyses. In this Brillouin loss/gain spectrum time domain analysis, the light attributed to the Brillouin scattering phenomenon is light subjected to Brillouin attenuation/amplification.

Figure 6:
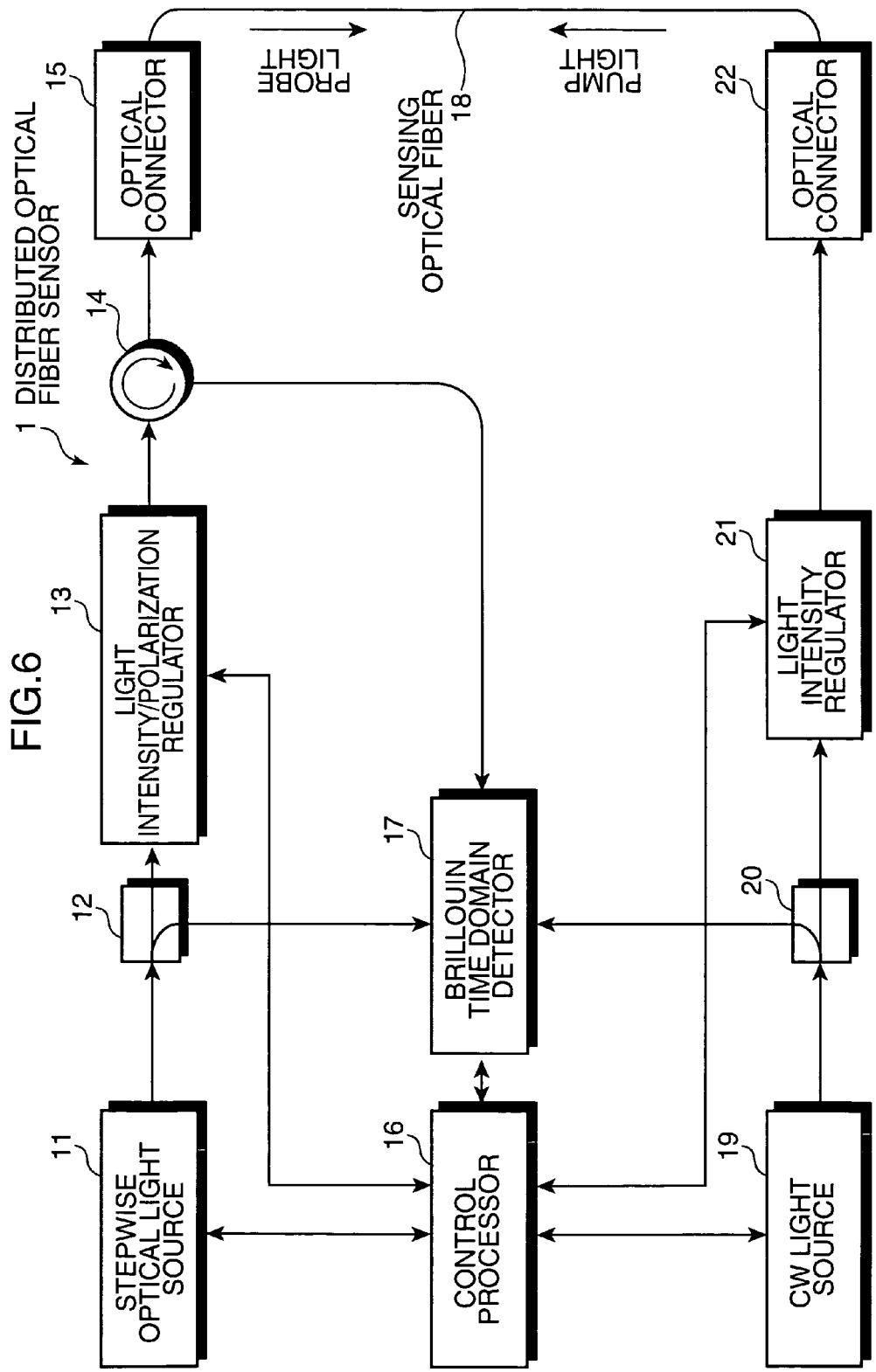
FIG. 6 is a block diagram showing a construction of a distributed optical fiber sensor according to a first embodiment.
Figure 7:
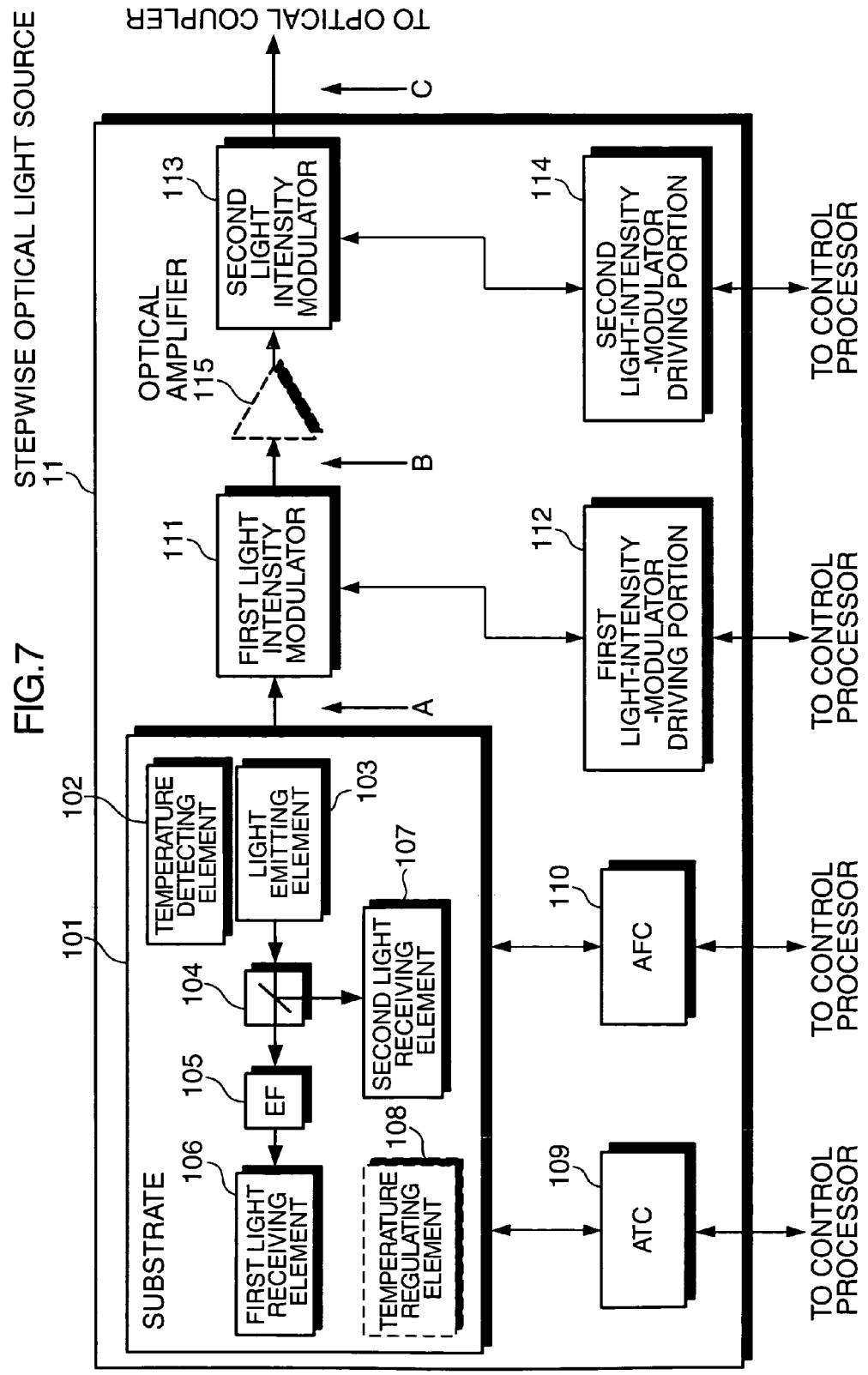
FIG. 7 is a block diagram showing a construction of a stepwise optical light source in the distributed optical fiber sensor.
Figure 8:
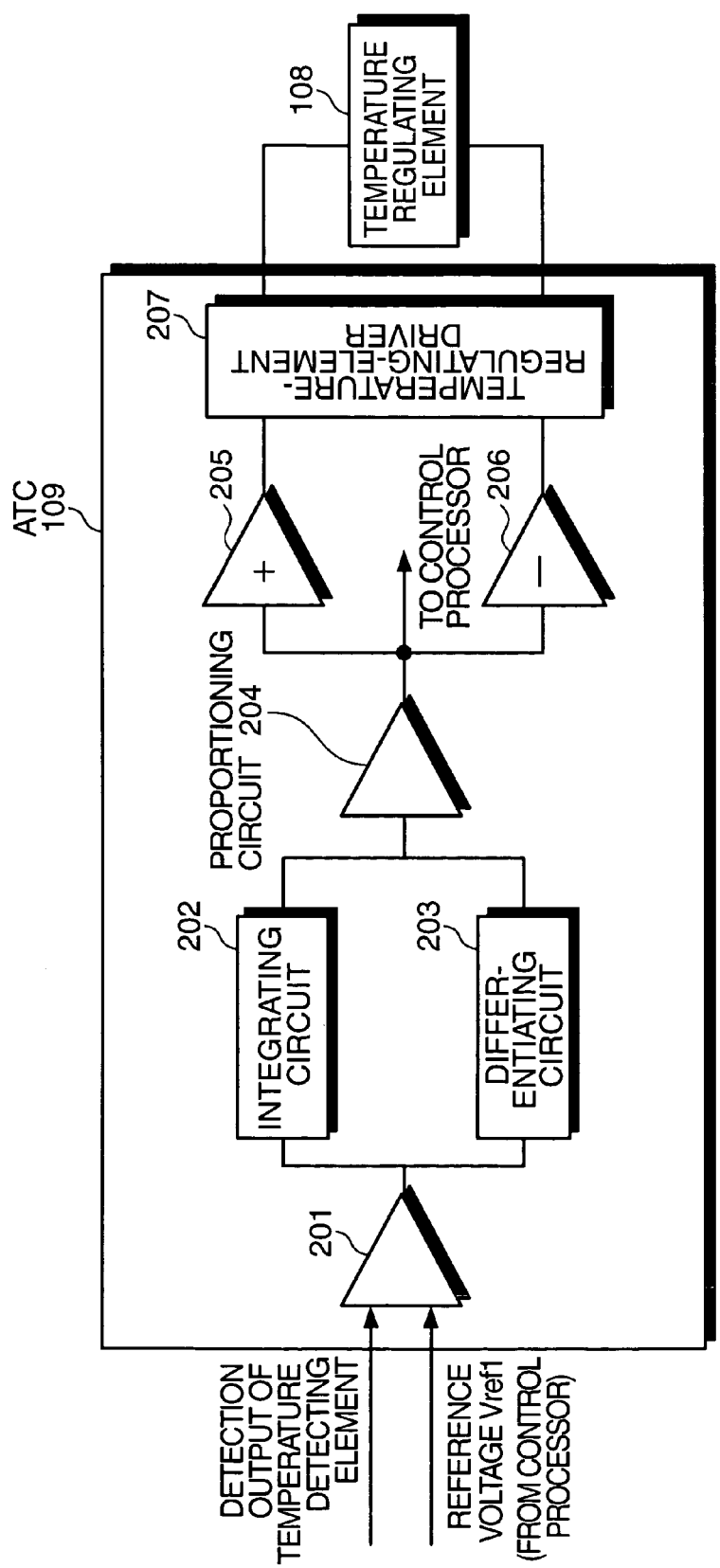
FIG. 8 is a block diagram showing a construction of an automatic temperature controller in the distributed optical fiber sensor.
Figure 10A:
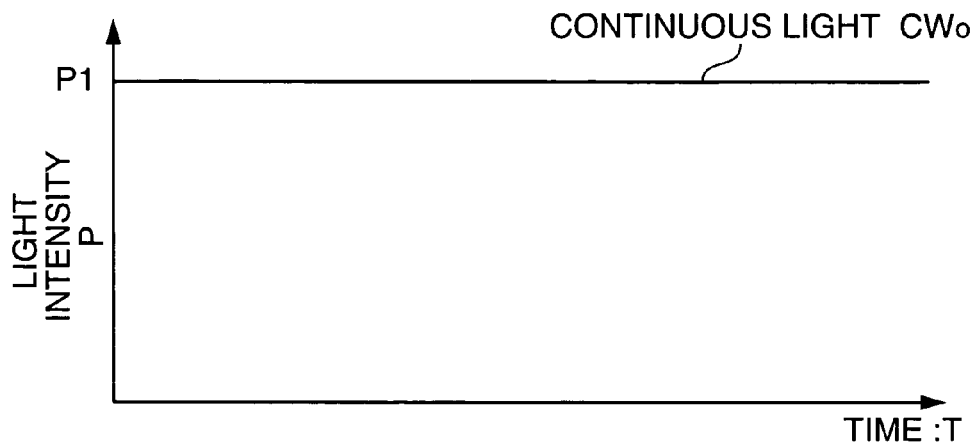
FIG. 10 are charts showing generation of the intensity-stepwise optical pulse.
Figure 11:
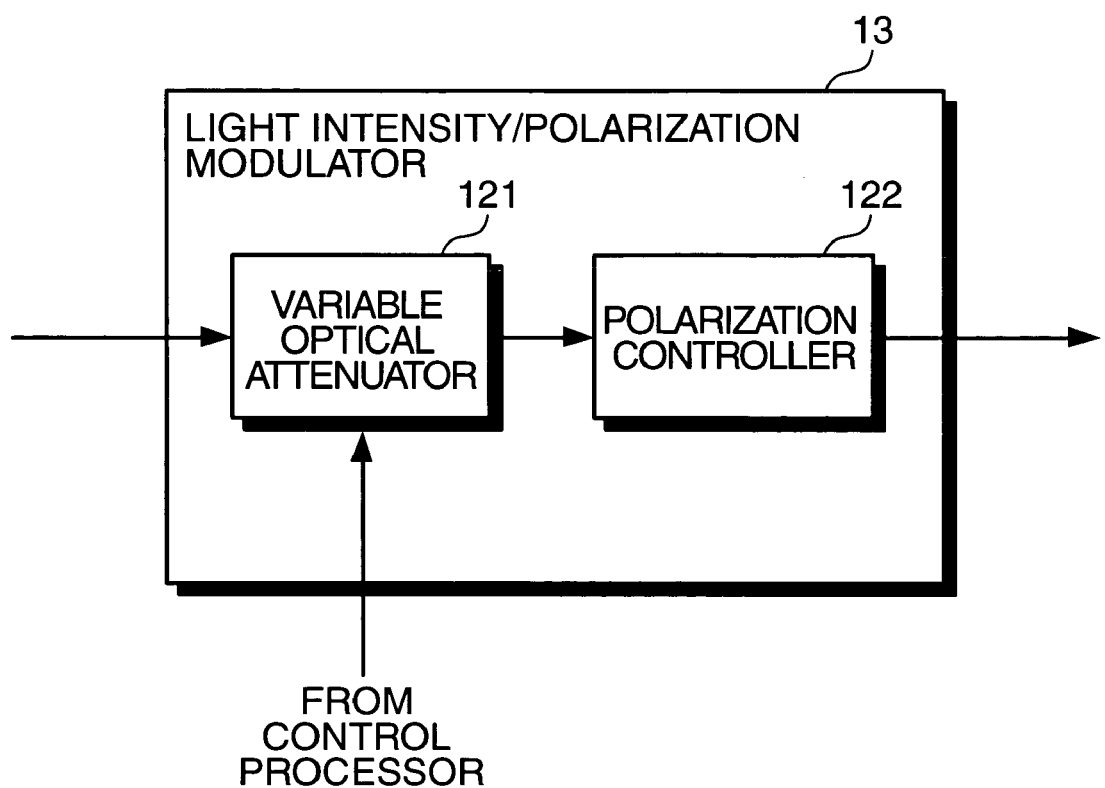
FIG. 11 is a block diagram showing a construction of a light intensity/polarization regulator in the distributed optical fiber sensor.
Figure 12:
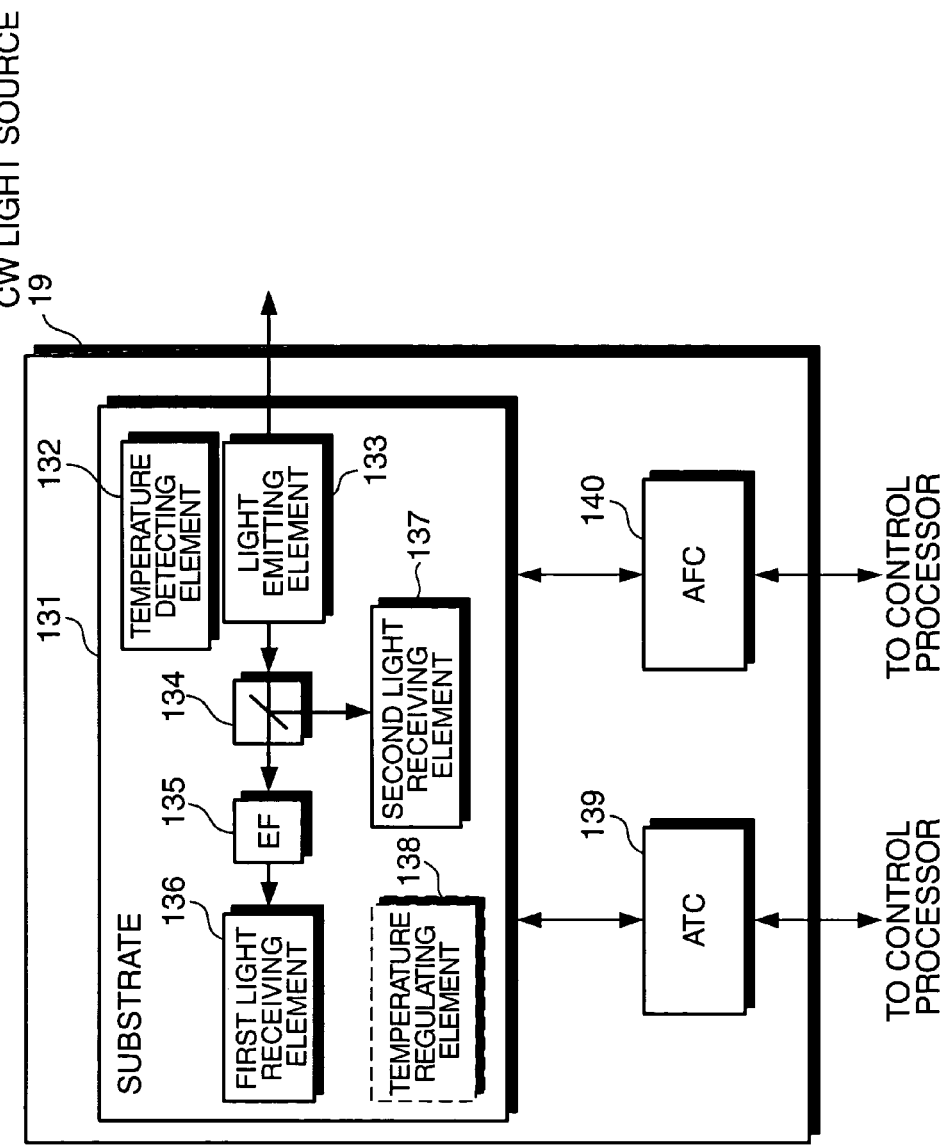
FIG. 12 is a block diagram showing a construction of a CW light source in the distributed optical fiber sensor of the first embodiment.
Figure 13:
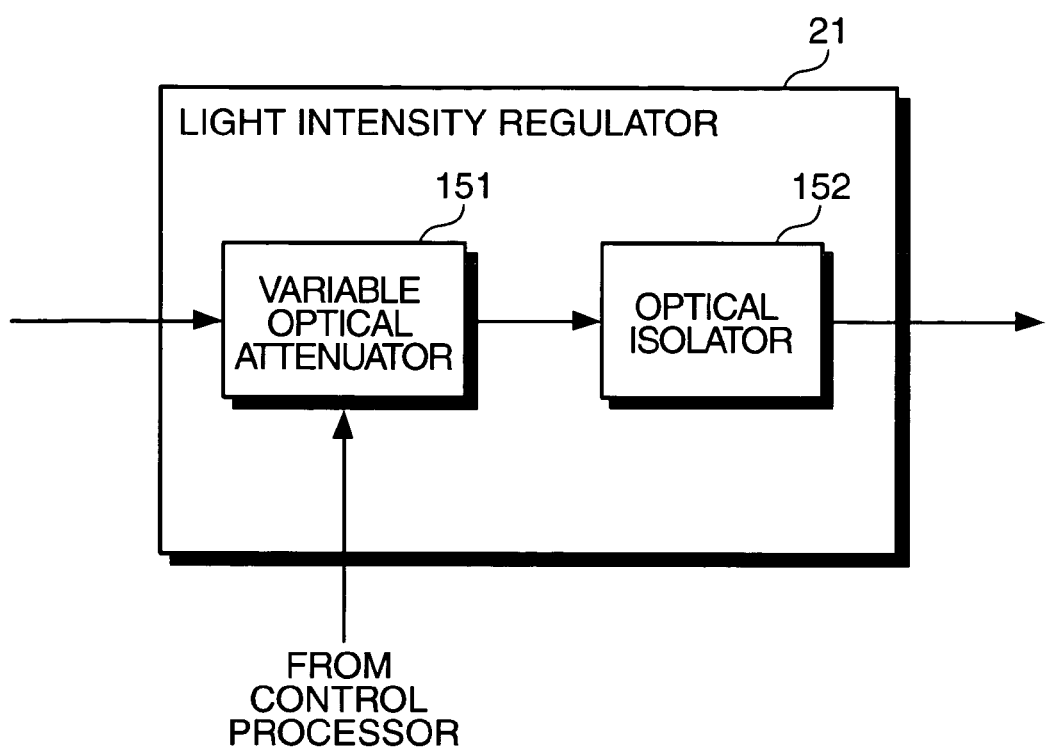
FIG. 13 is a block diagram showing a construction of a light intensity regulator in the distributed optical fiber sensor.

FIG. 6 is a block diagram showing the construction of the distributed optical fiber sensor according to the first embodiment; FIG. 7 is a block diagram showing the construction of a stepwise optical light source in the distributed optical fiber sensor; FIG. 8 is a block diagram showing the construction of an automatic temperature controller in the distributed optical fiber sensor; FIG. 9 are a block diagram showing the construction of an automatic frequency controller in the distributed optical fiber sensor and charts showing the principle of operation of the automatic frequency controller; FIG. 10 are charts showing the generation of an intensity-stepwise optical pulse; FIG. 11 is a block diagram showing the construction of a light intensity/polarization regulator in the distributed optical fiber sensor; FIG. 12 is a block diagram showing the construction of a CW light source in the distributed optical fiber sensor of the first embodiment; and FIG. 13 is a block diagram showing the construction of a light intensity regulator in the distributed optical fiber sensor.

In FIG. 6, the distributed optical fiber sensor 1 of the first embodiment is provided with a stepwise optical light source 11, an optical coupler 12, a light intensity/polarization regulator 13, an optical circulator 14, an optical connector 15, a control processor 16, a Brillouin time domain detector 17, a sensing optical fiber 18, a CW light source 19, an optical coupler 20, a light intensity regulator 21 and an optical connector 22.

The stepwise optical light source 11 is a light source device controlled by the control processor 16 and adapted to generate an optical pulse having a stepwise distribution of light intensity to increase toward the center. Such an optical pulse looks as if optical pulses having different light intensities were multiplexed. An output terminal (emitting terminal) of the stepwise optical light source 11 is optically connected with an input terminal (incident terminal) of the optical coupler 12.

Such a stepwise optical light source 11 includes a substrate 101, a temperature detector 102, a light emitting element 103, an optical coupler 104, a Fabry-Perot etalon filter (hereinafter, abbreviated as "EF") 105, a first light receiving element 106, a second light receiving element 107, a temperature regulating element 108, an automatic temperature controller (hereinafter, abbreviated as "ATC") 109, an automatic frequency controller (hereinafter, abbreviated as "AFC") 110, a first light intensity modulator 111, a first light-intensity-modulator driving portion 112, a second light intensity modulator 113, and a second light-intensity-modulator driving portion 114.

The substrate 101 is a mount on which the temperature detecting element 102, the light emitting element 103, the optical coupler 104, the EF 105, the first light receiving element 106 and the second light receiving element 107 are placed.

The temperature detecting element 102 is a component arranged in the vicinity of the light emitting element 103 for detecting the temperature of light emitting element 103 and, for example, a thermistor for detecting temperature through a change in its resistance value according to a temperature change. In order for the temperature detecting element 102 to more accurately detect the temperature of the light emitting element 103, the substrate 101 is preferably made of one of metal materials (including alloys) having a high thermal conductivity such as aluminum or copper. Further, the substrate 101 preferably has a larger heat capacity so as to be able to reduce the temperature change.

The temperature regulating element 108 is a component for regulating the temperature of the substrate 101 through heat evolution and endotherm and, for example, a thermoelectric converting element such as a Peltier element or Seebeck element. In this embodiment, a Peltier element formed by soldering p-type and n-type thermoelectric semiconductors to a copper electrode is used, and this Peltier element is adhered to a surface of the substrate plate 101 opposite to the one where the light emitting element 103 and the like are arranged.

The ATC 109 is a circuit for automatically keeping the temperature of the substrate 101 substantially constant at a specified temperature by controlling the temperature regulating element 108 based on a detection output of the temperature detecting element 102.

For example, as shown in FIG. 8, the ATC 109 includes an amplifier 201 for outputting a difference between a detection output of the temperature detecting element 102 and a reference voltage Vref1 from the control processor 16 inputted thereto, an integrating circuit 202, including, for example, a low-pass filter, to which the difference output of the amplifier 201 is inputted, a differentiating circuit 203, including, for example, a high-pass filter, to which the difference output of the amplifier 201 is inputted, a proportioning circuit 204 for outputting a proportion of an integration output of the integrating circuit 202 and a differentiation output of the differentiating circuit 203 inputted thereto, amplifiers 205, 206 capable of obtaining outputs for driving a temperature-regulating-element driver 207 in accordance with a plus output and a minus output of the proportioning circuit 204, and the temperature-regulating-element driver 207, including a bridge circuit, for generating a drive current of the temperature regulating element 108 in accordance with the proportion output of the proportioning circuit 204. In other words, the ATC 109 has such a construction as to PID control the temperature regulating element 108 based on the detection output of the temperature detecting element 102. The reference voltage Vref1 is set to be the same value as the detection output of the temperature detecting element 102 when the substrate 101 is at the specified temperature.

By such a construction, the ATC 109 drives the temperature regulating element 108 so that the temperature regulating element 108 absorbs heat if the temperature of the substrate 101 is higher than the specified temperature while driving the temperature regulating element 108 so that the temperature regulating element 108 evolves heat if the temperature of the substrate 101 is lower than the specified temperature. In this embodiment, a current of +1.4A is supplied to the Peltier element as the temperature regulating element 108 at the time of heat absorption, whereas a current of −0.6A is supplied thereto at the time of heat evolution. The temperature of the substrate 101 is automatically kept substantially constant at the specified temperature by the ATC 109 driving the temperature regulating element 108 in this way. As a result, the temperature of the light emitting element 103 is automatically kept substantially constant at a specified temperature. Thus, temperature dependency can be suppressed if the frequency of the light emitted from the light emitting element 103 is dependent on temperature. The specified temperature is a temperature at which the light emitting element 103 is supposed to oscillate at an oscillating frequency $f_0$. Further, the proportion output of the proportioning circuit 204 is outputted to the control processor 16 after being analog-to-digital converted in order to monitor the temperature stability of the substrate 101.

Referring back to FIG. 7, the light emitting element 103 is an element capable of emitting light having a narrow line width and a specified frequency and changing an oscillation wavelength (oscillating frequency) by changing the temperature of the element and a drive current and, for example, is a wavelength-variable semiconductor laser (frequency-variable semiconductor laser) such as a DFB laser having a multiple quantum well structure or a Bragg reflection-type laser having a variable wavelength distribution. The frequency of a laser beam emitted from a frequency-variable semiconductor laser is temperature-dependent, but the temperature dependence of the oscillating frequency is suppressed since temperature is automatically held substantially constant by the ATC 109 as described above, therefore the frequency-variable semiconductor laser can stably change the oscillating frequency by means of the drive current.

The optical coupler 104 is an optical component for projecting an incident light while dividing it into two light rays and, for example, is a beam splitter such as a half mirror. The EF 105 is a periodic filter having a period transmission frequency characteristic (periodic transmission wavelength characteristic) of periodically changing the intensity of a transmitted light according to a frequency (wavelength) change. An FSR (free spectral range) of the EF 105 is 100 GHz in this embodiment. The first and second light receiving elements 106, 107 are photoelectric conversion elements for generating a current corresponding to the light intensity of the received light and outputting the generated current after converting it into a voltage and includes, for example, a photodiode or a resistor.

Light rays (laser beams in this embodiment) emitted from the front and rear sides of the light emitting element 103 are incident on the first light intensity modulator 111 and the optical coupler 104, respectively. The light incident on the optical coupler 104 from the rear side of the light emitting element 103 is divided into two light rays at a specified dividing ratio in the optical coupler 104, wherein one divided light ray is incident on the second light receiving element 107 and the other one is incident on the first light receiving element 106 via the EF 105. The first and second light receiving elements 106, 107 output voltages corresponding to the light intensities of the incident lights as received light outputs to the AFC 110, respectively.

The AFC 110 is a circuit for controlling the light emitting element 103 based on received light outputs PDv1, PDv2 from the first and second light receiving elements 106, 107 to automatically keep the frequency of the light emitted from the light emitting element 103 substantially constant at the specified frequency.

Figure 9A:
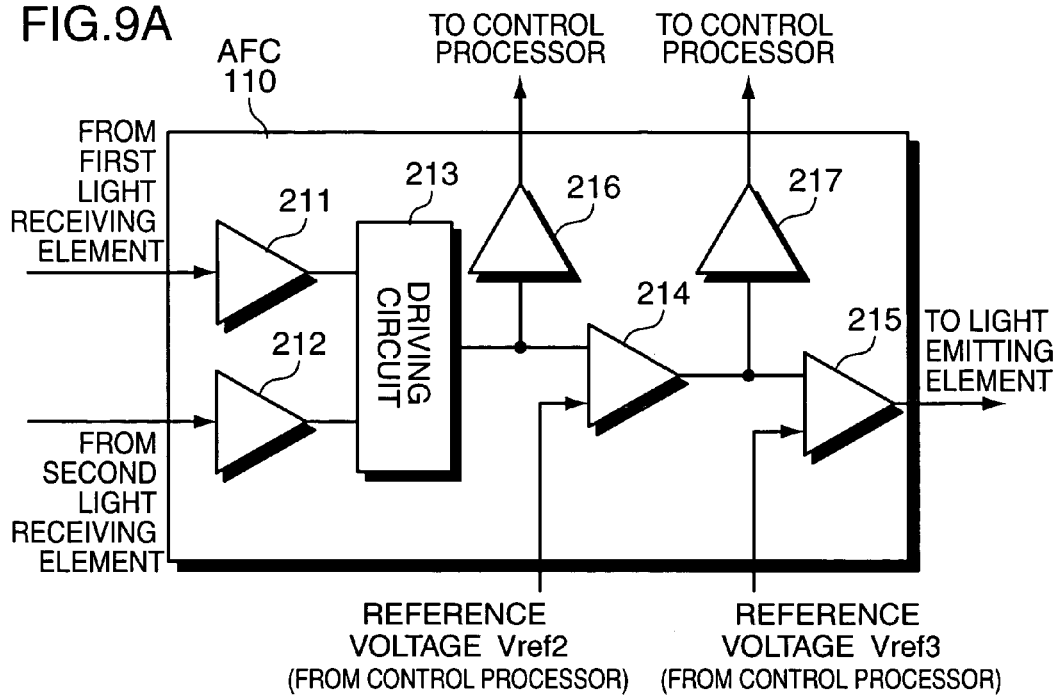
FIG. 9 are a block diagram showing a construction of an automatic frequency controller in the distributed optical fiber sensor and charts showing the principle of operation of the automatic frequency controller.

For example, as shown in FIG. 9A, the AFC 110 includes an amplifier 211 for amplifying the received light output PDv1 of the first light receiving element 106, an amplifier 212 for amplifying the received light output PDv2 of the second light receiving element 107, a dividing circuit 213 for dividing the received light output PDv1 of the first light receiving element 106 amplified by the amplifier 212 by the received light output PDv2 of the second light receiving element 107 amplified by the amplifier 212, an amplifier 216 for amplifying a division output PDv1/PDv2 of the dividing circuit 213 and outputting it to the control processor 16 after applying an analog-to-digital conversion thereto, an amplifier 214 for outputting a difference between the division output PDv1/PDv2 of the dividing circuit 213 and a reference voltage Vref2 from the control processor 16 inputted thereto, an amplifier 217 for amplifying the difference output of the amplifier 214 and outputting it to the control processor 16 after applying an analog-to-digital conversion thereto, and an amplifier 215 for outputting a difference between the difference output of the amplifier 214 and a reference voltage Vref3 from the control processor 16 inputted thereto.

There is described the operation of the AFC 110 for automatically keeping the frequency of the light emitted from the light emitting element 103 substantially constant at the specified frequency $f_0$ at which the light emitting element 103 is supposed to oscillate.

Figure 9B:
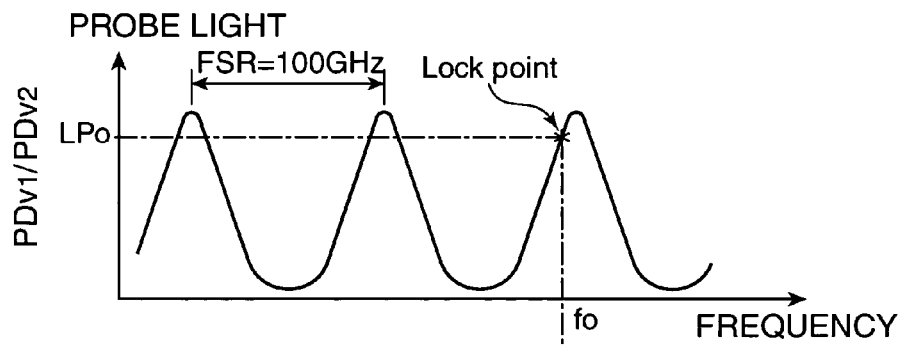

Since the aforementioned division output PDv1/PDv2 is a value obtained by dividing the light intensity (received light output PDv1) of the light received from the light emitting element 103 via the EF 105 having the periodic transmission frequency characteristic by the light intensity (received light output PDv2) of the light directly received from the light emitting element 103, it periodically changes according to a frequency change in conformity with the FSR of the EF 105 as seen in a curve "c" shown in FIG. 9B.

It is assumed that a point on the curve "c" corresponding to the oscillating frequency $f_0$ at which the light emitting element 103 is supposed to oscillate (i.e. frequency $f_0$ of the light the light emitting element 103 is supposed to emit) is a lock point and the division output PDv1/PDv2 at this point is a lock point value $LP_0$.

Accordingly, the division output PDv1/PDv2 becomes larger than the lock point value $LP_0$ if the frequency of the light emitted from the light emitting element 103 exceeds the oscillating frequency $f_0$ and, conversely, the division output PDv1/PDv2 becomes smaller than the lock point value $LP_0$ if the frequency of the light emitted from the light emitting element 103 falls below the oscillating frequency $f_0$.

Thus, the AFC 110 may drive the light emitting element 103 to reduce the frequency of the light emitted from the light emitting element 103 when the division output PDv1/PDv2 is larger than the lock point value $LP_0$ since the frequency of the light emitted from the light emitting element 103 is higher than the oscillating frequency $f_0$. On the other hand, the AFC 110 may drive the light emitting element 103 to increase the frequency of the light emitted from the light emitting element 103 when the division PDv1/PDv2 is smaller than the lock point value $LP_0$ since the frequency of the light emitted from the light emitting element 103 is lower than the oscillating frequency $f_0$.

Hence, the aforementioned reference voltage Vref3 is set at the same value as the division output PDv1/PDv2 if the frequency of the light emitted from the light emitting element 103 is driven at the oscillating frequency $f_0$. The aforementioned reference voltage Vref2 is a reference voltage for fine adjustment and set to precisely conform to the lock point value $LP_0$. In this way, the reference voltages Vref2, Vref3 are set to attain the lock point value $LP_0$ where the frequency of the light emitted form the light emitting element 103 is driven at the oscillating frequency $f_0$.

By letting the AFC 110 operate with the reference voltages Vref2 and Vref3 set in this way, the AFC 110 can drive the light emitting element 103 to compensate for a deviation if the frequency of the light emitted from the light emitting element 103 deviates from the oscillating frequency $f_0$. In this embodiment, the AFC 110 regulates an injection current in accordance with the deviation from the oscillating frequency $f_0$ because a frequency-variable semiconductor laser is used as the light emitting element 103. Therefore, the frequency-variable semiconductor laser can emit a laser beam at the specified frequency $f_0$ automatically kept substantially constant.

To this end, the optical coupler 104, the EF 105, the first and second light receiving elements 106, 107 and the AFC 110 construct a so-called wavelength locker for substantially locking the wavelength (frequency) of the light emitted from the light emitting element 103.

The first and second light intensity modulators 111, 113 are optical components for modulating the light intensity of the incident light and, for example, are Mach-Zehnder light modulators (hereinafter, abbreviated as "MZ light modulators") or semiconductor light modulators of the electric field absorption type.

The MZ light modulator is such that a light guide, signal electrodes and a grounding electrode are formed on a substrate having an electro-optic effect and made, for example, of lithium niobate, lithium tantalate, lithium niobate and lithium tantalite solid solution. The light guide has intermediate portions thereof branched into two, i.e. first and second waveguide arms at two Y-branched waveguides, thereby constructing a Mach-Zehnder Interferometer. The signal electrodes are respectively formed on these two waveguide arms, and the grounding electrode is so formed on the substrate as to be parallel to the signal electrodes at specified intervals thereto. Light incident on the MZ light modulator propagates along the light guide and is branched into two, i.e. first and second lights, at the first Y-branched waveguide, and the branched lights further propagate along the respective waveguide arms, are joined again at the second Y-branched waveguide and emerge from the light guide. Here, if electrical signals, for example, high-frequency signals are applied to the respective signal electrodes, the speeds of the first and second lights propagating along the first and second waveguide arms change because the refractive indices of the respective waveguide arms change due to the electro-optic effect. Thus, the first and second lights are joined at different phases at the second Y-branched waveguide by setting a specified phase difference between the respective electrical signals, and the joined lights are in modes different from the one of the incident light, e.g. in high-order modes. These joined lights of different modes have the intensity thereof modulated since they cannot propagate in the light guide. The MZ light modulator modulates the light intensity of the incident light by the process of electrical signals→refractive index change→phase change→intensity change. Besides light modulators utilizing the electro-optic effect, there are also magnetooptic light modulators utilizing a magnetooptic effect, acoustooptic light modulators utilizing an acoustooptic effect, and electric-field absorption light modulators utilizing a Franz-Keldysh effect or a quantum-confined Stark effect.

The first and second light-intensity-modulator driving portions 112, 114 are driver circuits controlled by the control processor 16 for driving the first and second light intensity modulators 111, 113 and include, for example, pulse generating circuits for generating voltage pulses to be applied to the first and second light intensity modulators 111, 113, and timing generating circuits for controlling the generation timings of the voltage pulses. The voltage pulses correspond to the aforementioned electrical signals if the first and second light intensity modulators 111, 113 are MZ light modulators.

An operation of generating an intensity-stepwise optical pulse by the stepwise optical light source 11 thus constructed is described. FIG. 10A is a chart showing an output light (position of arrow A shown in FIG. 7) of the light emitting element 103, FIG. 10B is a chart showing an output light (position of arrow B in FIG. 7) of the first light intensity modulator 111, and FIG. 10C is a chart showing an output light of the second light intensity modulator 113, i.e. an output light (position of arrow C in FIG. 7) of the stepwise optical light source 11.

As shown in FIG. 10A, the light emitting element 103 is caused to continuously emit light $CW_0$, which is light having a narrow line width, a specified frequency $f_0$ and a substantially constant light intensity P1, by the AFC 110 in accordance with a control of the control processor 16. The continuous light $CW_0$ emitted from the light emitting element 103 is incident on the first light intensity modulator 111.

In the background art, the light intensity modulator is normally off and turned on and off at specified timings to generate an optical pulse shown in FIG. 24B. If the light intensity modulator is a Mach-Zehnder light modulator, voltages applies to the waveguides are regulated, whereby an OFF-state can be realized by setting a phase difference between the light propagating in the first waveguide arm and the one propagating in the second waveguide arm at 180°, and an ON-state can be realized by aligning the phases of the lights propagating in the first and second waveguide arms.

Figure 10B:
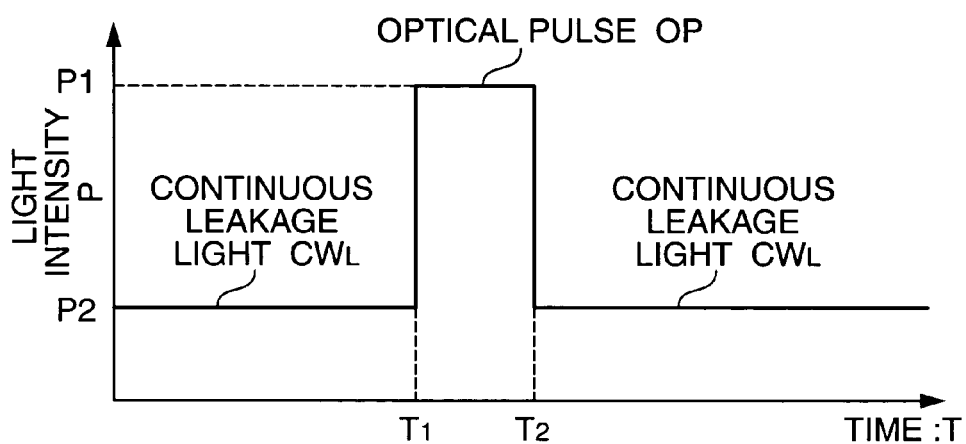
Figure 10C:
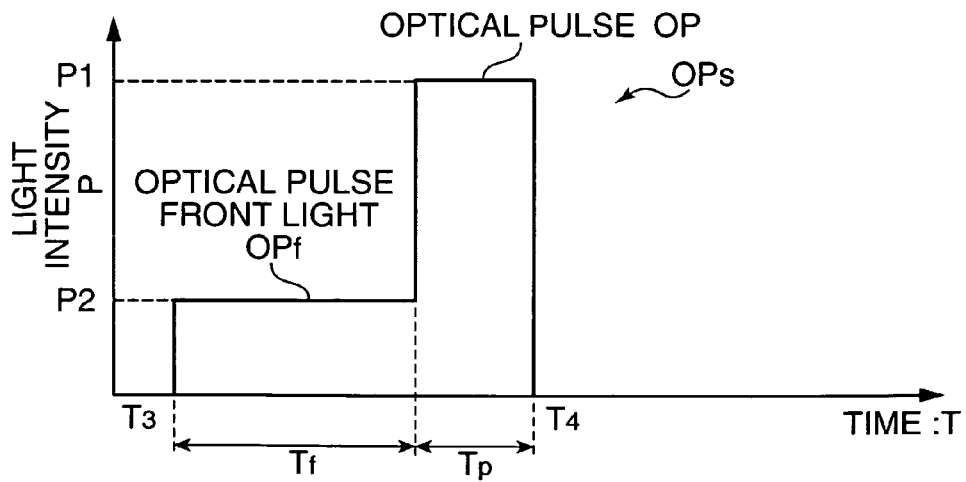

As shown in FIG. 10B, the first light intensity modulator 111 of this embodiment is driven by the first light-intensity-modulator driving portion 112 in accordance with the control of the control processor 16 such that the light intensity of the light emitted from the first light intensity modulator 111 has a weak light intensity P2 lower than the light intensity P1 in a normal state, and is also so driven by the first light-intensity-modulator driving portion 112 in accordance with the control of the control processor 16 as to be turned on at timing T1 and to return to the normal state at timing T2. By driving the first light intensity modulator 111 by the first light-intensity-modulator driving portion 112 in this way, the continuous light $CW_0$ incident on the first light intensity modulator 111 is modulated to have the light intensity P2 up to timing T1, kept at the light intensity P1 without being modulated between timing T1 and timing T2, and modulated to have the light intensity P2 again from timing T2 on. Specifically, by driving the first light intensity modulator 111 by the first light-intensity-modulator driving portion 112 in this way, the first light intensity modulator 111 emits light in which an optical pulse OP having the light intensity P1 is present in a continuous leakage light CWL having the light intensity P2 as shown in FIG. 10B. This light intensity P1 corresponds to the light intensity P1 $(=(As+Cs)^2)$ in FIGS. 1 and 4, whereas the light intensity P2 corresponds to the light intensity P2 $(=Cs^2)$ of the optical pulse front light OPf and the optical pulse back light OPb shown in FIGS. 1 and 4. If the light intensity modulator is a Mach-Zehnder light modulator, the first light-intensity-modulator driving portion 112 regulates a phase difference between the lights propagating in the first and second waveguide arms such that the light intensity is P2 in a normal state and aligns the phases of the lights propagating in the first and second waveguide arms at timing T1 and regulates the phase difference between the lights propagating in the first and second waveguide arms such that the light intensity in the normal state is P2 at timing T2 by regulating the voltages applied to the first and second waveguide arms of the Mach-Zehnder light modulator.

Then, the light comprised of the continuous leakage light CWL and the optical pulse OP and having a waveform shown in FIG. 10B emerges from the first light intensity modulator 111 to be incident on the second light intensity modulator 113. As shown in FIG. 10C, the second light intensity modulator 113 is so driven by the second light-intensity-modulator driving portion 114 in accordance with the control of the control processor 16 as to be off in a normal state, to be turned on at timing T3 and to be turned off at timing T4. By driving the second light intensity modulator 113 by the second light-intensity-modulator driving portion 114 in this way, the light having the waveform shown in FIG. 10B and emerged from the first light intensity modulator 111 to be incident on the second light intensity modulator 113 is modulated to have a light intensity 0 (turned off) up to timing T3, kept as it is without being modulated between timing T3 and T4 and modulated to have the light intensity 0 (turned off) again from timing T4 on. In other words, by being driven by the second light-intensity-modulator driving portion 114 in this way, the second light intensity modulator 113 removes the continuous leakage light while leaving only part thereof (optical pulse front light OPf) before the optical pulse OP. In this way, the second light intensity modulator 113 generates an intensity-stepwise optical pulse OPs in which the optical pulse having the light intensity P1 higher than the light intensity P2 is present in the optical pulse having the light intensity P2, and which has a narrow line width and a stepwise distribution of light intensity change in one step. It should be noted that the intensity-stepwise optical pulse OPs may include the optical pulse back light OPb by regulating the timing T4.

Here, a time width Tf of the optical pulse front light OPf, a time width Tp of the optical pulse OP and a ratio Prx defined by Equation 12 are set as described above.

In this embodiment, the time width Tf of the optical pulse front light OPf is set at, for example, 5 ns, 10 ns, 15 ns and 20 ns. As described above, the pulse width Tp of the optical pulse OP needs to be set equal to or below 10 ns in order to obtain a high spatial resolution of 1 m or higher. However, in order to suppress the inclusion of information on the Brillouin frequency shift around a certain position of the sensing optical fiber 18 into the Brillouin frequency shift at this certain position, the pulse width Tp is preferably adjusted to a sampling time interval in the case of measuring Brillouin loss/gain spectra BSl/g(vd) by means of a Brillouin time domain detector 17. In this embodiment, the pulse width Tp of the optical pulse OP is set at 5 ns, 2 ns and 1 ns. As described above, the ratio Prx is set based on a simulation result of H2/(H1+H3+H4) in relation to the ratio Prx in accordance with Equations 8 to 11. In this embodiment, the ratio Prx is set at a value to give a peak of H2/(H1+H3+H4) in the simulation result because of being able to obtain a best Lorenz curve in detecting the peak of the Brillouin loss spectrum BSl/g(vd) and to detect strain and/or temperature with high spatial resolution and highest accuracy. Even if the ratio Prx is set at such a value that the value of H2/(H1+H3+H4) in the simulation result is 0.5 or larger, strain and/or temperature can be detected with high accuracy and high spatial resolution. For example, if the time width Tf of the optical pulse front light OPf is 12 ns and the time width Tp of the optical pulse OP is 1 ns, the ratio Prx is set at a value between about 15 dB and about 27 dB and is set at about 21 dB to obtain a best Lorenz curve.

It should be noted that an optical amplifier 115 for amplifying the light may be arranged on a light path from the light emitting element 103 to the optical coupler 12 in order to compensate for losses in the first light intensity modulator 111 and the second light intensity modulator 113. Particularly, in order to amplify while there is only a little amplifier spontaneous emission (ASE), which becomes noise, the optical amplifier 115 is preferably arranged on a light path between the first light intensity modulator 111 and the second light intensity modulator 113 as shown in broken line in FIG. 7. The optical amplifier 115 is, for example, an optical fiber amplifier or a semiconductor optical amplifier having a gain to the frequency of the light emitted from the light emitting element 103. Optical fiber amplifiers include rare-earth added optical fiber amplifiers in which rare-earth elements such as erbium (Er), neodymium (Nd), praseodym (Pr) and thulium (Tm) are added to optical fibers and optical fiber amplifiers utilizing Raman amplification.

Referring back to FIG. 6, the optical couplers 12, 22 are optical components for projecting the incident light while dividing it into two lights and may, for example, employ optical splitter/couplers in the form of micro-optical elements such as half mirrors, those in the form of molten optical fibers and those in the form of light guides. One output terminal of the optical coupler 12 is optically connected with an input terminal of the light intensity/polarization regulator 13, whereas the other output terminal thereof is optically connected with a first input terminal of the Brillouin time domain detector 17.

The light intensity/polarization regulator 13 is a component controlled by the control processor 16 and adapted to regulate the light intensity of the incident light and project the incident light while randomly changing the plane of polarization of the incident light. An output terminal of the light intensity/polarization regulator 13 is optically connected with a first terminal of the optical circulator 14.

The light intensity/polarization regulator 13 includes, for example, a variable optical attenuator 121 and a polarization controller 122 as shown in FIG. 11. The variable optical attenuator 121 is an optical component capable of projecting the incident light while attenuating the light intensity of the incident light, and changing an amount of attenuation. As the variable optical attenuator 121 can be employed, for example, a variable optical attenuator in which an attenuation disk is inserted between an incident light and an emergent light, a metal film whose thickness is continuously changed in a rotating direction is formed on the outer surface of the attenuation disk by deposition, and an amount of attenuation is changed by rotating this attenuation disk, or a variable optical attenuator in which a magnetooptical crystal is inserted between an incident light and an emergent light, a polarizer is inserted at an emergent side of this magnetooptical crystal, and a magnetic field is applied to the magnetooptical crystal to change the intensity of the magnetic field, thereby adjusting an amount of attenuation. The polarization controller 122 is an optical component for projecting the incident light while randomly changing the plane of polarization of the incident light. The light incident on the light intensity/polarization regulator 13 is incident on the polarization controller 122 after having the light intensity thereof regulated to a specified one in the variable optical attenuator 121 by the control of the control processor 16, and is emitted after having the plane of polarization thereof randomly changed in the polarization controller 122.

The optical circulator 14 is an irreversible optical component which has first to third terminals and in which an incident light and an emergent light change their positions in a circulating manner of the terminal numbers. Specifically, light incident on the first terminal emerges from the second terminal, but not from the third terminal; light incident on the second terminal emerges from the third terminal, but not from the first terminal; and light incident on the third terminal emerges from the first terminal, but not from the second terminal. The optical connectors 15, 22 are optical components for optically connecting optical fibers and/or optical components and optical fibers. The second terminal of the optical circulator 14 is optically connected with one end of the sensing optical fiber 18 via the optical connector 15, and the third terminal of the optical circulator 14 is optically connected with a third input terminal of the Brillouin time domain detector 17.

The CW light source 19 is a device controlled by the control processor 16 and adapted to emit a continuous light CWlump1 having a substantially constant light intensity in a specified frequency range fr. As shown in FIG. 12, the CW light source 19 includes, for example, a substrate 131, a temperature detecting element 132, a light emitting element 133, an optical coupler 134, an EF 135, a first light receiving element 136, a second light receiving element 137, a temperature regulating element 138, an ATC 139 and an AFC 140. Specifically, the CW light source 19 need not convert the continuous light emitted from the light emitting element 133 into an optical pulse having a stepwise distribution of light intensity as the stepwise optical light source 11 does because it is sufficient to emit the continuous light CWpump1 having a substantially constant light intensity in the specified frequency range fr. Thus, the CW light source 19 does not include the first and second light intensity modulators 111, 113 and the first and second light-intensity-modulator driving portions 112, 114 of the stepwise optical light source 11. Since the substrate 131, the temperature detecting element 132, the light emitting element 133, the optical coupler 134, the EF 135, the first light receiving element 136, the second light receiving element 137, the temperature regulating element 138, the ATC 139 and the AFC 140 of the CW light source 19 are respectively similar to the substrate 101, the temperature detecting element 102, the light emitting element 103, the optical coupler 104, the EF 105, the first light receiving element 106, the second light receiving element 107, the temperature regulating element 108, the ATC 109 and the AFC 110 of the stepwise optical light source 11 including optical connections and electrical connections except that the AFC 140 changes the frequency of the light emitted from the light emitting element 133 in accordance with the control of the control processor 16, they are not described here.

The distributed optical fiber sensor 1 of this embodiment is for measuring the Brillouin loss/gain spectra BSl/(vd) and measuring the Brillouin frequency shift vb by locking the frequency $f_0$ of the intensity-stepwise optical pulse as probe light and scanning the frequency of the continuous light CWpump1 as pump light within the specified frequency range fr.

To this end, a lock point value $LP_0$ of the AFC 140 is changed by changing reference voltages Vref2 and Vref3 in the AFC 140 in conformity with the frequency at which the control processor 16 scans, and the continuous light CWpump1 kept at the scanning frequency is emitted.

Figure 9C:
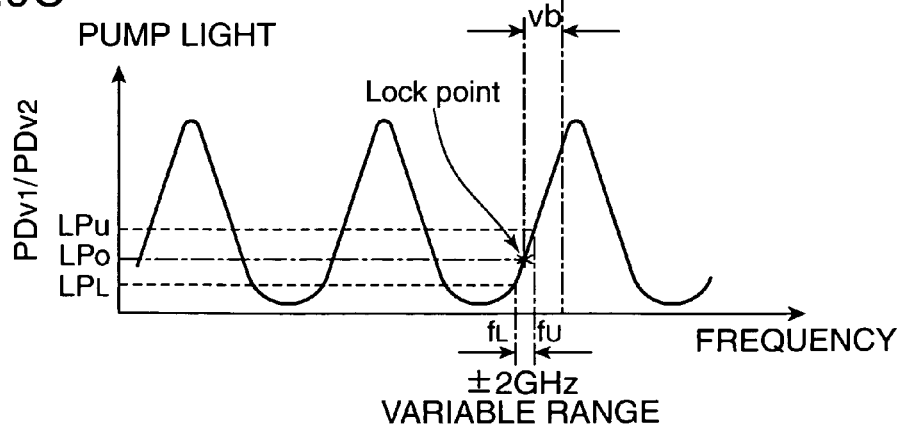

In this embodiment, as shown in FIG. 9C, the specified frequency range fr is 4 GHz, and the lock point value $LP_0$ changes within a range of $LPL \leq LP_0 \leq LPu$ if LPL, LPu denote lock point values respectively corresponding to a lower limit frequency fL and an upper limit frequency fu of this specified frequency range fr.

An output terminal of the CW light source 19 is optically connected with an input terminal of the optical coupler 20. One output terminal of the optical coupler 20 is optically connected with an input terminal of the light intensity regulator 21, whereas the other output terminal thereof is optically connected with a second input terminal of the Brillouin time domain detector 17.

Referring back to FIG. 6, the light intensity regulator 21 is a component controlled by the control processor 16 and adapted to project the incident light after regulating the light intensity of the incident light. An output terminal of the light intensity regulator 21 is optically connected with the other end of the sensing optical fiber 18 via the optical connector 22.

The light intensity regulator 21 includes, for example, a variable optical attenuator 151 and an optical isolator 152 as shown in FIG. 13. The variable optical attenuator 151 is an optical component for projecting the incident light after attenuating the light intensity of the incident light similar to the variable optical attenuator 121. The optical isolator 152 is an optical component for transmitting light only in one direction from an input terminal to an output terminal, and is constructed, for example, by arranging a Faraday rotor between two polarizers displaced by 45°. The optical isolator 152 functions to prevent the propagation of reflected lights produced at connecting portions of the respective optical components in the distributed optical fiber sensor 1 and the propagation of the probe light to the CW light source 19. The incident light incident on the light intensity regulator 21 is emitted via the optical isolator 152 after having the light intensity thereof adjusted to a specified one in the variable optical attenuator 151.

It should be noted that the pump light having propagated in the sensing optical fiber 18 need not be incident on the light intensity/polarization regulator 13 and the stepwise optical light source 11 because it is incident on the Brillouin time domain detector 17 via the optical connector 15 and the optical circulator 14. Here, if an optical coupler is used instead of the optical circulator 14, an optical isolator or a light filter for blocking the pump light and permitting the transmission of the intensity-stepwise optical pulse OPs is preferably arranged at the output terminal of the light intensity/polarization regulator 13 in order to prevent the incidence of the pump light on the light intensity/polarization regulator 13 and the stepwise optical light source 11.

The sensing optical fiber 18 is an optical fiber serving as a sensor for detecting strain and/or temperature. The probe light is incident on one end of the sensing optical fiber 18, the pump light is incident on the other end thereof, and the probe light and the pump light subjected to the Brillouin scattering phenomenon emerge from the other and one ends thereof. Here, in the case of measuring strains caused in and/or temperatures of an object to be measured, which can be a structure such as a bridge, a tunnel, a dam or a building or the ground, such a measurement can be conducted by fixing the sensing optical fiber 18 to the object to be measured.

The control processor 16 is an electronic circuit for controlling the stepwise optical light source 11, the light intensity/polarization regulator 13, the CW light source 19 and the light intensity regulator 21 such that a strain and/or temperature distribution of the sensing optical fiber 18 in the longitudinal direction of the sensing optical fiber 18 can be measured with high accuracy and high spatial resolution by transmitting and receiving signals to and from the Brillouin time domain detector 17. The control processor 16 includes, for example, a microprocessor, a working memory, and a memory for storing data such as the reference voltage Vref1 for the ATC 109, the reference voltages Vref2, Vref3 for the AFC 110, the reference voltage Vref1 for the ATC 139, the reference voltages Vref2, Vref3 for the AFC 140, the timings T1, T2, T3, T4 and the ratio Prx.

The Brillouin time domain detector 17 controls the respective components of the distributed optical fiber sensor 1; determines the Brillouin loss/gain spectra BSl/g(vd) in the respective areas of the sensing optical fiber 18 in the longitudinal direction of the sensing optical fiber 18 by detecting the light attributed to the Brillouin scattering phenomenon and received at specified sampling intervals; determines the Brillouin frequency shifts vd of the respective areas based on the determined Brillouin loss/gain spectra BSl/g(vd) of the respective areas; and detects the strain distribution and/or the temperature distribution of the sensing optical fiber 18 based on the determined the Brillouin frequency shifts vd of the respective areas. The Brillouin time domain detector 17 has the aforementioned ratio Prx, from which a Lorenz curve is obtained, stored therein, detects the light intensity of the intensity-stepwise optical pulse OPs emitted from the stepwise optical light source 11, and notifies to the control processor 16 so that a ratio P1/P2 of the intensity-stepwise optical pulse becomes the ratio Prx. Further, the Brillouin time domain detector 17 has the frequencies of an optimal probe light and an optimal pump light to obtain a Lorenz curve stored therein, detects the light intensity of the intensity-stepwise optical pulse OPs emitted from the stepwise optical light source and the light intensity of the continuous light CWpump1 emitted from the CW light source 19, and notifies to the control processor 16 to regulate the light intensity/polarization regulator 13 and the light intensity regulator 21 in order to attain the light intensity of the optimal probe light and that of the optimal pump light. The Brillouin time domain detector 17 includes an optical switch, a spectrum analyzer and a computer.

Since the probe light is an intensity-stepwise optical pulse, the aforementioned ratio Prx from which the Lorenz curve can be obtained can be stored in the Brillouin time domain detector 17 beforehand. Further, since the aforementioned ratio Prx from which the Lorenz curve can be obtained can be stored in the Brillouin time domain detector 17 beforehand, it is not necessary, unlike the background art, to manually adjust the optical pulse in conformity with the length of the sensing optical fiber every time a measurement is conducted.

Next, the operation of the distributed optical fiber sensor according to the first embodiment is described.

Figure 14A:
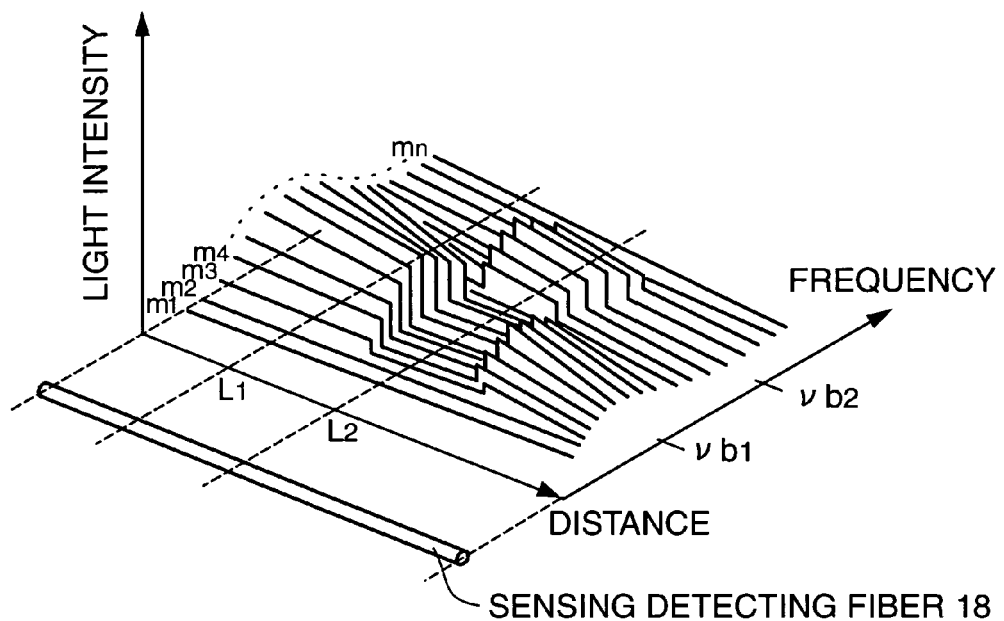
FIG. 14 are charts showing distributions of Brillouin loss/gain spectra and Brillouin loss/gain spectra at distances L1 and L2.
Figure 14B:
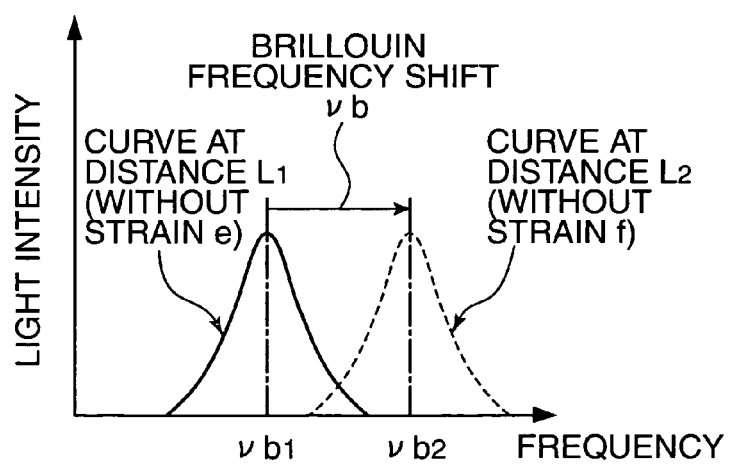

FIG. 14 are charts showing a Brillouin loss/gain spectral distribution and Brillouin loss/gain spectra at distances L1, L2. FIG. 14A shows the Brillouin loss/gain spectral distribution, wherein x-axis represents distance from one end of the sensing optical fiber 18, y-axis represents frequency, and z-axis represents light intensity. FIG. 14B shows Brillouin loss/gain spectra at the distances L1, L2, wherein x-axis represents frequency and y-axis represent light intensity. In order to facilitate the description, it is assumed that the sensing optical fiber 18 is not strained at the distance L1 while being strained at the distance L2.

First, the Brillouin time domain detector 17 is prepared to measure the spectrum of light from the stepwise optical light source 11 via the optical coupler 12 and sends, to the control processor 16, a signal to cause the stepwise optical light source 11 to emit light.

Upon receiving this signal, the control processor 16 applies the given reference voltage Vref1 for the ATC 109 and the reference voltages Vref2, Vref3 for the AFC 110 to the ATC 109 and the AFC 110, respectively, thereby causing the light emitting element 103 to emit light and causing the stepwise optical light source 11 to emit light.

The light emitted from the stepwise optical light source 11 is incident via the optical coupler 12 on the Brillouin time domain detector 17, which measures the spectrum of the incident light. The Brillouin time domain detector 17 confirms from this measurement result whether or not the stepwise optical light source 11 emits light of a specified oscillating frequency $f_0$. Unless the specified oscillating frequency $f_0$ is confirmed, the Brillouin time domain detector 17 sends, to the control processor 16, a signal to adjust the reference voltages Vref2, Vref3 for the AFC 110 so as to set the specified oscillating frequency $f_0$.

Upon receiving this signal, the control processor 16 adjusts the reference voltages Vref2, Vref3 for the AFC 110 so as to set the specified oscillating frequency $f_0$. If the oscillating frequency f of the light emitted from the stepwise optical light source 11 becomes the specified oscillating frequency $f_0$, the Brillouin time domain detector 17 notifies the light intensity P1 of the light to the control processor 16.

The control processor 16 controls the first light intensity modulator 111 and the first light-intensity-modulator driving portion 112 based on the received light intensity P1 and the stored ratio Prx so that a ratio of the light intensity P1 of the optical pulse OP to the light intensity P2 of the optical pulse front light OPf (of the optical pulse front light OPf and the optical pulse back light OPb if there is the optical pulse back light OPb) of the intensity-stepwise optical pulse OPs becomes the aforementioned specified ratio Prx, and controls the second light intensity modulator 113 and the second light-intensity-modulator driving portion 113 so that the intensity-stepwise optical pulse OPs is to be emitted.

The intensity-stepwise optical pulse OPs emitted from the stepwise optical light source 11 is incident via the optical coupler 12 on the Brillouin time domain detector 17, which measures the spectrum of the intensity-stepwise optical pulse OPs. The Brillouin time domain detector 17 confirms from this measurement result whether or not the stepwise optical light source 11 emits the intensity-stepwise optical pulse OPs having the specified ratio Prx. Unless the specified ratio Prx is confirmed, the Brillouin time domain detector 17 sends, to the control processor 16, a signal to adjust the first light intensity modulator 111 so as to set the specified ratio Prx.

Upon receiving this signal, the control processor 16 adjusts the first light intensity modulator 111 so as to set the specified ratio Prx. When the ratio of the intensity-stepwise optical pulse OPs emitted from the stepwise optical light source 11 becomes the specified ratio Prx by repeating such adjustments, the Brillouin time domain detector 17 sends, to the control processor 16, a signal to adjust an amount of attenuation of the light intensity/polarization regulator 13 from the spectrum measurement result so that the intensity-stepwise optical pulse OPs emitted from the stepwise optical light source 11 is incident on the sensing optical fiber 18 at such an optimal light intensity as to give a Brillouin loss/gain spectrum BSl/g(vd) represented by a Lorenz curve.

Upon receiving this signal, the control processor 16 adjusts the amount of attenuation of the light intensity/polarization regulator 13 and sends, to the Brillouin time domain detector 17, a signal indicating that the adjustment of the amount of attenuation was completed.

Upon receiving this signal, the Brillouin time domain detector 17 judges that the stepwise optical light source 11 is ready to emit the specified intensity-stepwise optical pulse OPs and causes the control processor 16 to control the stepwise optical light source 11 so as to prevent the emission of the specified intensity-stepwise optical pulse OPs.

Then, the Brillouin time domain detector 17 starts measuring the Brillouin loss/gain spectrum BSl/g(vd).

First, the Brillouin time domain detector 17 prepares to measure the spectrum of light from the CW light source 19 via the optical coupler 20. Then, the Brillouin time domain detector 17 sends, to the control processor 16, a signal to cause the CW light source 19 to emit a continuous light of a minimum frequency fL in the frequency range to be scanned.

Upon receiving this signal, the control processor 16 applies the given reference voltage Vref1 for the ATC 139 and the reference voltages Vref2, Vref3 for the AFC 140 corresponding to the minimum frequency fL to the ATC 139 and the AFC 140, thereby causing the light emitting element 133 to emit light and the CW light source 19 to emit a continuous light.

The continuous light emitted from the CW light source 19 is incident via the optical coupler 12 on the Brillouin time domain detector 17, which measures the spectrum of the incident light. The Brillouin time domain detector 17 confirms whether or not the CW light source 11 emits the continuous light of the minimum frequency fL. Unless the minimum frequency fL is confirmed, the Brillouin time domain detector 17 sends, to the control processor 16, a signal to adjust the reference voltages Vref2, Vref3 for the AFC 110 so as to set the minimum frequency fL. Further, from the spectrum measurement result, the Brillouin time domain detector 17 sends, to the control processor 16, a signal to adjust an amount of attenuation of the light intensity regulator 21 so that the continuous light emitted from the CW light source 19 is incident on the sensing optical fiber 18 at such an optimal light intensity as to give a Brillouin loss/gain spectrum BSl/g(vd) represented by a Lorenz curve.

Upon receiving these signals, the control processor 16 adjusts the reference voltages Vref2, Vref3 for the AFC 140 so as to set the minimum frequency fL. Further, the control processor 16 adjusts the amount of attenuation of the light intensity regulator 21 and sends, to the Brillouin time domain detector 17, a signal indicating that the adjustment of the amount of attenuation was completed.

Upon receiving this signal, the Brillouin time domain detector 17 prepares to measure the spectrum of light attributed to the Brillouin scattering phenomenon and incident via the optical circulator 14 when the frequency of the light emitted from the CW light source 19 becomes the minimum frequency fL and sends, to the control processor 16, a signal to cause the stepwise optical light source 11 to emit the intensity-stepwise optical pulse OPs.

Upon receiving this signal, the control processor 16 causes the stepwise optical light source 11 to emit the intensity-stepwise optical pulse OPs and sends, to the Brillouin time domain detector, a signal indicative of an emission timing.

The intensity-stepwise optical pulse OPs emitted from the stepwise optical light source 11 is incident on the light intensity/polarization regulator 13 via the optical coupler 12 and has the light intensity and the plane of polarization changed in the light intensity/polarization regulator 13, and is incident on one end of the sensing optical fiber 18 as probe light via the optical circulator 14 and the optical connector 15. The probe light (intensity-stepwise optical pulse OPs) incident on the one end of the sensing optical fiber 18 propagates from the one to the other end of the sensing optical fiber 18 while causing a Brillouin scattering phenomenon with the pump light (continuous light CWpump1) incident on the other end of the sensing optical fiber 22 and propagating in the sensing optical fiber 18.

The light attributed to the Brillouin scattering phenomenon is emitted from the one end of the sensing optical fiber 18 and incident on the Brillouin time domain detector 17 via the optical circulator 14. The Brillouin time domain detector 17 applies a time domain analysis to the received light attributed to the Brillouin scattering phenomenon based on the emission timing of the intensity-stepwise optical pulse OPs notified from the control processor 16 and measures the distribution of the light intensity of the light attributed to the Brillouin scattering phenomenon in the longitudinal direction of the sensing optical fiber 18.

In this way, the Brillouin time domain detector 17 causes the CW light source 19 to emit the continuous light of the minimum frequency fL as the pump light and causes the stepwise optical light source 11 to emit the intensity-stepwise optical pulse OPs as the probe light, thereby causing the Brillouin scattering phenomenon to occur in the sensing optical fiber 18 by these probe light and pump light; applies a time domain analysis to the light attributed to the Brillouin scattering phenomenon; and measures the distribution of the light intensity of the light attributed to the Brillouin scattering phenomenon in the longitudinal direction of the sensing optical fiber 18. By conducting a measurement in this way, a curve m1 shown in FIG. 14A which is the distribution of the light intensity of the light attributed to the Brillouin scattering phenomenon and corresponding to the pump light of the minimum frequency fL can be obtained.

Here, the degree of interaction between the probe light and the pump light attributed to the Brillouin scattering phenomenon depends on the relative relationship between the plane of polarization of the probe light and that of the pump light. Since the plane of polarization of the intensity-stepwise optical pulse OPs is randomly changed in the light intensity/polarization regulator 13 for each measurement in the distributed optical fiber sensor 1 according to this embodiment, this dependency can be substantially eliminated by adopting an average value obtained by repeating the measurement of the distribution of the light intensity of the light attributed to the Brillouin scattering phenomenon and corresponding to the pump light of the minimum frequency fL a plurality of times. Thus, the distribution m1 of the light intensity of the light attributed to the Brillouin scattering phenomenon can be accurately obtained. In this embodiment, for example, the measurement is repeated 500 times or 1000 times.

Upon completing the measurement of the distribution m1 of the light attributed to the Brillouin scattering phenomenon and corresponding to the pump light of the minimum frequency fL, the Brillouin time domain detector 17 first causes the CW light source 19 to emit a continuous light as pump light of a next frequency and causes the stepwise optical light source 11 to emit the intensity-stepwise optical pulse OPs as probe light by the same operation as above in order to measure the distribution of the light intensity of light attributed to the Brillouin scattering phenomenon and corresponding to the pump light of the next frequency. Then, the Brillouin time domain detector 17 applies a time domain analysis to the light attributed to the Brillouin scattering phenomenon, emerged from the one end of the sensing optical fiber 18 and incident on the Brillouin time domain detector 17 via the optical circulator 14 based on the emission timing of the intensity-stepwise optical pulse OPs, and measures a distribution m2 of the light intensity of the light attributed to the Brillouin scattering phenomenon in the longitudinal direction of the sensing optical fiber 18 for the next frequency.

Upon completing the measurement of the distribution m2 of the light attributed to the Brillouin scattering phenomenon and corresponding to the pump light of the next frequency, the Brillouin time domain detector 17 successively changes the frequency of the pump light up to a maximum fu and measures distributions m3, m4, . . . of the light intensity of the light attributed to the Brillouin scattering phenomenon and corresponding to the pump of the corresponding frequencies in the same manner as above. Here, a distribution mn represents the distribution m of the light intensity of the light attributed to the Brillouin scattering phenomenon and corresponding to the pump light of the n-th frequency in the scanning frequency range.

By measuring in this way, the distributions m1, m2, m3, . . . , mn of the light intensities of the lights attributed to the Brillouin scattering phenomenon in the longitudinal direction of the sensing optical fiber 18 at the respective frequencies of the scanning frequency range can be obtained with high accuracy and high spatial resolution as shown in FIG. 14A, with the result that the Brillouin loss/gain spectra BSl/g(νd) in the respective longitudinal area sections of the sensing optical fiber 18 can be obtained with high accuracy and high spatial resolution.

Further, the Brillouin time domain detector 17 calculates the Brillouin frequency shift νb in each longitudinal area section of the sensing optical fiber 18 with high accuracy and high spatial resolution by calculating a difference between a frequency corresponding and a peak of the Brillouin loss/gain spectrum BSl/g(νd) in each longitudinal area section of the sensing optical fiber 18 to a frequency corresponding to a peak of the Brillouin loss/gain spectrum BSl/g(νd) in a section where the sensing optical fiber 18 is not strained.

If is, for example, assumed that the sensing optical fiber 18 is not strained in a section at the distance L1 from the one end thereof while being strained in a section at the distance L2 as shown in FIGS. 14A and 14B. The Brillouin loss/gain spectrum BSl/g(νd) at the distance L1 is represented by a solid-line curve "e" in FIG. 14B, whereas the Brillouin loss/gain spectrum BSl/g(νd) at the distance L2 is represented by a broken-line curve "f" in FIG. 14B. In this case, the Brillouin frequency shift νb=νb2−νb1 is calculated by subtracting a difference between a frequency νb1 corresponding to the peak of the Brillouin loss/gain spectrum Brillouin loss/gain spectrum BSl/g(νd) at the distance L1 from a frequency νb2 corresponding to the peak of the Brillouin loss/gain spectrum BSl/g(νd) at the distance L2.

Then, the Brillouin time domain detector 17 determines strains and/or temperatures in the respective longitudinal area sections of the sensing optical fiber 18 with high accuracy and high spatial resolution from the Brillouin frequency shifts νb in the respective area sections. The distribution(s) of the determined strains and/or temperatures in the respective longitudinal area sections of the sensing optical fiber 18 are presented on an unillustrated output device such as a CRT display device, an XY plotter or a printer.

Since the intensity-stepwise optical pulse OPs is used as the probe light in the distributed optical fiber sensor 1 according to the first embodiment as described above, the aforementioned ratio Prx from which the Lorenz curve can be obtained can be stored in the Brillouin time domain detector 17 beforehand, wherefore it is not necessary, unlike the background art, to manually adjust the optical pulse in conformity with the length of the sensing optical fiber 18 every time a measurement is conducted. Accordingly, the distributed optical fiber sensor 1 can be produced as an industrial product. Further, since the optimal ratio Prx can be set as a result of a logic analysis, the Brillouin loss/gain spectrum BSl/g(vd) can be presented by a Lorenz curve, wherefore strain caused in and/or temperature of the sensing optical fiber 18 can be measured with high accuracy and high spatial resolution.

Second Embodiment

A distributed optical fiber sensor according to a second embodiment of the present invention is for detecting strain and/or temperature based on Brillouin frequency shifts by causing a probe light and a pump light to be incident on one end of a sensing optical fiber for detecting strains and/or temperatures, receiving the pump light subjected to the action of a Brillouin scattering phenomenon in the sensing optical fiber, and applying a Brillouin gain spectrum time domain reflection analysis ($B^{Gain}$-OTDR, Brillouin gain optical time domain reflectometer) or a Brillouin loss spectrum time domain reflection analysis ($B^{Loss}$-OTDR, Brillouin loss optical time domain reflectometer). Hereinafter, the Brillouin gain spectrum time domain reflection analysis or the Brillouin loss spectrum time domain reflection analysis is abbreviated as a Brillouin loss/gain spectrum time domain reflection analysis. In this Brillouin loss/gain spectrum time domain reflection analysis, light attributed to the Brillouin scattering phenomenon is a Brillouin scattering light.

Figure 15:
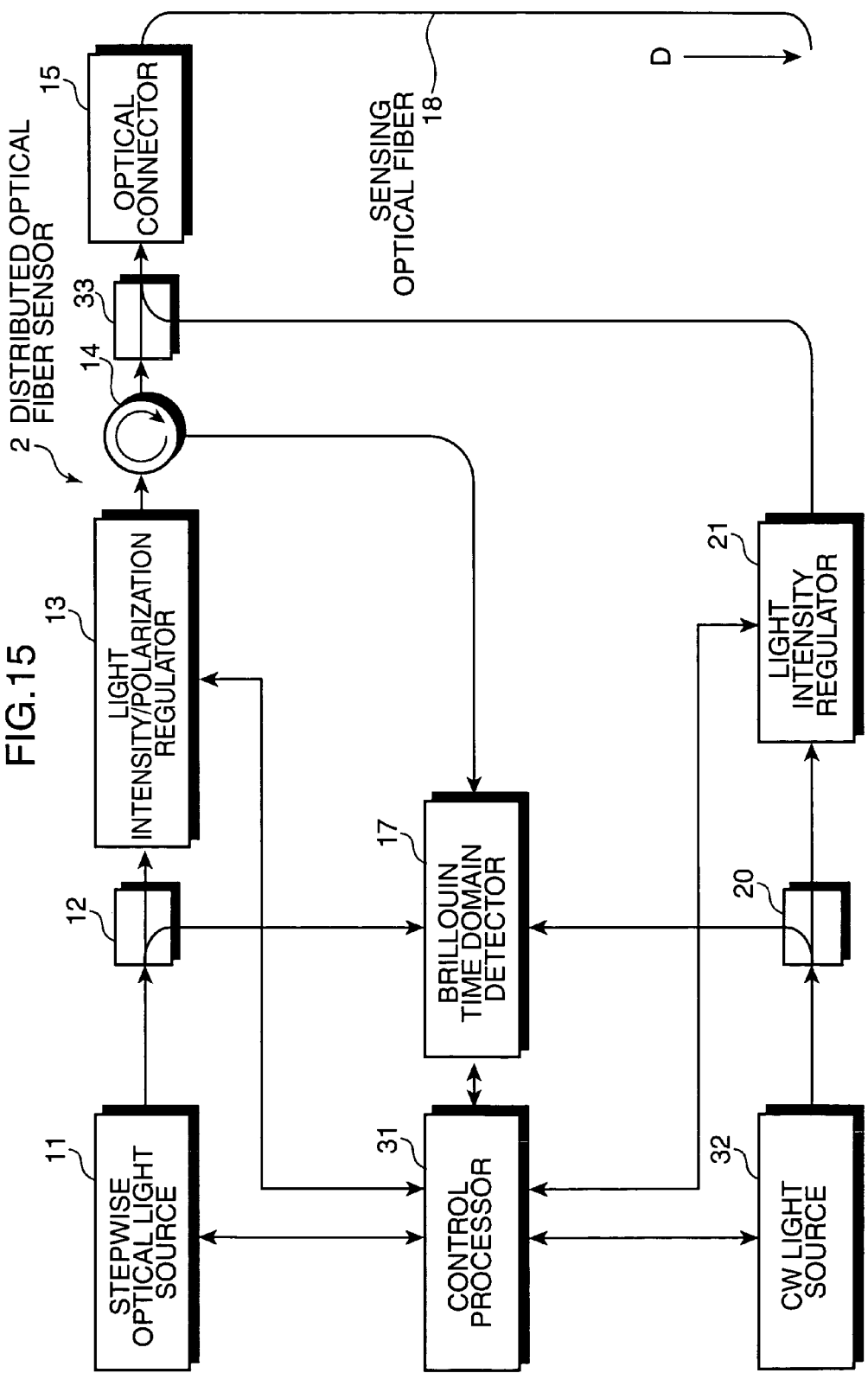
FIG. 15 is a block diagram showing a construction of a distributed optical fiber sensor according to a second embodiment.

First, the construction of the distributed optical fiber sensor according to the second embodiment is described. FIG. 15 is a block diagram showing the construction of the distributed optical fiber sensor according to the second embodiment, and FIG. 16 is a block diagram showing the construction of a CW light source of the distributed optical fiber sensor according to the second embodiment.

In FIG. 15, the distributed optical fiber sensor 2 according to the second embodiment is provided with a stepwise optical light source 11, an optical coupler 12, a light intensity/polarization regulator 13, an optical circulator 14, an optical coupler 33, an optical connector 15, a control processor 31, a Brillouin time domain detector 17, a sensing optical fiber 18, a CW light source 32, an optical coupler 20, and a light intensity regulator 21.

An output terminal of the stepwise optical light source 11 is optically connected with an input terminal of the optical coupler 12. One output terminal of the optical coupler 12 is optically connected with an input terminal of the light intensity/polarization regulator 13. An output terminal of the light intensity/polarization regulator 13 is optically connected with a first terminal of the optical circulator 14. A second terminal of the optical circulator 14 is optically connected with one input terminal of the optical coupler 33. An output terminal of the optical coupler 33 is optically connected with one end of the sensing optical fiber 18 via the optical connector 15.

Further, an output terminal of the CW light source 32 is optically connected with an input terminal of the optical coupler 20. One output terminal of the optical coupler 20 is optically connected with an input terminal of the light intensity modulator 21. An output terminal of the light intensity modulator 21 is optically connected with the other input terminal of the optical coupler 33.

The other output terminal of the optical coupler 12 is optically connected with a first input terminal of the Brillouin time domain detector 31, the other output terminal of the optical coupler 20 is optically connected with a second input terminal of the Brillouin time domain detector 31, and a third terminal of the optical circulator 14 is optically connected with a third input terminal of the Brillouin time domain detector 31.

These stepwise optical light source 11, optical coupler 12, light intensity/polarization regulator 13, optical circulator 14, optical connector 15, Brillouin time domain detector 17, sensing optical fiber 18, optical coupler 20 and light intensity regulator 21 are not described since they are the same as in the first embodiment.

The optical coupler 33 is an optical component for projecting an incident light while dividing it into two and is similar to the optical couplers 12, 22.

The CW light source 32 is a device controlled by the control processor 16 and adapted to emit a substantially constant continuous light CWpump2 in a specified frequency range fr. The continuous light CWpump2 is emitted at a specified timing only for a specified period. As shown in FIG. 16, the CW light source 32 includes, for example, a substrate 131, a temperature detecting element 132, a light emitting element 133, an optical coupler 134, an EF 135, a first light receiving element 136, a second light receiving element 137, a temperature regulating element 138, an ATC 139, an AFC 140, a third light intensity modulator 161 and a third light-intensity-modulator driving portion 162. Specifically, the third light intensity modulator 161 and the third light-intensity-modulator driving portion 162 are added to the CW light source 19 shown in FIG. 12 since the CW light source 32 needs to emit the continuous light pump 2 at the specified timing only for the specified period. Since the substrate 131, the temperature detecting element 132, the light emitting element 133, the optical coupler 134, the EF 135, the first light receiving element 136, the second light receiving element 137, the temperature regulating element 138, the ATC 139 and the AFC 140 of the CW light source 32 are respectively similar to the substrate 101, the temperature detecting element 102, the light emitting element 103, the optical coupler 104, the EF 105, the first light receiving element 106, the second light receiving element 107, the temperature regulating element 108, the ATC 109 and the AFC 110 of the stepwise optical light source 11 including the optical connections and the electrical connections except that the AFC 140 changes the oscillating frequency of the light emitting element 133 in accordance with the control of the control processor 16, no description is given thereon.

The third light intensity regulator 161 is an optical component for modulating the light intensity of an incident light similar to the first and second light intensity regulators 111, 113. The third light-intensity-modulator driving portion 162 is a driver circuit controlled by the control processor 16 for driving the third light intensity regulator 161 similar to the first and second light-intensity-modulator driving portions 112, 114. Light from the light emitting element 133 is incident on the third light intensity regulator 161, which is turned on and off to emit and stop the emission of the continuous light CWpump2 from the light emitting element 133 in accordance with the control of the third light-intensity-modulator driving portion 162. The light emitted from the third light intensity regulator 161 when the third light intensity regulator 161 is on is incident on the optical coupler 20 as an output light of the CW light source 32. The CW light source 32 emits the continuous light CWpump2 at the specified timing only for the specified period by operating in this way.

It should be noted that an optical amplifier 163 for amplifying the light to compensate for a loss of the third light intensity regulator 161 may be arranged behind the third light intensity regulator 161 as shown in broken line in FIG. 16.

The control processor 31 is an electronic circuit for controlling the stepwise optical light source 11, the light intensity/polarization regulator 13, the CW light source 19 and the light intensity regulator 21 such that the pump light and the probe light are caused to propagate in the sensing optical fiber 18 in such a manner that the probe light is incident on one end of the sensing optical fiber 19 at a timing when the pump light having been incident on the one end of the sensing optical fiber 18 is reflected at the other end, and a strain and/or temperature distribution of the sensing optical fiber 18 in the longitudinal direction of the sensing optical fiber 18 can be measured with high spatial resolution by inputting and outputting signals to and from the Brillouin time domain detector 17. The control processor 31 includes, for example, a microprocessor, a working memory, and a memory for storing data.

It should be noted that a mirror portion for reflecting the incident light may be further provided at the other end of the sensing optical fiber 18 to efficiently reflect the pump light having propagated from the one end to the other end of the sensing optical fiber 18 without losing its power. Alternatively, the other end of the sensing optical fiber 18 may be mirror-finished.

Next, the operation of the distributed optical fiber sensor according to the second embodiment is described.

The distributed optical fiber sensor 2 according to the second embodiment causes the stepwise optical light source 11 to emit an intensity-stepwise optical pulse OPs having a specified ratio Prx by an operation similar to that of the distributed optical fiber sensor 1 according to the first embodiment. The distributed optical fiber sensor 2 adjusts an amount of attenuation of the light intensity/polarization modulator 13 such that the intensity-stepwise optical pulse OPs is incident as probe light on the sensing optical fiber 18 at such an optimal light intensity as to give a Brillouin loss/gain spectrum BSl/g(vd) represented by a Lorenz curve by an operation similar to that of the distributed optical fiber sensor 1 according to the first embodiment. Upon completing the adjustment, the distributed optical fiber sensor 2 according to the second embodiment causes the control processor to control the stepwise optical light source 11 to stop the emission of the specified intensity-stepwise optical pulse OPs.

Then, the distributed optical fiber sensor 2 according to the second embodiment causes the CW light source 11 and the light intensity regulator 21 to adjust the light intensity of the pump light to such an optimal light intensity as to give a Brillouin loss/gain spectrum BSl/g(vd) represented by a Lorenz curve by an operation similar to that of the distributed optical fiber sensor 1 according to the first embodiment. Upon completing the adjustment, the distributed optical fiber sensor 2 according to the second embodiment causes the control processor 16 to control the CW light source 19 to stop the emission of the continuous light CWpump2.

Then, the distributed optical fiber sensor 2 according to the second embodiment starts measuring the Brillouin loss/gain spectra BSl/g(vd) to obtain distributions m1, m2, m3, m4, .. ., mn of the light intensities of lights attributed to the Brillouin scattering phenomenon in the longitudinal direction of the sensing optical fiber 18 at the respective frequencies of a scanning frequency range with high accuracy and high spatial resolution.

Here, since the distributed optical fiber sensor 2 according to the second embodiment applies the Brillouin loss/gain spectrum time domain reflection analysis, the pump light and the probe light are caused to propagate in the sensing optical fiber 18 such that the probe light is incident on the one end of the sensing optical fiber 18 at a timing when the pump light having been incident on the one end of the sensing optical fiber 18 is reflected at the other end at the respective frequencies of the scanning frequency range fr, and the lights attributed to the Brillouin scattering phenomenon are analyzed by the Brillouin scattering phenomenon detector 17.

Based on the distributions m1, m2, m3, m4, . . . , mn of the light intensities of lights attributed to the Brillouin scattering phenomenon in the longitudinal direction of the sensing optical fiber 18 at the respective frequencies of a scanning frequency range, which were thus obtained with high accuracy and high spatial resolution, the distributed optical fiber sensor 2 according to the second embodiment determines strains and/or temperatures in the respective longitudinal area sections of the sensing optical fiber 18 with high accuracy and high spatial resolution and presents them on an unillustrated output device by an operation similar to that of the distributed optical fiber sensor 1 according to the first embodiment.

Since the distributed optical fiber sensor 2 according to the second embodiment uses the intensity-stepwise optical pulse as the probe light similar to the distributed optical fiber sensor 1 according to the first embodiment, the aforementioned ratio Prx from which a Lorenz curve can be obtained can be stored in the Brillouin time domain detector 17 beforehand, wherefore it is not necessary, unlike the background art, to manually adjust the optical pulse in conformity with the length of the sensing optical fiber 18 every time a measurement is conducted. Accordingly, the distributed optical fiber sensor 2 can be produced as an industrial product. Further, since the optimal ratio Prx can be set as a result of a logic analysis, the Brillouin loss/gain spectrum BSl/g(vd) can be presented by a Lorenz curve, wherefore strain caused in and/or temperature of the sensing optical fiber 18 can be measured with high accuracy and high spatial resolution.

Third Embodiment

A distributed optical fiber sensor according to a third embodiment of the present invention can singly apply a Brillouin gain spectrum time domain reflection analysis and a Brillouin loss spectrum time domain reflection analysis.

First, the distributed optical fiber sensor according to the third embodiment is described. FIG. 17 is a block diagram showing the construction of the distributed optical fiber sensor according to the third embodiment.

In FIG. 17, the distributed optical fiber sensor 3 according to the third embodiment is provided with a stepwise optical light source 11, an optical coupler 12, a light intensity/polarization regulator 13, an optical circulator 14, an optical coupler 33, an optical connector 15, a control processor 41, a Brillouin time domain detector 17, a sensing optical fiber 18, a CW light source 32, an optical coupler 20, a light intensity regulator 21, an optical switch 42 and an optical connector 22.

An output terminal of the stepwise optical light source 11 is optically connected with an input terminal of the optical coupler 12. One output terminal of the optical coupler 12 is optically connected with an input terminal of the light intensity/polarization regulator 13. An output terminal of the light intensity/polarization regulator 13 is optically connected with a first terminal of the optical circulator 14. A second terminal of the optical circulator 14 is optically connected with one input terminal of the optical coupler 33. An output terminal of the optical coupler 33 is optically connected with one end of the sensing optical fiber 18 via the optical connector 15.

Further, an output terminal of the CW light source 32 is optically connected with an input terminal of the optical coupler 20. One output terminal of the optical coupler 20 is optically connected with an input terminal of the light intensity modulator 21. An output terminal of the light intensity modulator 21 is optically connected with an input terminal of the optical switch 42. One output terminal of the optical switch 42 is optically connected with the other input terminal of the optical coupler 33, and the other output terminal thereof is optically connected with the other end of the sensing optical fiber 18 via the connector 24.

The other output terminal of the optical coupler 12 is optically connected with a first input terminal of the Brillouin time domain detector 17, the other output terminal of the optical coupler 20 is optically connected with a second input terminal of the Brillouin time domain detector 17, and a third terminal of the optical circulator 14 is optically connected with a third input terminal of the Brillouin time domain detector 17.

An output of the Brillouin time domain detector 17 is inputted to the control processor 41, which controls the stepwise optical light source 11, the light intensity/polarization regulator 13, the CW light source 32, the light intensity regulator 21 and the optical switch 42, respectively.

These stepwise optical light source 11, optical coupler 12, light intensity/polarization regulator 13, optical circulator 14, optical connector 15, Brillouin time domain detector 17, sensing optical fiber 18, optical coupler 20, light intensity regulator 21 and optical connector 22 are not described since they are the same as in the first embodiment. Further, the CW light source 32 and the optical coupler 33 are not described since they are the same as in the second embodiment.

The optical switch 42 is a 1×2 optical switch having one input and two outputs, wherein light incident on the input terminal is selectively emitted from either one of the two output terminals in accordance with the control of the control processor 41.

A mechanical optical switch or a light guide switch can be, for example, used as the light switch 42. The mechanical optical switch is a micro-optical element such as a prism, a rod lens or a mirror or an optical component for switching a light path by moving or turning the optical fiber itself or may be an optical switch of the opto micro electromechanical system for mechanically moving a refractive index matching fluid filled between light guides using a semiconductor fine processing technology or moving a mirror by means of an electrostatic actuator. The light guide switch is, for example, an optical component in which a Mach-Zehnder interference is constituted by a light guide, electric fields are applied to the respective light guide arms to change the refractive indices of the respective light guide arms, thereby switching a light path. There are also known semiconductor optical switches utilizing a change in refractive index by the carrier injection or semiconductor optical switches of the delivery and convergence type using an optical semiconductor amplifier as an on/off gate.

The control processor 41 is an electronic circuit for controlling the stepwise optical light source 11, the light intensity/polarization regulator 13, the CW light source 19, the light intensity regulator 21 and the optical switch 42 such that the pump light and the probe light are caused to propagate in the sensing optical fiber 18 in such a manner that a strain and/or temperature distribution of the sensing optical fiber 18 in the longitudinal direction of the sensing optical fiber 18 can be measured at high spatial resolution through the Brillouin loss/gain spectrum time domain analysis and the Brillouin loss/gain spectrum time domain reflection analysis by inputting and outputting signals to and from the Brillouin time domain detector 17. The control processor 31 includes, for example, a microprocessor, a working memory, and a memory for storing data.

Next, the operation of the distributed optical fiber sensor according to the third embodiment is described.

First, in the case of applying the Brillouin loss/gain spectrum time domain analysis using the distributed optical fiber sensor 3 according to the third embodiment, the control processor 41 controls the optical switch 42 such that light incident on the input terminal of the optical switch 42 emerges from the output terminal thereof optically connected with the other end of the sensing optical fiber 18 via the optical connector 22. The operation of the distributed optical fiber sensor 3 according to the third embodiment is not described because it is similar to that of the distributed optical fiber sensor according to the first embodiment.

Next, in the case of applying the Brillouin loss/gain spectrum time domain reflection analysis using the distributed optical fiber sensor 3 according to the third embodiment, the control processor 41 controls the optical switch 42 such that light incident on the input terminal of the optical switch 42 emerges from the output terminal thereof optically connected with the one end of the sensing optical fiber 18 via the optical coupler 33 and the optical connector 15. The operation of the distributed optical fiber sensor 3 according to the third embodiment is not described because it is similar to that of the distributed optical fiber sensor according to the second embodiment.

In this case, the pump light subjected to the interaction of the probe light and the Brillouin scattering phenomenon in the sensing optical fiber 18 and emerged from the one end of the sensing optical fiber 18 is divided into two by the optical coupler 33, one of which is incident on the Brillouin time domain detector 17 via the optical circulator 14. Specifically, the power of the pump light subjected to the interaction is lost in the optical coupler 33. In order to compensate for this loss, an optical amplifier may be further provided on a light path from the optical circulator 14 to the Brillouin time domain detector 17. Alternatively, the Brillouin time domain detector 17 may include an amplifier so as to amplify the pump light after being received by the light receiving element to be photoelectrically converted.

As described above, the distributed optical fiber sensor 3 according to the third embodiment uses the intensity-stepwise optical pulse as the probe light similar to the distributed optical fiber sensors 1, 2 according to the first and second embodiment. Thus, the aforementioned ratio Prx from which a Lorenz curve can be obtained can be stored in the Brillouin time domain detector 17 beforehand, wherefore it is not necessary, unlike the background art, to manually adjust the optical pulse in conformity with the length of the sensing optical fiber 18 every time a measurement is conducted.

Accordingly, the distributed optical fiber sensor 3 can be produced as an industrial product. Further, since the optimal ratio Prx can be set as a result of a logic analysis, the Brillouin loss/gain spectrum BSl/g(vd) can be presented by a Lorenz curve, wherefore strain caused in and/or temperature of the sensing optical fiber 18 can be measured with high accuracy and high spatial resolution.

Fourth Embodiment

The distributed optical fiber sensors 1, 2, 3 according to the first to third embodiments are for measuring strain caused in and/or temperature of the sensing optical fiber 18 with high accuracy and high spatial resolution without manually adjusting the optical pulse in accordance with the length of the sensing optical fiber 18, by using the intensity-stepwise optical pulse OPs as the probe light. A distributed optical fiber sensor according to a fourth embodiment is such that distributions M1, M2 of light intensities of lights attributed to the Brillouin scattering phenomenon in a pulsed light having the light intensity P2 of the optical pulse front light OPf and the intensity-stepwise optical pulse OPs are respectively measured by the constructions of the distributed optical fiber sensors 1, 2, 3 according to the first to third embodiments, a difference M2−M1 between the distributions M1, M2 of the light intensities of these measured lights attributed to the Brillouin scattering phenomenon is calculated, and Brillouin loss/gain spectra BSl/g(vd) in the respective longitudinal area sections of the sensing optical fiber 18 are determined, thereby improving errors created in the detection results of the distributed optical fiber sensors 1, 2, 3 according to the first to third embodiments, particularly errors created in the vicinity of 1/(Tp+Tf).

Since the distributed optical fiber sensor according to the fourth embodiment is capable of improving errors by being thus constructed, the time width Tf of the optical pulse front light Tf of the intensity-stepwise optical pulse OPs can be set beyond the range Tp≦Tf≦28.57 ns, e.g. Tp=50 ns in the distributed optical fiber sensor according to the fourth embodiment although the time width Tf of the optical pulse front light Opf is set within the range Tp<Tf≦(1/35 MHz) =28.57 ns in the distributed optical fiber sensors 1, 2, 3 according to the first to third embodiments. Of course, it goes without saying that the time width Tf of the optical pulse front light OPf within the range Tp<Tf<28.57 nm can be used. Further, since being capable of improving errors by being thus constructed, the distributed optical fiber sensor according to the fourth embodiment is suitable in the case where minute strains of 200με or smaller are detected when strains are equally distributed in a wide range.

The construction of the distributed optical fiber sensor according to the fourth embodiment is not described since it is the same as in the first to third embodiments except that the Brillouin loss/gain spectra BSl/g(vd) in the respective longitudinal area sections of the sensing optical fiber 18 can be determined by an operation of the Brillouin time domain detector 17 as described below.

Figure 18A:
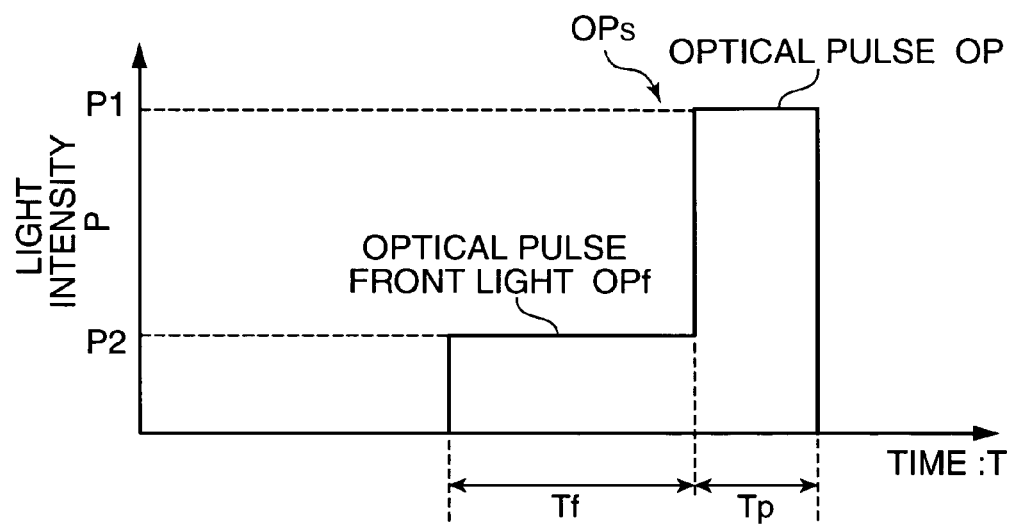
FIG. 18 are charts showing an intensity-stepwise optical pulse and a leakage optical pulse according to a fourth embodiment.
Figure 18B:
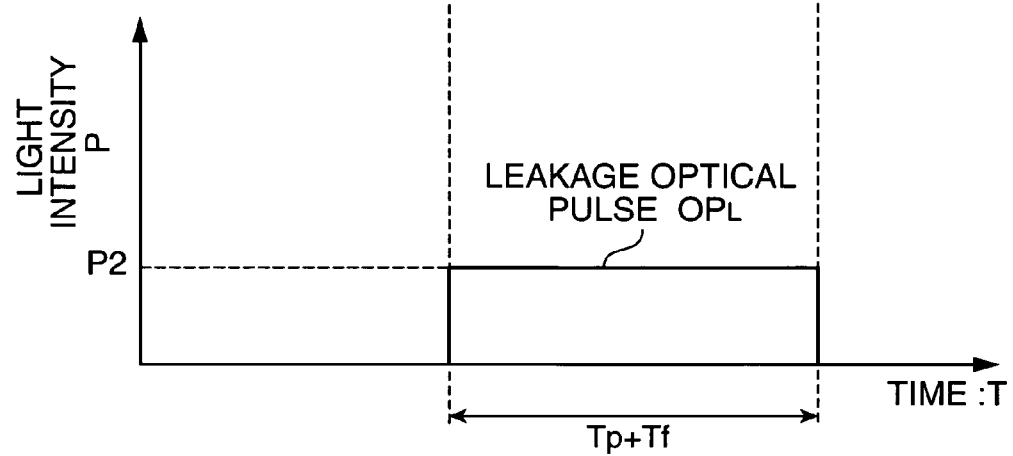
Figure 19:
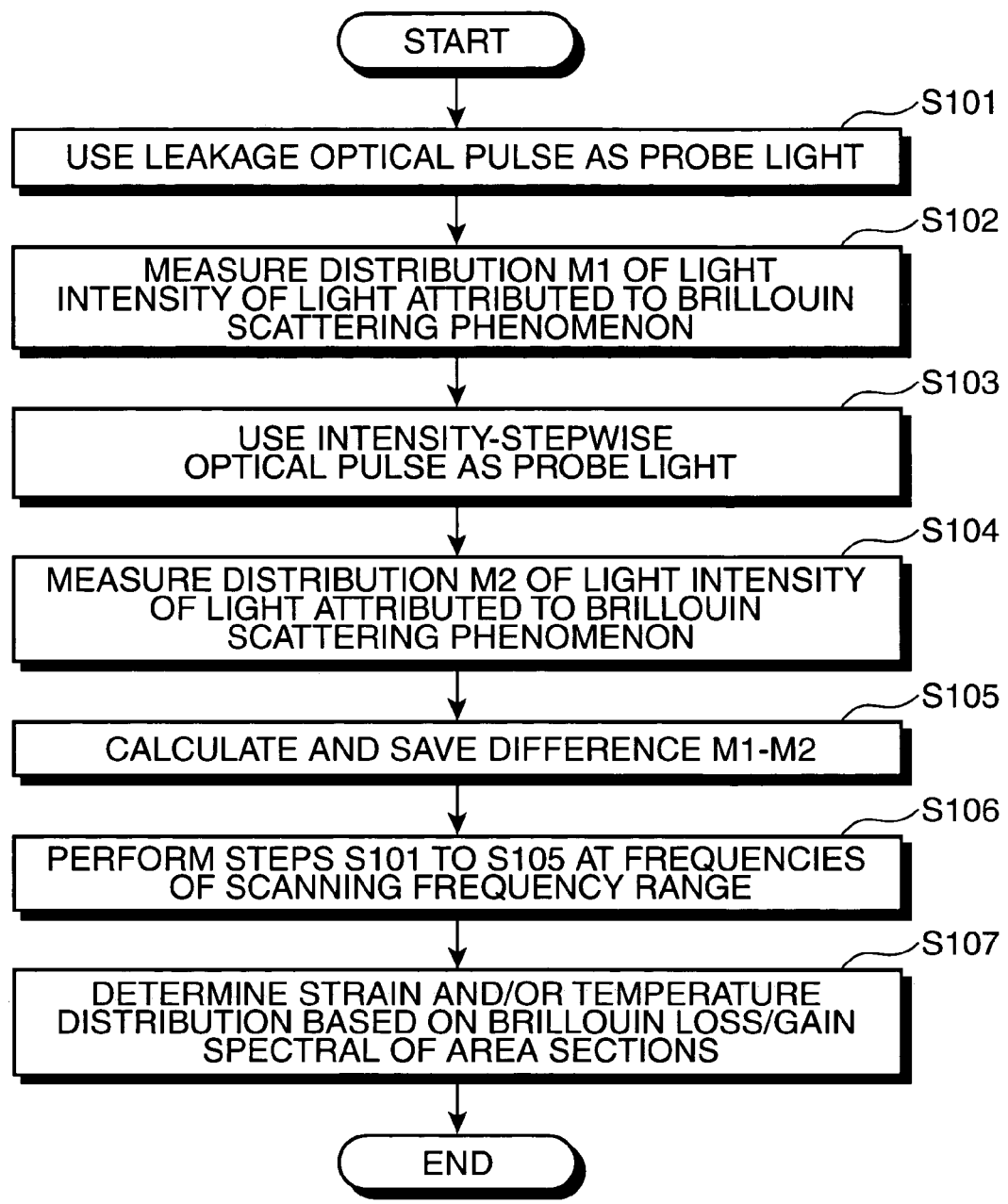
FIG. 19 is a flow chart showing an operation of a distributed optical fiber sensor according to the fourth embodiment.

FIG. 18 are graphs showing an intensity-stepwise optical pulse OPs and a leakage optical pulse in the fourth embodiment, and FIG. 19 is a flow chart showing the operation of the distributed optical fiber sensor according to the fourth embodiment.

In FIG. 19, in the fourth embodiment, the Brillouin time domain detector 17 causes a pump light in the form of a continuous light to be emitted and causes the stepwise optical light source 11 to emit a leakage optical pulse OPL shown in FIG. 18B as probe light (Step S101), measures a distribution M1 of the light intensity of light attributed to the Brillouin scattering phenomenon in the longitudinal direction of the sensing optical fiber 18 and saves this measurement result (Step S102).

In the case of using an optical pulse OP having a time width Tp and a light intensity P1 and the intensity-stepwise optical pulse OPs comprised of an optical pulse front light OPf having a time width Tf and a light intensity P2 as an intensity-stepwise optical pulse, a leakage optical pulse OPL is an optical pulse having a time width (Tp+Tf) and the light intensity P2 as shown in FIG. 18B. In other words, the time width of the leakage optical pulse OPL is that of the intensity-stepwise optical pulse OPs and the light intensity thereof is that of the optical pulse front light OPf having a minimum light intensity in the intensity-stepwise optical pulse OPs.

Referring back to FIG. 19, the Brillouin time domain detector 17 subsequently causes a pump light in the form of a continuous light to be emitted and causes the stepwise optical light source 11 to emit the intensity-stepwise optical pulse OPs shown in FIG. 18A as probe light (Step S103), and measures a distribution M2 of the light intensity of light attributed to the Brillouin scattering phenomenon in the longitudinal direction of the sensing optical fiber 18 and saves this measurement result (Step S104).

Subsequently, the Brillouin time domain detector 17 calculates a difference M2−M1 between the distribution M1 measured in Step S102 and the distribution M2 measured in Step S104 and saves this difference M2−M1 (Step S105). This difference M2−M1 corresponds to "m" in the first embodiment.

Such operations in Steps S101 to S105 are carried out at the respective frequencies of the scanning frequency range (Step S106) to determine distributions m1, m2, m3, m4, . . . , mn of the light intensities of the lights attributed to the Brillouin scattering phenomenon in the longitudinal direction of the sensing optical fiber 18 and to determine the Brillouin loss/gain spectra BSl/g(vd) in the respective longitudinal area sections of the sensing optical fiber 18 from the determined distributions, and a strain distribution and/or a temperature distribution in the longitudinal direction of the sensing optical fiber 18 are determined based on the determined Brillouin loss/gain spectra BSl/g(vd) (Step S107).

By operating in this way, the distributed optical fiber sensor according to the fourth embodiment is capable of improving errors better than the distributed optical fiber sensors 1, 2, 3 according to the first to third embodiments and measuring strain caused in and/or temperature of the distributed optical fiber sensor 18 with high accuracy and high spatial resolution even if the intensity-stepwise optical pulse OPs whose optical pulse front light OPf has the time width Tf beyond the range Tp<Tf≦28.57 nm. The distributed optical fiber sensor according to the fourth embodiment is also capable of detecting minute strains of 200με or smaller in the case where strains are equally distributed in a wide range. Further, in the fourth embodiment as well, it goes without saying that it is not necessary, unlike the background art, to manually adjust the optical pulse in conformity with the length of the sensing optical fiber 18 every time a measurement is conducted. Accordingly, the distributed optical fiber sensor 3 can be produced as an industrial product.

Fifth Embodiment

Although the distributed optical fiber sensor according to the fourth embodiment is for improving errors created in the detection results of the distributed optical fiber sensors 1, 2, 3 according to the first to third embodiments by using the pulse light having the light intensity P2 of the optical pulsed front light OPf and the intensity-stepwise optical pulse OPs as the probe light in the constructions of the distributed optical fiber sensors 1, 2, 3 according to the first to third embodiments, a distributed optical fiber sensor according to a fifth embodiment is for improving errors created in the detection results of the distributed optical fiber sensors 1, 2, 3 according to the first to third embodiments by connecting a reference optical fiber with one end of the sensing optical fiber 18 and correcting the mean frequencies of the Brillouin loss/gain spectra BSl/g(vd) as measurement results based on a reference value obtained from the reference optical fiber in the constructions of the distributed optical fiber sensors 1, 2, 3 according to the first to third embodiments.

Figure 20:
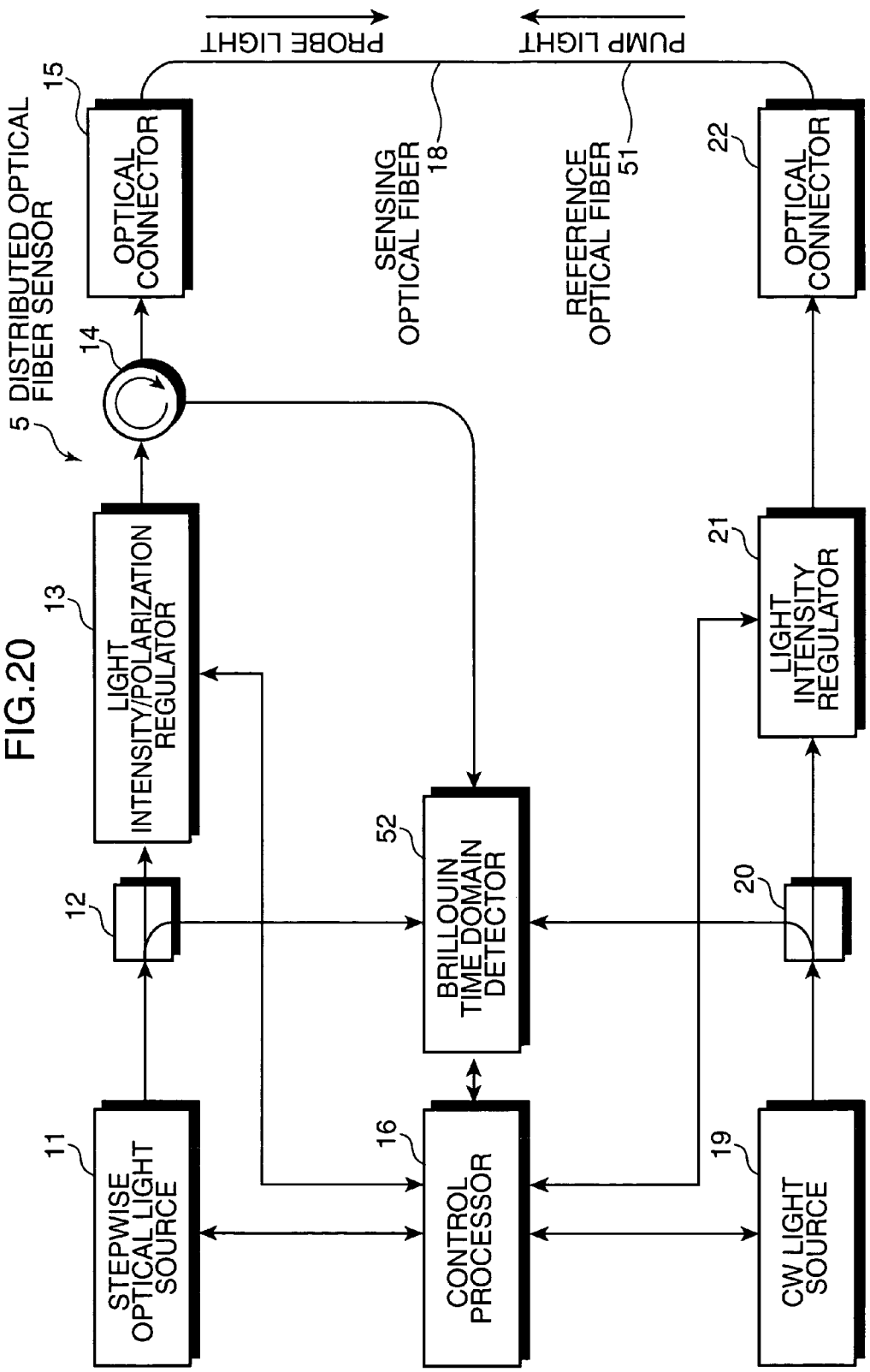
FIG. 20 is a block diagram showing a construction of a distributed optical fiber sensor according to a fifth embodiment corresponding to the distributed optical fiber sensor according to the first embodiment.

FIG. 20 is a block diagram showing the construction of the distributed optical fiber sensor according to the fifth embodiment corresponding to the distributed optical fiber sensor according to the first embodiment.

In FIG. 20, the construction of the distributed optical fiber sensor 5 according to the fifth embodiment is not described since being the same as those of the first to third embodiments except that a reference optical fiber 51 is connected with one end of the sensing optical fiber 18, i.e. an end where a pump light is incident in an example shown in FIG. 20, and a Brillouin time domain detector 52 in which a correction-value conversion equation to be described later is stored and which calculates a correction value based on a reference value obtained from the reference optical fiber 51 using the correction-value conversion equation by operating as described later and corrects the mean frequencies of the Brillouin loss/gain spectra BSl/g(vd) as measurement results using this correction value is used in place of the Brillouin time domain detector 17.

The reference optical fiber 51 is an optical fiber made of the same material as the sensing optical fiber 18 and having a length corresponding to the spatial resolution of the distributed optical fiber sensor 5. Strains sufficiently larger than a strain expressed by an inverse of a time width (Tp+Pf) of an intensity-stepwise optical pulse OPs used in the distributed optical fiber sensor 5, for example, a strain expressed by 2/(Tp+Tf), the one expressed by expressed by 3/(Tp+Tf) and the one expressed by 4/(Tp+Tf) are given to the reference optical fiber 51.

Figure 21:
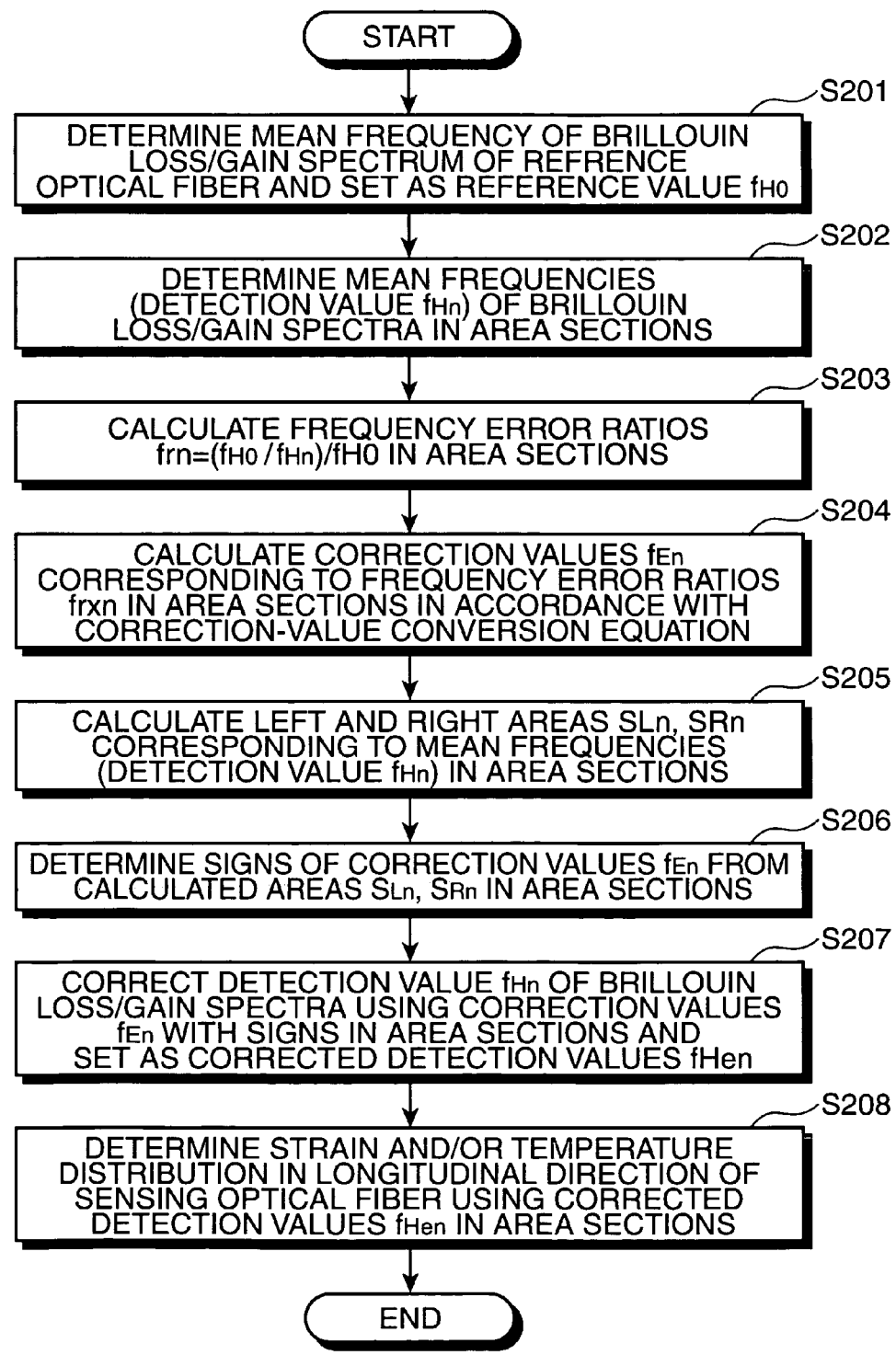
FIG. 21 is a flow chart showing an operation of the distributed optical fiber sensor according to the fifth embodiment.
Figure 22:
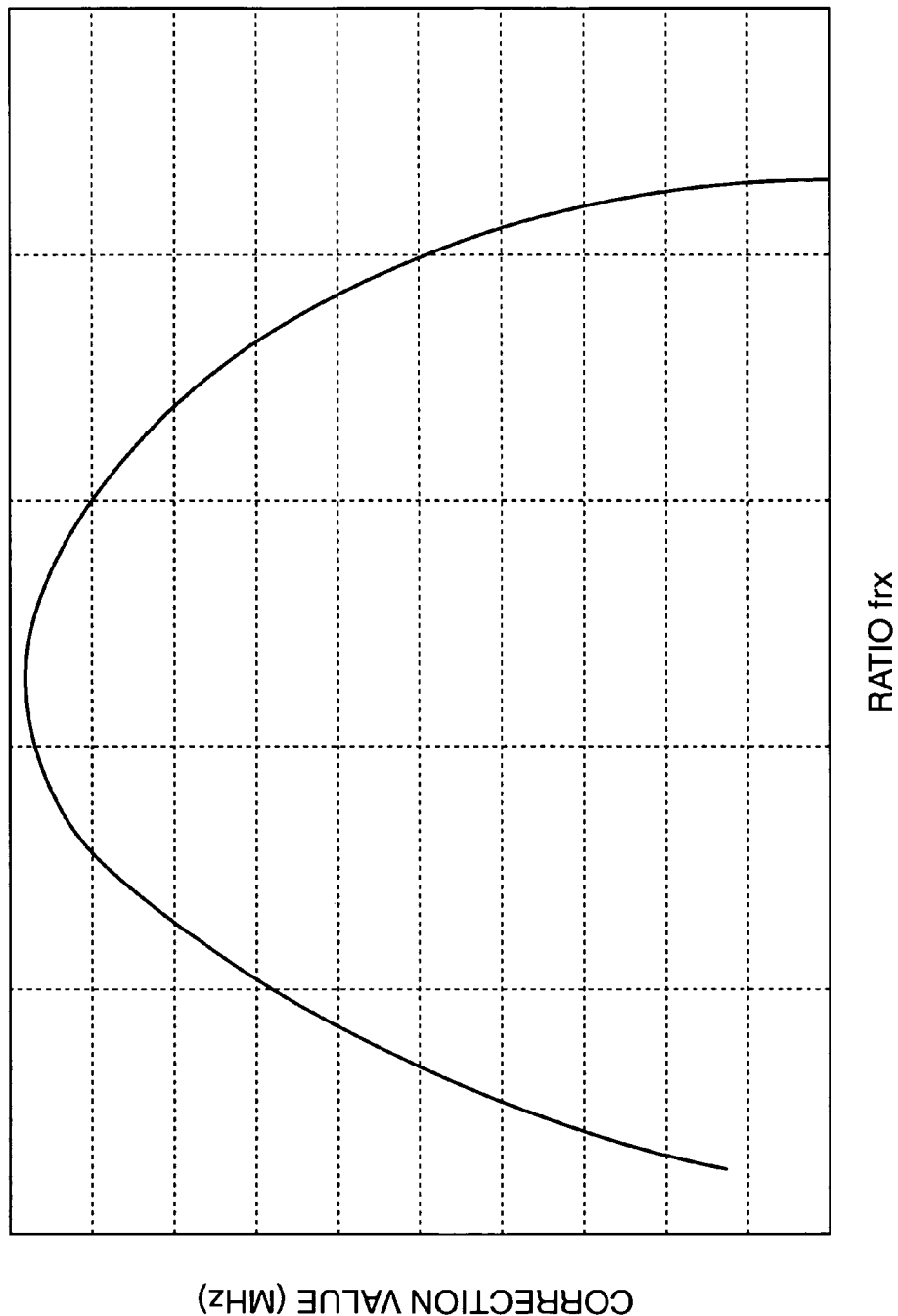
FIG. 22 is a graph showing a frequency error ratio-correction value characteristic curve representing correction value in relation to frequency error ratio.

FIG. 21 is a flow chart showing the operation of the distributed optical fiber sensor according to the fifth embodiment, and FIG. 22 is a graph showing a frequency error ratio-correction value characteristic curve representing a correction value in relation to a frequency error ratio.

In FIG. 21, the Brillouin time domain detector 52 first determines a Brillouin loss/gain spectrum BSl/g(vd) in the reference optical fiber 51, finds out a frequency (mean frequency) at a peak of the determined Brillouin loss/gain spectrum BSl/g(vd) and sets it as a reference value $f_{H0}$ (Step S201). Specifically, the Brillouin time domain detector 52 measures the light intensity of the light attributed to the Brillouin scattering phenomenon in the reference optical fiber 51 at each frequency of a scanning frequency range. Subsequently, the Brillouin time domain detector 52 determines the Brillouin loss/gain spectrum BSl/g(vd) in the reference optical fiber 51 from the respective measured light intensities. Then, the Brillouin time domain detector 52 determines a mean frequency of this Brillouin loss/gain spectrum BSl/g (vd) and sets it as the reference value $f_{H0}$.

Subsequently, the Brillouin time domain detector 52 determines the Brillouin loss/gain spectra BSl/g(vd) in the respective longitudinal area sections of the sensing optical fiber 18 by the same operation as in the first to third embodiments, and finds out frequencies (means frequencies) at peaks of the respective Brillouin loss/gain spectra BSl/g(vd) in the respective area sections and sets them as detection values $f_{Hn}$ (Step S202). Specifically, the Brillouin time domain detector 52 measures distributions m1, m2, m3, m4, . . . , mn of the light intensities of the light attributed to the Brillouin scattering phenomenon in the longitudinal direction of the sensing optical fiber 18 at the respective frequencies of the scanning frequency range. Subsequently, the Brillouin time domain detector 52 determines the Brillouin loss/gain spectra BSl/g (vd) in the respective longitudinal area sections of the sensing optical fiber 18 from the measured distributions m1, m2, m3, m4, . . . , mn, finds out the means frequencies of the respective Brillouin loss/gain spectra BSl/g(vd) and sets them as detection values $f_{Hn}$. Here, the detection value $f_{Hn}$ is the detection value $f_H$ in the n-th area section.

Subsequently, the Brillouin time domain detector 52 calculates a ratio frx (frequency error ratio) of the detection value $f_H$ to the reference value $f_{H0}$ defined by Equation 13 in each area section (Step S203), and calculates a correction value $f_{En}$ corresponding to the frequency error ratio frxn by substituting each calculated frequency error ratio frxn into the correction-value conversion equation (Step S204). Here, the frequency error ratio frxn is a frequency error ratio Frx in the n-th area section, and the correction value $f_{En}$ is a correction value $f_E$ in the n-th area section. The correction-value conversion equation is an equation relating to an error H4 gives to H2, a function expression obtained based on a difference between a value obtained by a simulation using the aforementioned Equations 7 to 11 and a specified strain assuming that the specified strain is given to the sensing optical fiber in accordance with the intensity-stepwise optical pulse OPs used as probe light. This conversion equation is, for example, a function expression of a frequency error ratio-correction value characteristic curve representing the correction value $f_E$ in relation to the frequency error ratio Frx as shown in FIG. 22. The characteristic curve shown in FIG. 22 is a result of a simulation carried out under conditions: Tp=1 ns, Tf=14 ns, ratio Prx=22 dB.

$$frx=(f_{H0}-f_H)/f_{H0} \qquad \text{Equation 13}$$

Although the Brillouin time domain detector 52 converts the frequency error ratio frx into the correction value using the correction-value conversion equation stored in the form of a function expression in this embodiment, the frequency error ratio frx may be converted into the correction value using a look-up table relating the frequency error ratio frx and the correction value to each other in a table format.

Subsequently, the Brillouin time domain detector 52 calculates an area $S_{Ln}$ at a low frequency side of the Brillouin loss/gain spectrum BSl/g(vd) in each area section and an area $S_{Rn}$ at a high frequency side of the Brillouin loss/gain spectrum BSl/g(vd) in each area section from the corresponding detection value $f_{Hn}$ (Step S205). Here, the area $S_{Ln}$ is an area $S_L$ in the n-th area section, and the area $S_{Rn}$ is an area $S_R$ in the n-th area section.

Then, the Brillouin time domain detector 52 determines the sign of each correction value $f_{En}$ calculated in Step S204 based on the calculated corresponding areas $S_{Ln}$ and $S_{Rn}$ in the Brillouin loss/gain spectrum BSl/g(vd) in each area section (Step S206). Specifically, the Brillouin time domain detector 52 determines a minus sign for the correction value $f_E$ calculated in Step S204 if $S_L > S_R$ while determining a plus sign for the correction value $f_E$ calculated in Step S204 if $S_L < S_R$. It should be noted that the correction value $f_E=0$ if $S_L=S_R$.

Subsequently, the Brillouin time domain detector 52 adds the respective correction value $f_{En}$ with the sign obtained in Step S206 to the corresponding detection value $f_{Hn}$ of the Brillouin loss/gain spectrum BSl/g(vd) in each area section (adds the correction value $f_E$ to the detection value $f_H$ in the case of the plus sign of the correction value $f_E$ while subtracting the correction value $f_E$ from the detection value $f_H$ in the case of the minus sign of the correction value $f_E$), and calculates the detection values $f_{Hn}$ (corrected detection values $f_{HEn}$) of the Brillouin loss/gain spectrum BSl/g(vd) after the correction (Step S207).

Subsequently, the Brillouin time domain detector 52 calculates Brillouin frequency shifts vb in the respective longitudinal area sections of the sensing optical fiber 18 by calculating differences between the corrected detection values $f_{HEn}$ of the Brillouin loss/gain spectrum BSl/g(vd) in the respective longitudinal area sections of the sensing optical fiber 18 and the mean frequency of the Brillouin loss/gain spectrum BSl/g(vd) in a section of the sensing optical fiber 18 where there is no strain, and determines a strain distribution and/or a temperature distribution in the longitudinal direction of the sensing optical fiber 18 based on the calculated Brillouin frequency shifts νb in the respective longitudinal sections of the sensing optical fiber 18 (Step S208).

Although the distributed optical fiber sensor 5 of the fifth embodiment corresponding to the construction of the distributed optical fiber sensor 1 of the fifth embodiment is described above, distributed optical fiber sensors of the fifth embodiment corresponding to the constructions of the distributed optical fiber sensors 2, 3 of the second and third embodiments can be similarly constructed by carrying out the aforementioned Steps S201 to S208 in the constructions of the distributed optical fiber sensors 2, 3 of the second and third embodiments.

By operating in this way, the distributed optical fiber sensor according to the fifth embodiment is capable of improving errors better than the distributed optical fiber sensors 1, 2, 3 according to the first to third embodiments and measuring strain caused in and/or temperature of the distributed optical fiber sensor 18 with high accuracy and high spatial resolution. The distributed optical fiber sensor according to the fifth embodiment is also capable of detecting minute strains of 200με or smaller in the case where strains are equally distributed in a wide range. Further, in the fifth embodiment as well, it goes without saying that it is not necessary, unlike the background art, to manually adjust the optical pulse in conformity with the length of the sensing optical fiber 18 every time a measurement is conducted. Accordingly, the distributed optical fiber sensor 3 can be produced as an industrial product.

In order to enable the detection of minute strains of 200με or smaller out of those equally distributed in a wide range in the first to third embodiments, an optical fiber in which a Brillouin frequency shift amount cyclically changes may be used as the sensing optical fiber 18.

Figure 23:
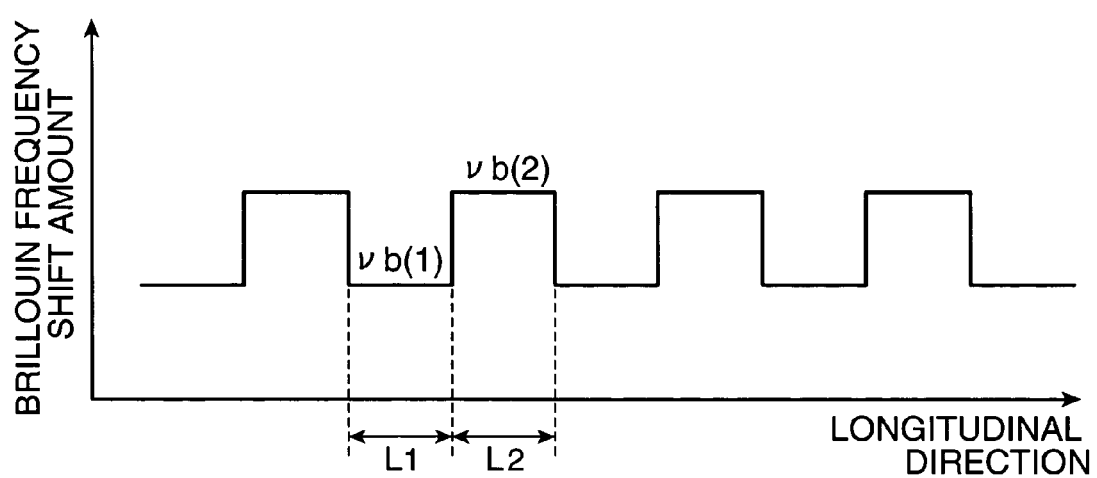
FIG. 23 is a chart showing Brillouin frequency shift amount in the longitudinal direction of a sensing optical fiber.

FIG. 23 is a chart showing a Brillouin frequency shift in the longitudinal direction of a sensing optical fiber.

The sensing optical fiber 18 in which the Brillouin frequency shift amount cyclically changes in this way is, for example, such an optical fiber in which a section DM11 having a first Brillouin frequency shift amount νb(1) and a length l1 and a section DM12 having a length l2 and a second Brillouin frequency shift amount νb(2) different from the first Brillouin frequency shift amount νb(1) alternately repeat as shown in FIG. 23. These first and second Brillouin frequency shift amounts νb(1), νb(2) can be realized by suitably straining the optical fiber.

In the first to fifth embodiments, the distributed optical fiber sensors 1, 2, 3, 5 are for measuring the Brillouin loss/gain spectra BSl/g(νd) and the Brillouin frequency shifts νb by locking the frequency $f_0$ of the intensity-stepwise optical pulse as the probe light and scanning the frequency of the continuous light CWpump1 as the pump light within the specified frequency range fr. Thus, the light emitting element 103 of the stepwise optical light source 11 needs not always be a frequency-variable semiconductor laser and may be a semiconductor laser. In the aforementioned embodiments, the distributed optical fiber sensors 1, 2, 3, 5 may be constructed to measure the Brillouin loss/gain spectra BSl/g(νd) and the Brillouin frequency shifts νb by scanning the frequency $f_0$ of the intensity-stepwise optical pulse as the probe light within the specified frequency range fr and locking the frequency of the continuous light CWpump1 as the pump light.

The present invention has been suitably and sufficiently described above by way of embodiments with reference to the accompanying drawings to be expressed. It should be appreciated that a person skilled in the art can easily modify and/or improve the aforementioned embodiments. Accordingly, modifications or improvements made by the person skilled in the art are interpreted to be embraced by the scope of the invention as claimed unless departing from the scope of the invention as claimed.

What is claimed is:

1. A distributed optical fiber sensor for measuring strain and/or temperature utilizing a Brillouin scattering phenomenon, comprising:
    a stepwise optical light source for generating an optical pulse including a first portion having a first time width and a second portion having a greater light intensity than the first portion and a second time width shorter than the first time width, the first portion preceding the second portion in the time domain,
    a continuous light source for generating a continuous light,
    a sensing optical fiber on which the optical pulse is incident as probe light and the continuous light is incident as pump light to thereby cause a Brillouin scattering phenomenon between the probe light and the pump light, and
    a Brillouin time domain detector for determining a Brillouin loss spectrum or a Brillouin gain spectrum from the light emerging from the sensing optical fiber and attributed to the Brillouin scattering phenomenon, and measuring strain caused in and/or temperature of the sensing optical fiber based on the determined Brillouin loss spectrum or the Brillouin gain spectrum.

2. A distributed optical fiber sensor according to claim 1, wherein:
    the probe light is incident on one end of the sensing optical fiber,
    the pump light is incident on the other end of the sensing optical fiber, and
    the Brillouin time domain detector determines the Brillouin loss spectrum or the Brillouin gain spectrum from the light emerging from the one end of the sensing optical fiber and attributed to the Brillouin scattering phenomenon and measures strain caused in and/or temperature of the sensing optical fiber based on the determined Brillouin loss spectrum or Brillouin gain spectrum.

3. A distributed optical fiber sensor according to claim 1, wherein:
    the probe light is incident on one end of the sensing optical fiber,
    the pump light is incident on the other end of the sensing optical fiber,
    the sensing optical fiber reflects the pump light propagating therein at the other end thereof, and
    the Brillouin time domain detector determines the Brillouin loss spectrum or the Brillouin gain spectrum from the light emerging from the one end of the sensing optical fiber and attributed to the Brillouin scattering phenomenon and measures strain caused in and/or temperature of the sensing optical fiber based on the determined Brillouin loss spectrum or Brillouin gain spectrum.

4. A distributed optical fiber sensor according to claim 3, wherein the Brillouin loss spectrum or the Brillouin gain spectrum in each longitudinal area section of equal to or less than 1 m of the sensing optical fiber determined from the light emerging from the one end of the sensing optical fiber and attributed to the Brillouin scattering phenomenon is substantially represented by a Lorenz curve.

5. A distributed optical fiber sensor according to claim 3, further comprising:
- a light intensity/polarization regulator for regulating the light intensity of an incident light and randomly changing a plane of polarization of the incident light, and
- a light intensity regulator for regulating the light intensity of the incident light,
- wherein the probe light is incident on the sensing optical fiber via the light intensity/polarization regulator and the pump light is incident on the sensing optical fiber via the light intensity regulator.

6. A distributed optical fiber sensor according to claim 3, wherein each of the stepwise optical light source and the continuous light source includes:
- a light emitting element for continuously emitting light having a narrow line width, a specified frequency and a substantially constant light intensity,
- a temperature controller for keeping the temperature of the light emitting element substantially at a constant temperature, and
- a frequency controller for keeping the frequency of the light emitted from the light emitting element substantially at a constant frequency.

7. A distributed optical fiber sensor according to claim 3, wherein the stepwise optical light source includes:
- a light emitting element for continuously emitting light having a narrow line width, a specified frequency and a specified light intensity,
- a first light intensity modulator and a second light intensity modulators for modulating the light intensity of an incident light,
- a first light intensity modulator driving portion for driving the first light intensity modulator to modulate the light intensity of the light continuously emitted from the light emitting element so as to form the second portion having the specified light intensity and the second time width and the other continuous portions before and after the second portion to have another light intensity lower than the specified light intensity, and
- a second light-intensity-modulator driving portion for driving the second light intensity modulator to modulate the light intensity of the light incident from the first light intensity modulator so as to form the first portion having the another light intensity and the first time width and a front remaining portion before the first portion and a rear remaining portions having no light intensity.

8. A distributed optical fiber sensor according to claim 3, wherein:
- the stepwise optical light source generates a first optical pulse and a second optical pulse, the first optical pulse including a first portion having a first time width and a second portion having a greater light intensity than the first portion and a second time width shorter than the first time width, the first portion preceding the second portion in the time domain, and the second optical pulse having the same time width as the first optical pulse and the same light intensity as the lowest light intensity of the first optical pulse, and
- the Brillouin time domain detector causes the stepwise optical light source to generate the second optical pulse and emit it as probe light to the sensing optical fiber and causes the continuous light source to generate the continuous light and emit it as pump light to the sensing optical fiber, thereby storing a first light intensity of light emerging from the sensing optical fiber and attributed to the Brillouin scattering phenomenon; causes the stepwise optical light source to generate the first optical pulse and emit it as probe light to the sensing optical fiber and causes the continuous light source to generate the continuous light and emit it as pump light to the sensing optical fiber, thereby storing a second light intensity of light emerging from the sensing optical fiber and attributed to the Brillouin scattering phenomenon; determines the Brillouin loss spectrum or the Brillouin gain spectrum based on the stored first and second light intensities; and measures strain caused in and/or temperature of the sensing optical fiber based on the determined Brillouin loss spectrum or Brillouin gain spectrum.

9. A distributed optical fiber sensor according to claim 3, further comprising a reference optical fiber made of the same material as the sensing optical fiber, having a length corresponding to spatial resolution, and having a strain larger than the one expressed by an inverse of the time width of the optical pulse,
- wherein the Brillouin time domain detector causes the stepwise optical light source to generate the optical pulse and emits it as probe light to the reference optical fiber and causes the continuous light source to generate the continuous light and emit it as pump light to the reference optical fiber; determines the mean frequency of the Brillouin loss spectrum or the Brillouin gain spectrum from light emerging from the reference optical fiber and attributed to the Brillouin scattering phenomenon; stores the determined mean frequency as a reference value; determines the mean frequency of the Brillouin loss spectrum or the Brillouin gain spectrum from light emerging from the sensing optical fiber and attributed to the Brillouin scattering phenomenon as a detection value; calculates a correction value from the reference value, the detection value and the Brillouin loss spectrum or the Brillouin gain spectrum in accordance with a correction-value conversion equation stored beforehand; and measures strain caused in and/or temperature of the sensing optical fiber from the calculated correction value.

10. A distributed optical fiber sensor according to claim 3, wherein the sensing optical fiber is an optical fiber in which a Brillouin frequency shift amount cyclically changes.

11. A distributed optical fiber sensor according to claim 3, wherein the sensing optical fiber is fixed to a measurement object whose strain and/or temperature are to be measured.

12. A distributed optical fiber sensor according to claim 1, wherein the Brillouin loss spectrum or the Brillouin gain spectrum in each longitudinal area section of equal to or less than 1 m of the sensing optical fiber determined from the light emerging from the one end of the sensing optical fiber and attributed to the Brillouin scattering phenomenon is substantially represented by a Lorenz curve.

13. A distributed optical fiber sensor according to claim 1, further comprising:
- a light intensity/polarization regulator for regulating the light intensity of an incident light and randomly changing a plane of polarization of the incident light, and
- a light intensity regulator for regulating the light intensity of the incident light,
- wherein the probe light is incident on the sensing optical fiber via the light intensity/polarization regulator and the pump light is incident on the sensing optical fiber via the light intensity regulator.

14. A distributed optical fiber sensor according to claim 1, wherein each of the stepwise optical light source and the continuous light source includes:

a light emitting element for continuously emitting light having a narrow line width, a specified frequency and a substantially constant light intensity, a temperature controller for keeping the temperature of the light emitting element substantially at a constant temperature, and a frequency controller for keeping the frequency of the light emitted from the light emitting element substantially at a constant frequency.

15. A distributed optical fiber sensor according to claim 1, wherein the stepwise optical light source includes:
  a light emitting element for continuously emitting light having a narrow line width, a specified frequency and a specified light intensity,
  a first light intensity modulator and a second light intensity modulator for modulating the light intensity of an incident light,
  a first light-intensity-modulator driving portion for driving the first light intensity modulator to modulate the light intensity of the light continuously emitted from the light emitting element so as to form the second portion having the specified light intensity and the second time width and the other continuous portions before and after the second portion to have another light intensity lower than the specified light intensity, and
  a second light-intensity-modulator driving portion for driving the second light intensity modulator to modulate the light intensity of the light incident from the first light intensity modulator so as to form the first portion having the another light intensity and the first time width and a front remaining portion before the first portion and a rear remaining portion after the second portion, the front and rear remaining portions having no light intensity.

16. A distributed optical fiber sensor according to claim 1, wherein:
  the stepwise optical light source generates a first optical pulse and a second optical pulse, the first optical pulse including a first portion having a first time width and a second portion having a greater light intensity than the first portion and a second time width shorter than the first time width, the first portion preceding the second portion in the time domain, and the second optical pulse having the same time width as the first optical pulse and the same light intensity as the lowest light intensity of the first optical pulse, and
  the Brillouin time domain detector causes the stepwise optical light source to generate the second optical pulse and emit it as probe light to the sensing optical fiber and causes the continuous light source to generate the continuous light and emit it as pump light to the sensing optical fiber, thereby storing a first light intensity of light emerging from the sensing optical fiber and attributed to the Brillouin scattering phenomenon; causes the stepwise optical light source to generate the first optical pulse and emit it as probe light to the sensing optical fiber and causes the continuous light source to generate the continuous light and emit it as pump light to the sensing optical fiber, thereby storing a second light intensity of light emerging from the sensing optical fiber and attributed to the Brillouin scattering phenomenon; determines the Brillouin loss spectrum or the Brillouin gain spectrum based on the stored first and second light intensities; and measures strain caused in and/or temperature of the sensing optical fiber based on the determined Brillouin loss spectrum or Brillouin gain spectrum.

17. A distributed optical fiber sensor according to claim 1, further comprising a reference optical fiber made of the same material as the sensing optical fiber, having a length corresponding to spatial resolution, and having a strain larger than the one expressed by an inverse of the time width of the optical pulse,
  wherein the Brillouin time domain detector causes the stepwise optical light source to generate the optical pulse and emits it as probe light to the reference optical fiber and causes the continuous light source to generate the continuous light and emit it as pump light to the reference optical fiber; determines the mean frequency of the Brillouin loss spectrum or the Brillouin gain spectrum from light emerging from the reference optical fiber and attributed to the Brillouin scattering phenomenon; stores the determined mean frequency as a reference value; determines the mean frequency of the Brillouin loss spectrum or the Brillouin gain spectrum from light emerging from the sensing optical fiber and attributed to the Brillouin scattering phenomenon as a detection value; calculates a correction value from the reference value, the detection value and the Brillouin loss spectrum or the Brillouin gain spectrum in accordance with a correction-value conversion equation stored beforehand; and measures strain caused in and/or temperature of the sensing optical fiber from the calculated correction value.

18. A distributed optical fiber sensor according to claim 1, wherein the sensing optical fiber is an optical fiber in which a Brillouin frequency shift amount cyclically changes.

19. A distributed optical fiber sensor according to claim 1, wherein the sensing optical fiber is fixed to a measurement object whose strain and/or temperature are to be measured.

20. A distributed optical fiber sensor for measuring strain and/or temperature utilizing a Brillouin scattering phenomenon, comprising:
  a stepwise optical light source for generating an optical pulse front light having a pre-set time width and a pre-set light intensity and an optical pulse having a pre-set pulse width and a light intensity greater than the pre-set light intensity of the optical pulse front light;
  a continuous light source for generating a continuous light,
  a sensing optical fiber on which the optical pulse front light and the optical pulse are incident as probe light and the continuous light is incident as pump light to thereby cause a Brillouin scattering phenomenon between the probe light and the pump light, and
  a Brillouin time domain detector for determining a Brillouin loss spectrum or a Brillouin gain spectrum from the light emerging from the sensing optical fiber and attributed to the Brillouin scattering phenomenon, and measuring strain caused in and/or temperature of the sensing optical fiber based on the determined Brillouin loss spectrum or the Brillouin gain spectrum.

* * * * *